(12) United States Patent
Read et al.

(10) Patent No.: US 10,908,001 B2
(45) Date of Patent: Feb. 2, 2021

(54) WIRELESS SENSOR WITH MOUNTING PLATE

(71) Applicant: Ademco Inc., Golden Valley, MN (US)

(72) Inventors: Travis Read, Little Canada, MN (US); Nathan Carlson, Maple Grove, MN (US); Christopher Heintzelman, Plymouth, MN (US); Karla Morales, Chihuahua (MX)

(73) Assignee: Ademco Inc., Golden Valley, MN (US)

( * ) Notice: Subject to any disclaimer, the term of this patent is extended or adjusted under 35 U.S.C. 154(b) by 60 days.

(21) Appl. No.: 16/156,859

(22) Filed: Oct. 10, 2018

(65) Prior Publication Data

US 2020/0116533 A1 Apr. 16, 2020

(51) Int. Cl.
| | | |
|---|---|---|
| *G01D 11/24* | (2006.01) | |
| *F16M 13/02* | (2006.01) | |
| *H04L 12/28* | (2006.01) | |
| *H04L 29/08* | (2006.01) | |

(52) U.S. Cl.
CPC ........... *G01D 11/245* (2013.01); *F16M 13/02* (2013.01); *H04L 12/2803* (2013.01); *H04L 67/12* (2013.01)

(58) Field of Classification Search
CPC .............................. G01D 11/245; F16M 13/02
See application file for complete search history.

(56) References Cited

U.S. PATENT DOCUMENTS

| | | |
|---|---|---|
| 4,335,320 A | 6/1982 | Garver |
| 5,210,532 A | 5/1993 | Knoedler et al. |
| 5,604,480 A | 2/1997 | Lamparter |
| 6,215,398 B1 | 4/2001 | Platner et al. |
| 6,415,205 B1 | 7/2002 | Myron et al. |
| 6,759,954 B1 | 7/2004 | Myron et al. |
| 7,047,092 B2 | 5/2006 | Wimsatt |
| 7,302,642 B2 | 11/2007 | Smith et al. |

(Continued)

FOREIGN PATENT DOCUMENTS

| | | |
|---|---|---|
| CN | 102364252 A | 2/2012 |
| CN | 107479593 A | 12/2017 |

(Continued)

OTHER PUBLICATIONS

"Installation Guide: DEVIreg Smart: Intelligent Electronic Timer Thermostat With Wi-Fi Connectivity and App Control," DEVI, 24 pages, Jul. 2016.

(Continued)

*Primary Examiner* — Jamel E Williams
(74) *Attorney, Agent, or Firm* — Shumaker & Sieffert, P.A.

(57) ABSTRACT

A wireless sensor assembly includes a wall plate that is configured to be secured to a wall of a building using either a threaded fastener or a releasable adhesive strip, the wall plate including an aperture therethrough for accommodating the threaded fastener and a recess on a back surface of the wall plate to accommodate at least part of the releasable adhesive strip. The wireless sensor assembly includes a sensor housing including a front housing region and a back housing region, the back housing region configured to be releasably secured to the wall plate, the back housing region including a recess that is configured to receive at least part of the wall plate when the back housing region is releasably secured to the wall plate.

20 Claims, 45 Drawing Sheets

(56) References Cited

U.S. PATENT DOCUMENTS

| | | |
|---|---|---|
| 7,392,661 B2 | 7/2008 | Alles |
| 7,741,597 B2 | 6/2010 | Jensen et al. |
| 8,249,731 B2 | 8/2012 | Tran et al. |
| 8,255,090 B2 | 8/2012 | Frader-Thompson et al. |
| 8,284,063 B2 | 10/2012 | Jensen et al. |
| 8,606,374 B2 | 12/2013 | Fadell et al. |
| 8,674,816 B2 | 3/2014 | Trundle et al. |
| 8,744,629 B2 | 6/2014 | Wallaert et al. |
| 9,014,829 B2 | 4/2015 | Chemel et al. |
| 9,124,130 B2 | 9/2015 | Altonen et al. |
| 9,298,196 B2 | 3/2016 | Matsuoka et al. |
| 9,310,253 B2 | 4/2016 | Katz |
| 9,448,567 B2 | 9/2016 | Warren et al. |
| 9,471,082 B2 | 10/2016 | Sloop et al. |
| 9,618,223 B2 | 4/2017 | Kates |
| 9,618,918 B2 | 4/2017 | O'Keeffe |
| 9,686,880 B1 | 6/2017 | Khoury et al. |
| 9,765,983 B2 | 9/2017 | Schultz et al. |
| 9,768,564 B2 | 9/2017 | Read et al. |
| 9,769,374 B2 | 9/2017 | Moeller et al. |
| 9,772,612 B2 | 9/2017 | McCarthy, III et al. |
| 9,810,442 B2 | 11/2017 | Matsuoka et al. |
| 10,055,958 B2 | 8/2018 | Chen |
| 2002/0134849 A1 | 9/2002 | Disser |
| 2004/0041756 A1 | 3/2004 | Henmi et al. |
| 2005/0128067 A1 | 6/2005 | Zakrewski |
| 2005/0194455 A1 | 9/2005 | Alles |
| 2005/0224329 A1* | 10/2005 | Milo .............. E05B 47/00 200/341 |
| 2005/0247865 A1 | 11/2005 | Takach et al. |
| 2006/0012472 A1 | 1/2006 | Eskildsen |
| 2006/0207146 A1 | 9/2006 | Gesel et al. |
| 2006/0208099 A1 | 9/2006 | Chapman, Jr. et al. |
| 2007/0045444 A1 | 3/2007 | Gray et al. |
| 2009/0140059 A1* | 6/2009 | Barton ............. F24F 11/30 236/51 |
| 2010/0101854 A1 | 4/2010 | Wallaert et al. |
| 2011/0011179 A1* | 1/2011 | Gustafsson ......... G01N 27/223 73/335.03 |
| 2011/0046805 A1 | 2/2011 | Bedros et al. |
| 2011/0253796 A1 | 10/2011 | Posa et al. |
| 2012/0232703 A1 | 9/2012 | Moore et al. |
| 2013/0261774 A1* | 10/2013 | Lu ............... H04L 12/2836 700/90 |
| 2013/0345882 A1 | 12/2013 | Dushane et al. |
| 2014/0039686 A1 | 2/2014 | Corbin |
| 2014/0058572 A1 | 2/2014 | Stein et al. |
| 2014/0262481 A1* | 9/2014 | Khoury ............ H05K 7/1422 174/480 |
| 2015/0061503 A1 | 3/2015 | Billard et al. |
| 2015/0081109 A1* | 3/2015 | Fadell ............. G05D 23/1902 700/276 |
| 2015/0081474 A1* | 3/2015 | Kostka ............. H04W 88/08 705/26.8 |
| 2015/0124850 A1 | 5/2015 | Parthasarathy |
| 2015/0159896 A1 | 6/2015 | Tepper et al. |
| 2016/0277207 A1 | 9/2016 | Bedros et al. |
| 2017/0223807 A1* | 8/2017 | Recker ............ H05B 47/16 |
| 2018/0106489 A1 | 4/2018 | Niculescu et al. |

FOREIGN PATENT DOCUMENTS

| | | |
|---|---|---|
| CN | 107529631 A | 1/2018 |
| JP | 2003085521 A | 3/2003 |
| WO | 2009005610 A1 | 1/2009 |
| WO | 2014133367 A1 | 9/2014 |
| WO | 2015020680 A1 | 2/2015 |
| WO | 2016210091 A1 | 12/2016 |
| WO | 201735227 A1 | 3/2017 |

OTHER PUBLICATIONS

Lloyd, "How to Manually Select Which Ecobee Sensor to Use," HowToGeek, 17 pages, Jun. 30, 2016.

Hall, "Ecobee3 Remote Sensors Now Work As Homekit Motion Detectors & Room Temperature Monitors," 9TO5Mac, 12 pages, Jan. 12, 2017.

"User Guide: Ecobee3," Ecobee, 42 pages, 2014.

"Ecobee4 Smart Thermostat Hands-On Review," digitaltrends, 18 pages, accessed Sep. 20, 2018.

"HolHom: It's more than a smart thermostat," HolHom, 5 pages, 2017.

"HomeMatic Wireless Room Thermostat, Surface Mount," HomeMatic, 5 pages, downloaded Mar. 2, 2018.

"Zennio Thermostat: Simple/Advanced Thermostatic Control Module," Zennio, 46 pages, downloaded Mar. 8, 2018.

"Nest Support: Learn About the Nest Temperature Sensor and How to Change Settings," Nest, 9 pages, downloaded Jul. 16, 2018.

"Nest Support: Learn More About Using Reduced Sensitivity With Nest Secure," Nest, 7 pages, downloaded Aug. 14, 2018.

"Occupancy Sensing Adaptive Thermostats," Western Cooling Connection, 10 pages, downloaded Apr. 27, 2018.

"Braeburn: Model 5300 User Manual," Braebum, 14 pages, 2006.

"Rectangular Frames for Electric Thermostats," OJ Electronics, 8 pages, downloaded Mar. 2, 2018.

"Homekit Home App—Ecobee Sensors," downloaded Sep. 20, 2018.

Extended Search Report from counterpart European Application No. 19202590.6, dated Feb. 12, 2020, 10 pp.

Response to Communication Pursuant to Rule 69 EPC, dated Apr. 20, 2020, from counterpart European Application No. 19202590.6, filed Oct. 15, 2020, 57 pp.

* cited by examiner

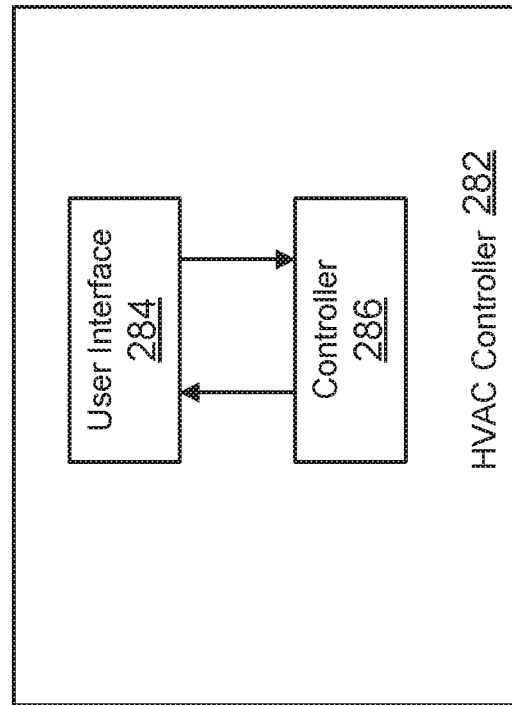

304

312 — Managment

Device & Sensors

Thermostat Information

Equipment Status

Dehumidification Away Mode

Dealer Information

314 — Configuration

Wi-Fi

Security

Preferences

Installer Options

FIG. 17B

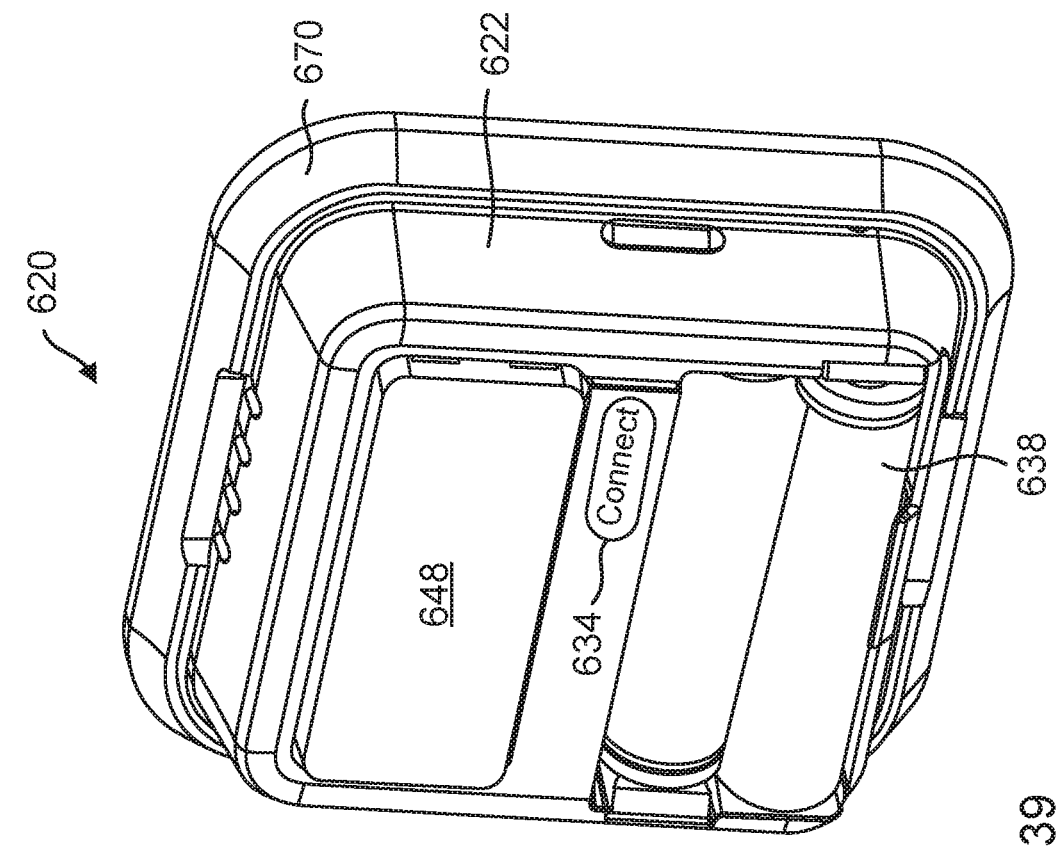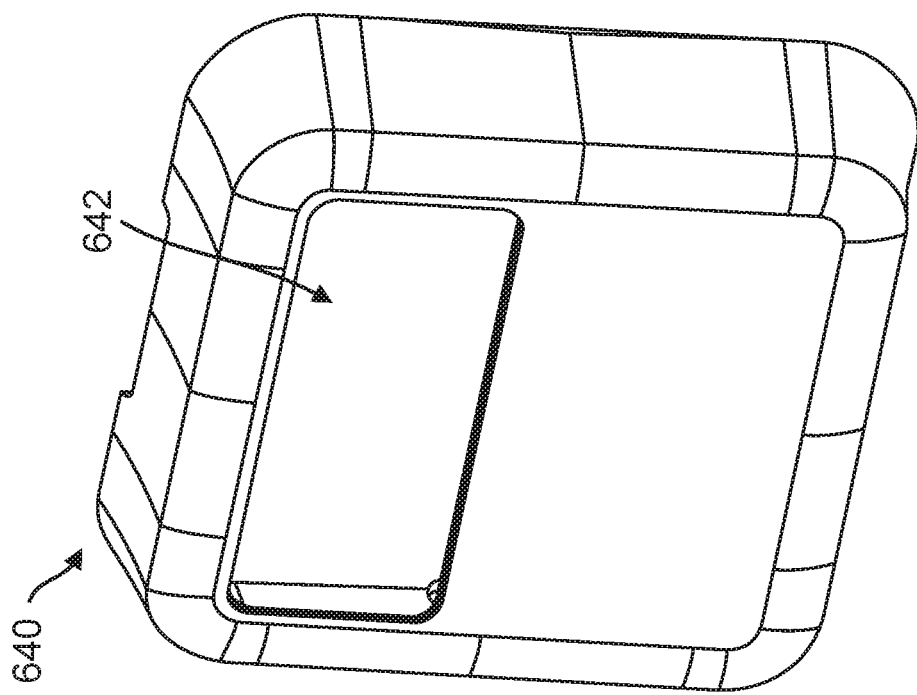
FIG. 39

WIRELESS SENSOR WITH MOUNTING PLATE

TECHNICAL FIELD

The present disclosure pertains to a Heating, Ventilation, and/or Air Conditioning (HVAC) system for a building. More particularly, the present disclosure pertains to devices for controlling an HVAC system.

BACKGROUND

Heating, Ventilation, and/or Air Conditioning (HVAC) systems are often used to control the comfort level within a building or other structure. Such HVAC systems typically include an HVAC controller that controls various HVAC components of the HVAC system in order to affect and/or control one or more environmental conditions within the building. In many cases, the HVAC controller is mounted within the building and provides control signals to various HVAC components of the HVAC system. Improvements in the hardware, user experience, and functionality of such HVAC controllers, including remote sensor devices, would be desirable.

SUMMARY

The disclosure is directed to HVAC controllers that are configured to receive signals such as temperature signals from a plurality of different temperature sensors, and to utilize these temperature signals in controlling an HVAC system. In a particular example of the disclosure, a wireless sensor assembly includes a wall plate that is configured to be secured to a wall of a building using either a threaded fastener or a releasable adhesive strip, the wall plate including an aperture therethrough for accommodating the threaded fastener and a recess on a back surface of the wall plate to accommodate at least part of the releasable adhesive strip. The wireless sensor assembly includes a sensor housing including a front housing region and a back housing region, the back housing region configured to be releasably secured to the wall plate, the back housing region including a recess that is configured to receive at least part of the wall plate when the back housing region is releasably secured to the wall plate. One or more sensors are disposed within the sensor housing. The wireless sensor assembly includes a transmitter for transmitting sensor values provided by the one or more sensors, the transmitter is configured to be in wireless communication with a building control system that utilizes the transmitted sensor values in controlling a building control system of the building.

Another particular example of the disclosure is a wall plate for releasably securing a wireless device to a wall, the wall plate being configured to be mounted to the wall with the wireless device subsequently releasably secured to the wall plate. The wall plate includes a body defining a front surface, intended to face away from a wall, and a back surface, intended to face the wall, when the wall plate has been releasably secured to the wall, a raised perimeter extending around the body, a centrally located aperture extending through the body, the centrally located aperture configured to accommodate a fastener extending therethrough when an installer decides to use the fastener to secure the wall plate to the wall, a recess formed in the back surface, the recess configured to accommodate a releasable adhesive strip when the installer decides to use the releasable adhesive strip to releasably secure the wall plate to the wall and one or more mounting features extending from one or more sides of the wall plate to releasably engage one or more corresponding mounting features of the wireless device.

Another particular example of the disclosure is a wireless sensor assembly that includes a releasable adhesive strip that includes a release tab that when pulled releases the releasable adhesive strip and a wall plate, wherein the releasable adhesive strip is used to secure the wall plate to a wall with the release tab of the releasable adhesive strip extending out laterally past a side of the wall plate so that at least part of the release tab is accessible to a user after the wall plate has been secured to the wall. A sensor housing is removably secured to the wall plate, wherein the sensor housing extends laterally out past the side of the wall plate and covers the release tab of the releasable adhesive strip so as to hide the release tab of the releasable adhesive strip from view when the sensor housing is secured to the wall plate.

The above summary of some embodiments is not intended to describe each disclosed embodiment or every implementation of the present disclosure. The Figures, and Detailed Description, which follow, more particularly exemplify some of these embodiments.

BRIEF DESCRIPTION OF THE DRAWINGS

The disclosure may be more completely understood in consideration of the following description of various illustrative embodiments of the disclosure in connection with the accompanying drawings, in which:

FIG. 15 is a schematic block diagram of an illustrative HVAC controller useable in the HVAC control system of FIG. 3;

FIG. 39 is a partially exploded perspective view of the illustrative wireless occupancy sensor of FIG. 37;

Figure 1:
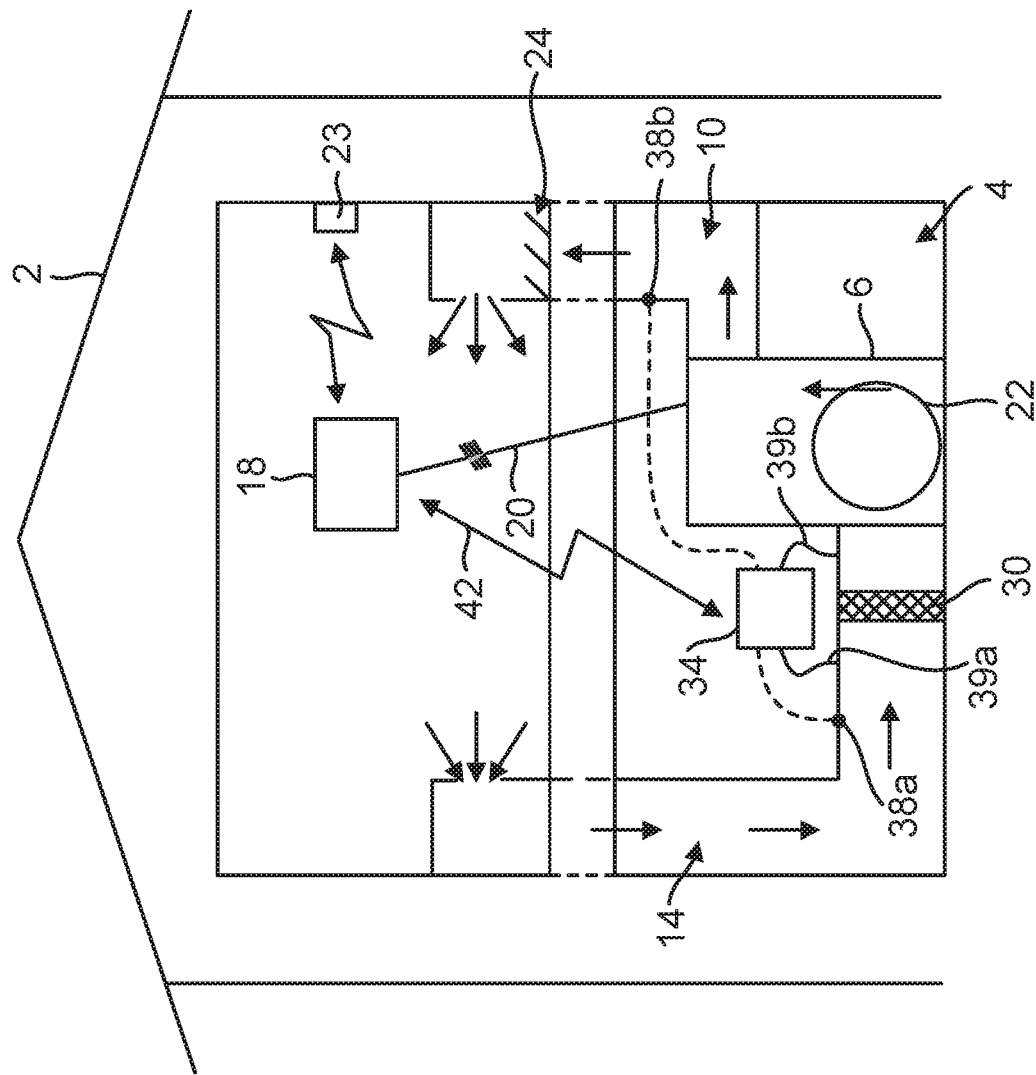
FIG. 1 is a schematic view of an illustrative HVAC system servicing a building.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and other systems. While HVAC systems with HVAC controllers are used as an example below, it should be recognized that the concepts disclosed herein can be applied to building automation systems more generally.

FIG. 1 is a schematic view of a building 2 having an illustrative heating, ventilation, and air conditioning (HVAC) system 4. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to one or more temperature sensor(s) for sensing ambient temperature at or near the thermostat. In some instances, the HVAC controller(s) 18 may be a zone controller, or may include multiple zone controllers each monitoring and/or controlling the comfort level within a particular zone in the building or other structure. In some cases, the HVAC controller(s) 18 may communicate with one or more remote sensors, such as a remote sensor 21, that may be disposed within the building 2. In some cases, a remote sensor 21 may measure various environmental conditions such as but not limited to temperature.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 23 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air and/or receives how much conditioned air from the HVAC component(s) 6. In some cases, the one or more HVAC controller(s) 18 may use information from the one or more remote sensors 21, which may be disposed within one or more zones, to adjust the position of one or more of the dampers 24 in order to cause a measured value to approach a set point in a particular zone or zones.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may, in addition to controlling the HVAC under the direction of the thermostat, be configured to measure or detect a change in a given parameter between the return air side and the discharge air side of the HVAC system 4. For example, the equipment interface module 34 may measure a difference (or absolute value) in temperature, flow rate, pressure, or a combination of any one of these parameters between the return air side and the discharge air side of the HVAC system 4. In some instances, absolute value is useful in protecting equipment against an excessively high temperature or an excessively low temperature, for example. In some cases, the equipment interface module 34 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, it can be useful to measure pressure across the fan in order to determine if too much pressure is being applied as well as to measure pressure across the cooling A-coil in order to determine if the cooling A-coil may be plugged or partially plugged. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In some instances, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4. In other cases, the equipment interface module 34 may itself evaluate the system's operation and/or performance based on the collected data.

Figure 2:
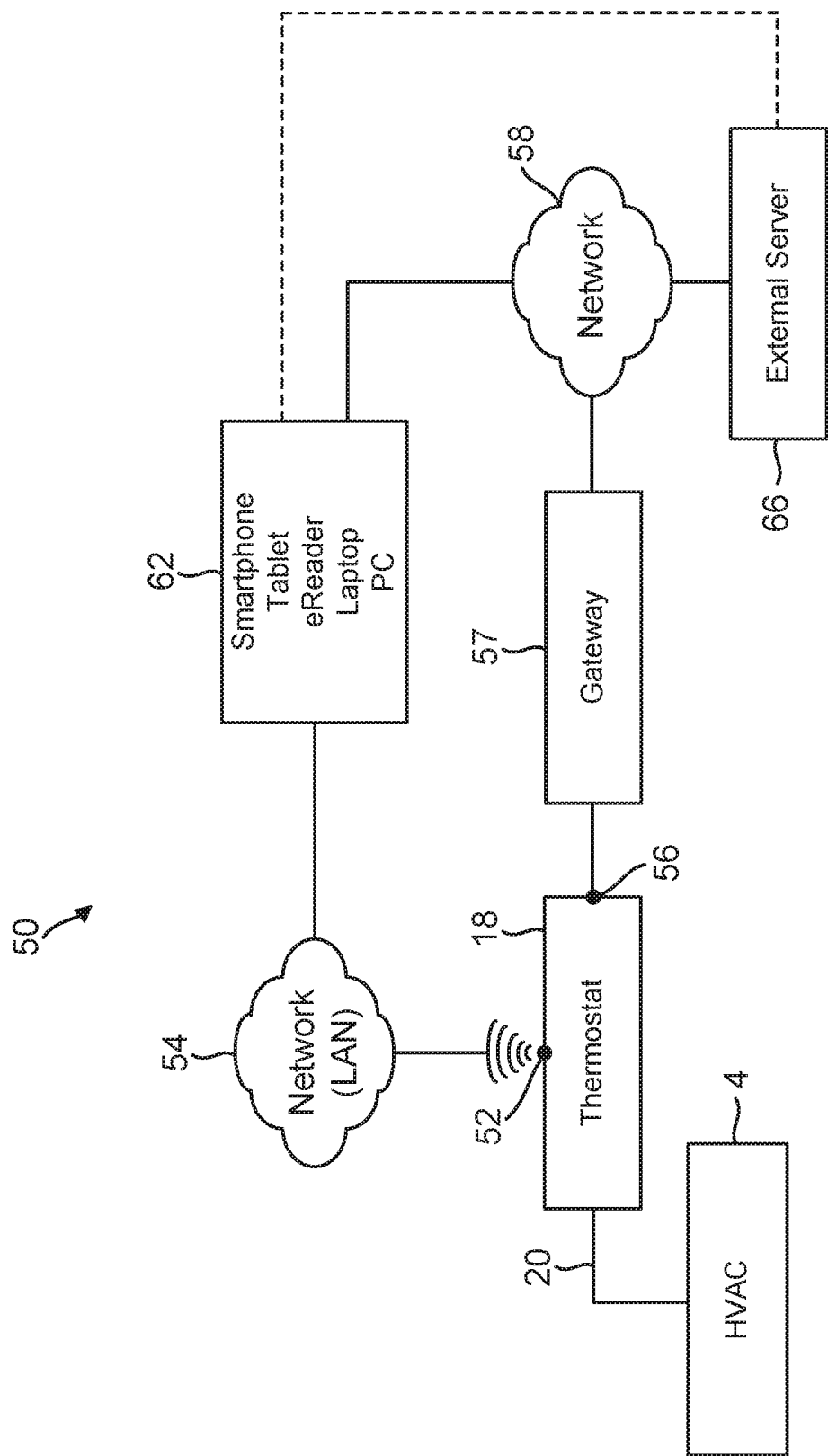
FIG. 2 is a schematic view of an illustrative HVAC control system that may facilitate access and/or control of the HVAC system of FIG. 1.

FIG. 2 is a schematic view of an illustrative HVAC control system 50 that facilitates remote access and/or control of the illustrative HVAC system 4 shown in FIG. 1. The HVAC control system 50 may be considered a building automation system or part of a building automation system. The illustrative HVAC control system 50 includes an HVAC controller, as for example, HVAC controller 18 (see FIG. 1) that is configured to communicate with and control one or more HVAC components 6 of the HVAC system 4. As discussed above, the HVAC controller 18 may communicate with the one or more HVAC components 6 of the HVAC system 4 via a wired or wireless communication link 20. Additionally, the HVAC controller 18 may communicate over one or more wired or wireless networks that may accommodate remote access and/or control of the HVAC controller 18 via another device such as a smart phone, tablet, e-reader, laptop computer, personal computer, key fob, or the like. As shown in FIG. 2, the HVAC controller 18 may include a first communications port 52 for communicating over a first network 54, and in some cases, a second communications port 56 for communicating over a second network 58. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

In some cases, the HVAC controller 18 may be programmed to communicate over the second network 58 with an external web service hosted by one or more external web server(s) 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services sometimes including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like from the web server 66 over the second network 58. In some instances, the HVAC controller 18 may be configured to receive one or more user profiles having at least one operational parameter setting that is selected by and reflective of a user's preferences. In still other instances, the HVAC controller 18 may be configured to receive and/or download firmware and/or hardware updates such as, for example, device drivers from the web server 66 over the second network 58. Additionally, the HVAC controller 18 may be configured to receive local weather data, weather alerts and/or warnings, major stock index ticker data, traffic data, and/or news headlines over the second network 58. These are just some examples.

Depending upon the application and/or where the HVAC user is located, remote access and/or control of the HVAC controller 18 may be provided over the first network 54 and/or the second network 58. A variety of remote wireless devices 62 may be used to access and/or control the HVAC controller 18 from a remote location (e.g. remote from the HVAC Controller 18) over the first network 54 and/or second network 58 including, but not limited to, mobile phones including smart phones, tablet computers, laptop or personal computers, wireless network-enabled key fobs, e-readers, and/or the like. In many cases, the remote wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired. In some cases, the remote wireless devices 62 may communicate with the network 54 via the external server 66 for security purposes, for example.

In some cases, an application program code (i.e. app) stored in the memory of the remote wireless device 62 may be used to remotely access and/or control the HVAC controller 18. The application program code (app) may be downloaded from an external web service, such as the web service hosted by the external web server 66 (e.g. Honeywell's TOTAL CONNECT™ web service) or another external web service (e.g. ITUNES® or Google Play). In some cases, the app may provide a remote user interface for interacting with the HVAC controller 18 at the user's remote wireless device 62. For example, through the user interface provided by the app, a user may be able to change operating parameter settings such as, for example, temperature set points, humidity set points, start times, end times, schedules, window frost protection settings, accept software updates and/or the like. Communications may be routed from the user's remote wireless device 62 to the web server 66 and then, from the web server 66 to the HVAC controller 18. In some cases, communications may flow in the opposite direction such as, for example, when a user interacts directly with the HVAC controller 18 to change an operating parameter setting such as, for example, a schedule change or a set point change. The change made at the HVAC controller 18 may be routed to the web server 66 and then from the web server 66 to the remote wireless device 62 where it may reflected by the application program executed by the remote wireless device 62.

In some cases, a user may be able to interact with the HVAC controller 18 via a user interface provided by one or more web pages served up by the web server 66. The user may interact with the one or more web pages using a variety of internet capable devices to effect a setting or other change at the HVAC controller 18, and in some cases view usage data and energy consumption data related to the usage of the HVAC system 4. In some cases, communication may occur between the user's remote wireless device 62 and the HVAC controller 18 without being relayed through a server such as external server 66. These are just some examples.

Figure 3:
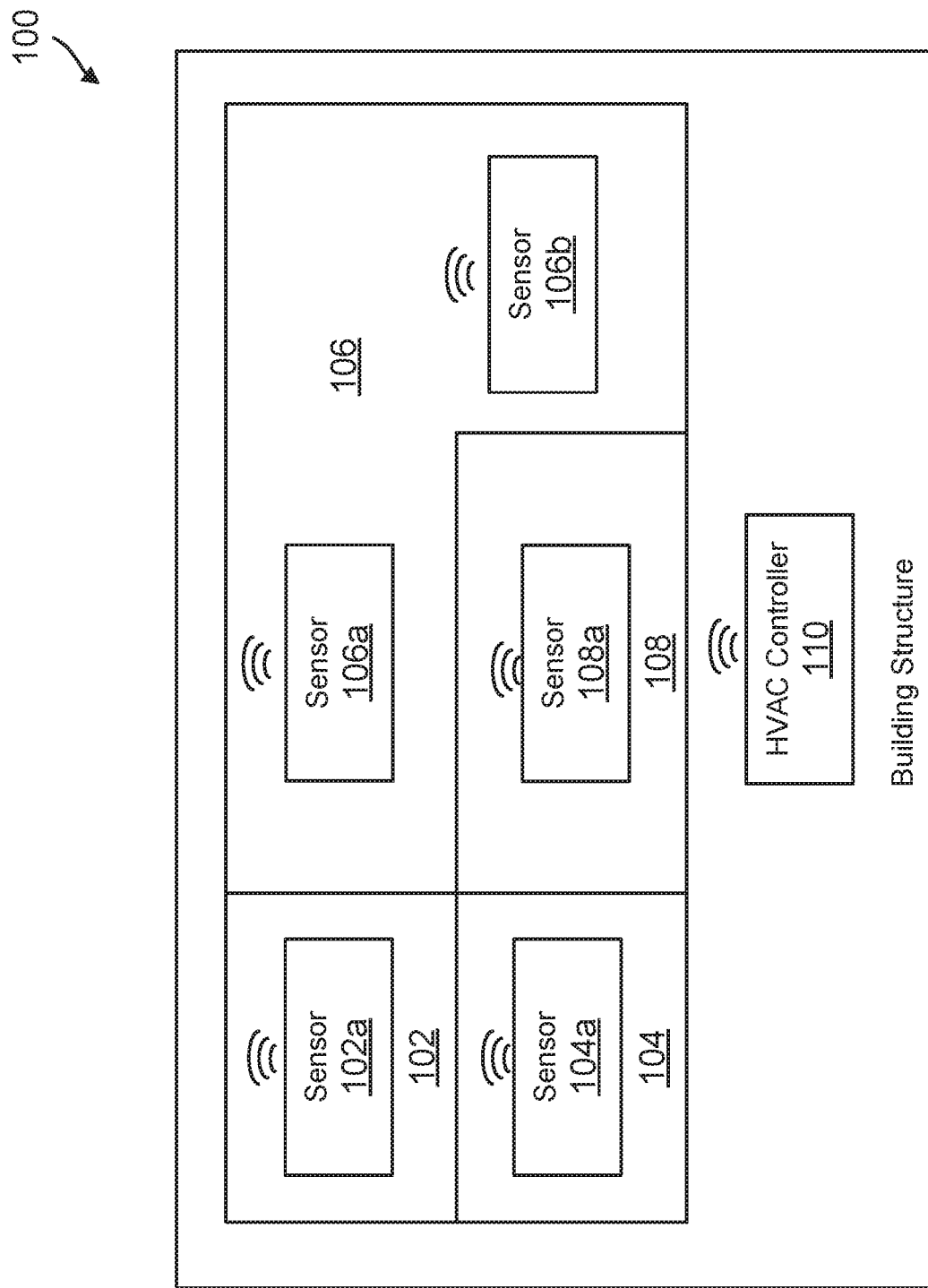
FIG. 3 is a schematic view of a building space including an illustrative HVAC control system.

FIG. 3 is a schematic illustration of a building structure 100 that may be considered as being an example of the building 2 (FIG. 1). As illustrated, the building structure 100 is divided into distinct building spaces labeled 102, 104, 106 and 108. Each of the building spaces 102, 104, 106, 108 may be separate rooms, for example. One or more of the building spaces 102, 104, 106, 108 may instead refer to sections or portions of the building structure 100. For example, if the building structure 100 has what is commonly known as an "open floor plan", there may not be walls dividing out and defining each of the building spaces 102, 104, 106, 108. Some of the building spaces 102, 104, 106, 108 may have sizes or shapes that are different from others of the building spaces 102, 104, 106, 108. As illustrated, for example, the building space 102 and the building space 104 are shown to be of the same size and shape. The building space 108 is longer in one dimension than the building spaces 102, 104. The building space 106 can be seen as having an L-shaped configuration. These relative sizes and shapes are merely illustrative, and are intended to indicate that the building structure 100 may be considered as being divided into a number of building spaces, regardless of whether the building spaces are defined by physical walls, or are portions of an open space that are divided by function.

Each of the building spaces 102, 104, 106, 108 can be seen as including a sensor that may, for example, be considered as being an example of the remote sensor 21 (FIG. 1). The sensor may be a temperature sensor, for example. Alternatively, or in addition, the sensor may include a humidity sensor, an air quality sensor (e.g. $CO_2$ sensor, pollen sensor), a light sensor and/or any other suitable sensor In some instances, the sensor may also include an occupancy sensor (e.g. PIR sensor, microwave sensor, audio sensor, etc.). The building space 102 is shown as including a sensor 102a, the building space 104 includes a sensor 104a, the building space 106 includes a sensor 106a and a sensor 106b, and the building space 108 includes a sensor 108a. Each of the sensors 102a, 104a, 106a, 106b, 108a are in communication with an HVAC controller 110. As illustrated, the sensors 102a, 104a, 106a, 106b, 108a are in wireless communication with the HVAC controller 110. In some cases, one or more of the sensors may be hardwired to the HVAC controller 110.

Figure 4:
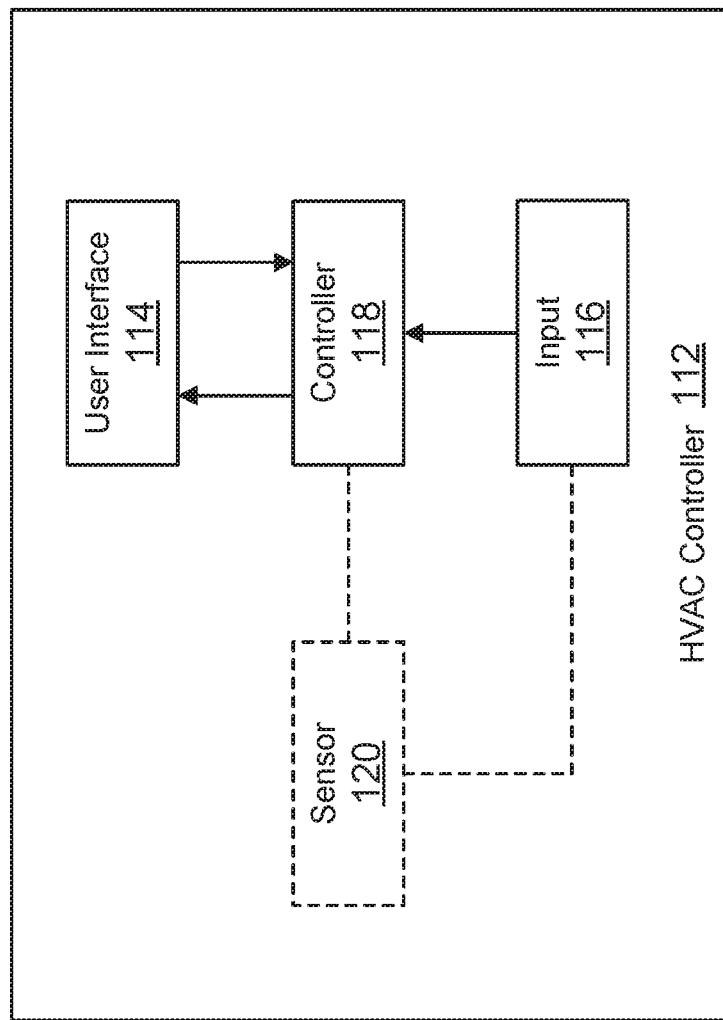
FIG. 4 is a schematic block diagram of a portion of an illustrative HVAC controller useable in the HVAC control system of FIG. 3.

FIG. 4 is a schematic block diagram of the HVAC controller 110, which may be considered as being an example of the HVAC controller 18 (FIG. 1). In some cases, the HVAC controller 110 may be a wall-mountable thermostat. As noted with respect to FIG. 3, the HVAC controller 100 may be configured to receive signals from a plurality of sensors (such as the sensors 102a, 104a, 106a, 106b, 108a) that are positioned in different spaces within the building structure 100. The HVAC controller 110 includes a housing 112 and a user interface 114 that is accessible from an exterior of the housing 112. The HVAC controller 110 includes an input 116 for receiving signals from the plurality of sensors. In some cases, the input 116 may be a wireless receiver or wireless transceiver. In some cases, one of the plurality of sensors may be located within the housing 112 of the HVAC controller 110, as indicated by the sensor 120 shown in FIG. 4, and at least one of the plurality of sensors may be a remote sensor that is located remote from the HVAC controller 110.

In some cases, the input 116 receives current temperatures reported from each of the sensors, with each current temperature corresponding to a particular space in which each sensor is located. Each communication may include an address of the sending sensor, so that HVAC controller 110 can determine which sensor sent the reported temperature. A controller 118 is operably coupled to the user interface 114 and to the input 116. In some cases, the controller 118 is configured to control the HVAC system using a control temperature that is a weighted combination of two or more of the current temperatures being reported by the plurality of sensors. In some instances, the weighted combination is a weighted average of two or more of the current temperatures being reported by the plurality of sensors. The controller 118 may repeatedly receive, via the input 116, updated current temperatures from each of the plurality of sensors, and the controller 118 may be configured to utilize the updated current temperatures to produce an updated control temperature.

The controller 118 may track which of the different spaces (such as the building spaces 102, 104, 106, 108 of FIG. 3) are currently occupied and how long each of the currently occupied spaces have been occupied, and as a currently occupied space remains occupied for a longer period of time, the controller 118 provides increasing weight over time to the current temperature reported by the sensor that is in that currently occupied space. The controller 118 may be configured to control the HVAC system in order to drive the control temperature towards a temperature set point. In some cases, the HVAC system may be a non-zoned HVAC system.

In some cases, separate temperature and occupancy sensors may be provided in each space. In other cases, at least some of the plurality of sensors may not only report the current temperature but may also include an occupancy sensor to report an indication of occupancy to the HVAC controller 110. In some particular instances, each of the plurality of sensors may include a motion sensor, and thus each of the plurality of sensors may report an occupancy status in combination with a current temperature. As an illustrative example, the sensor 102a may provide an indication that the building space 102 is currently occupied. In some cases, the controller 118 may be configured to more heavily weight the current temperature reported by those of the plurality of sensors that are in currently occupied spaces relative to the current temperature reported by those of the plurality of sensors that are in currently unoccupied spaces.

In some cases, at least some of the plurality of sensors may include a priority ranking, and the controller 118 may be configured to weight the current temperatures reported by sensors of the plurality of sensors that are in currently occupied spaces in accordance with the priority ranking of those sensors. In some instances, the controller 118 may be configured to assign higher weights to the current temperatures reported by the sensors that have a higher priority ranking and to assign lower weights to the current temperatures reported by the sensors that have a lower priority ranking.

In some instances, the controller 118 may be operably coupled to the user interface 114, the sensor 120 (when provided) and the input 116. The sensor 120 may be a temperature sensor and/or an occupancy sensor. The controller 118 may be configured to control the HVAC system in accordance with a temperature set point and a control temperature in order to drive the control temperature towards the temperature set point. In some cases, to illustrate, the control temperature may be equal to the current temperature that is sensed by the sensor 120 when occupancy is not indicated in any of the spaces in which the one or more remote sensors are located. When occupancy is indicated, the control temperature may be equal to a blended value of the current temperature sensed by the sensor 120 and the current temperature provided by at least one of the remote sensors where occupancy is indicated in the space in which the particular sensor is located, and wherein the blended value is increasingly influenced by the current temperature provided by the at least one of the remote sensors with continued occupancy of the corresponding space.

In some cases, the controller 118 may limit, or cap, how far the blended value can deviate from the current temperature sensed by the sensor 120. The blended value may deviate further from the current temperature sensed by the sensor 120 with continued occupancy in the space in which the particular sensor is located up to the cap. In some cases, the cap may be user definable, and may be a set temperature delta, say 3 degrees, or 5 degrees, or 10 degrees. In some instances, the cap may instead be a particular percentage of the current temperature sensed by the sensor 120. For example, the cap may be determined as 5 percent, or perhaps 10 percent of the current temperature sensed by the sensor 120. If the current sensed temperature is 72 degrees, the cap may represent a departure of up to 3.6 degrees (5 percent) plus or minus, or even up to 7.2 degrees (10 percent) plus or minus from the current temperature sensed by the sensor 120. This is just an example.

In some instances, when at least some of the one or more remote sensors include a priority ranking, the blended value is influenced more going forward by the current temperature reported by a remote sensor that has a higher priority ranking and is in a currently occupied space than a remote sensor that has a lower priority ranking and is in a currently occupied space. In some cases, the blended value is a weighted average, and wherein a weight of the current temperature provided by at least one of the remote sensors is increased over time with continued occupancy in the space in which the particular sensor is located.

In some cases, the controller 118 may be configured to control an HVAC system servicing the space in order to drive the control temperature towards a temperature set point. The control temperature is influenced by the current temperature provided by at least one of the plurality of sensors where occupancy is indicated in the space in which the particular sensor is located, and wherein the control temperature is increasingly influenced over time with continued occupancy. In some cases, the controller 118 may be configured to track a relative priority rating for at least two of the plurality of sensors and to provide more weight to the current temperatures reported by those of the at least two of the plurality of sensors that have a higher relative priority rating and are in currently occupied spaces than those of the at least two of the plurality of sensors that have a lower relative priority rating and are in currently occupied spaces. In some cases, the controller 118 may be configured to provide less or no weight to the current temperatures reported by those of the plurality of sensors that are in currently unoccupied spaces.

Figure 5:
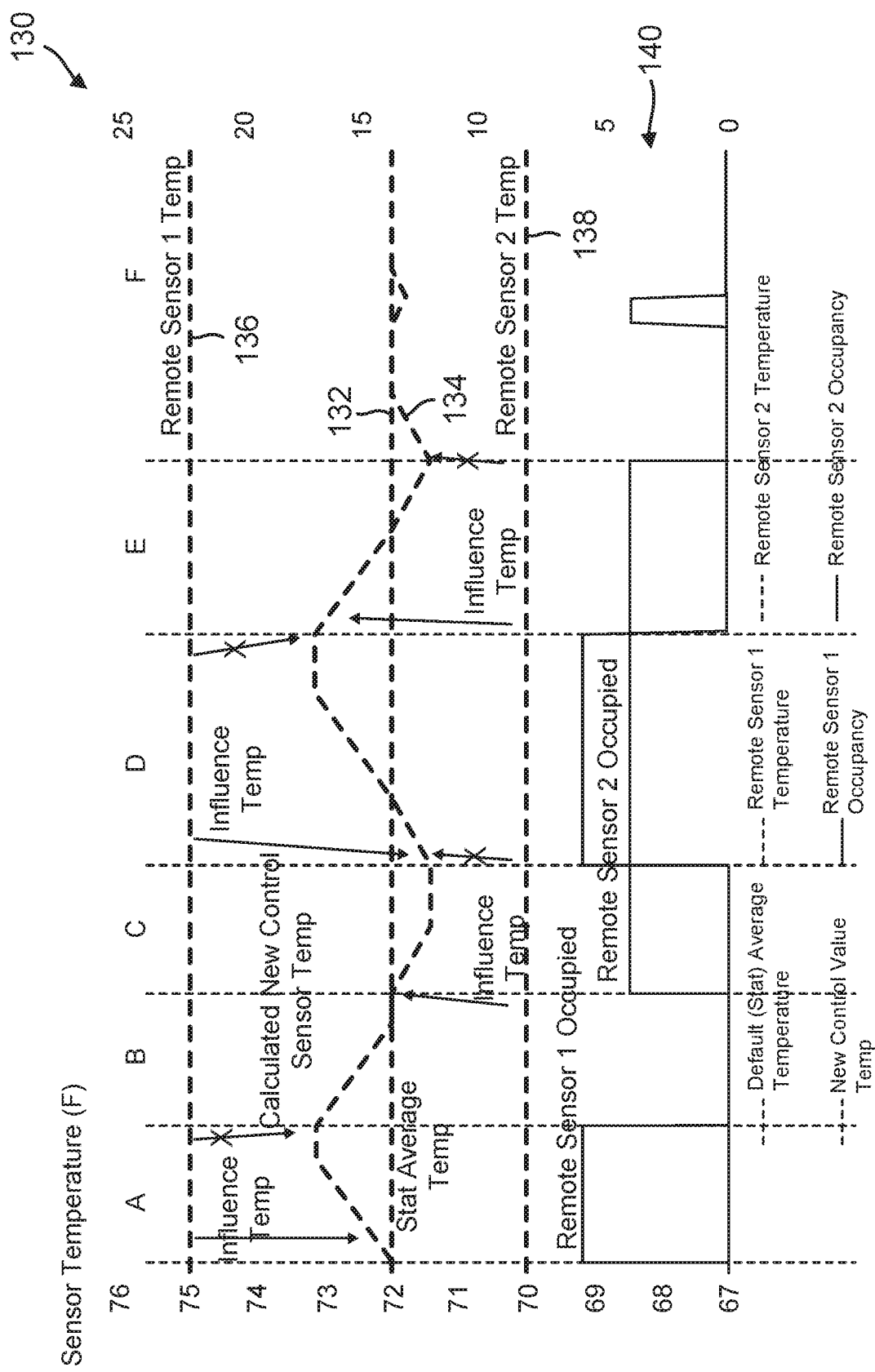
FIG. 5 is a timing chart showing an illustrative method of adjusting a control temperature of an HVAC system based on remote temperature and occupancy sensors.

FIG. 5 is a timing chart 130 showing an illustrative method of adjusting a control temperature of an HVAC system based on remote temperature and occupancy sensors. Temperatures are shown relative to the Y-axis, and time is shown relative to the X-axis. A plotted line 132 shows an average temperature as sensed by a temperature sensor (such as the sensor 120) within an HVAC controller, such as HVAC controller 110 of FIG. 4. In the given example, the average temperature is 72 degrees F. A plotted line 134 shows a control temperature, which is influenced by a remote sensor-1 temperature, which is plotted as a line 136, as well as by a remote sensor-2 temperature, which is plotted as a line 138. As illustrated, the remote sensor-1 is reporting a steady detected temperature of 75 degrees F. for the space in which the remote sensor-1 is located, and the remote sensor-2 is reporting a steady detected temperature of 70 degrees F. for the space in which the remote sensor-2 is located. Indications of occupancy reported by the remote sensor-1 and the remote sensor-2 are shown in a region 140 of the timing chart 130.

For illustrative purposes, the timing chart 130 is divided into time periods A, B, C, D, E and F. During time period A, it can be seen that the remote sensor-1 is reporting occupancy for the space in which the remote sensor-1 is located. Because the remote sensor-1 is reporting a current temperature (75 degrees) higher than that detected by the thermostat itself (72 degrees), the control temperature indicated by the plotted line 134 increases over time, such as perhaps over 10 minutes, 20 minutes, 30 minutes, or any other suitable time period, before reaching or approaching a cap of 73 degrees. During time period B, it can be seen that the remote sensor-1 is no longer reporting occupancy, as indicated within the region 140 of the timing chart 130. Accordingly, the control temperature indicated by the plotted line 134 decreases over time such as perhaps over 30 minutes, 60 minutes or any other suitable time period, before returning to, for example, a temperature where it matches the temperature (72 degrees) reported by the thermostat itself. During the time period C, it can be seen that the remote sensor-2 is now reporting occupancy. Because the remote sensor-2 is reporting a current temperature (70 degrees) that is lower than that detected by the thermostat itself (72 degrees), the control temperature indicated by the plotted line 134 decreases over time as shown.

At the start of the time period D, the remote sensor-1 and the remote sensor-2 are both reporting occupancy. Because in this example the remote sensor-1 is prioritized over the remote sensor-2, the control temperature indicated by the plotted line 134 increases over time, and eventually stabilizes at a temperature of 73 degrees (capped at 73 degrees in this example). At the start of the time period E, the remote sensor-2 continues to report occupancy while the remote sensor-2 does not. As a result, the control temperature indicated by the plotted line 134 decreases over time. At the end of the time period E, the remote sensor-2 is no longer reporting occupancy, so the control temperature indicated by the plotted line 134 returns to equal the temperature detected by the thermostat (indicated by the plotted line 132). A small blip in the control temperature can be seen during the time period F, as a result of a brief indication of occupancy by the remote sensor-2. This is a simple example, with only two remote sensors, and one sensor clearly having priority over the other sensor. It will be appreciated that an HVAC control system may have many more than two remote sensors, and that there may be a more complicated priority relationship between the multiple sensors. In some cases, the control temperature may not have a cap, and the controller 118 determines the control temperature merely using a weighted average of two or more different sensors. In some instances, the weighting may be a function of a relative priority assigned to one or more of the two or more different sensors. In some instances, the control temperature may also be capped.

Figure 6:
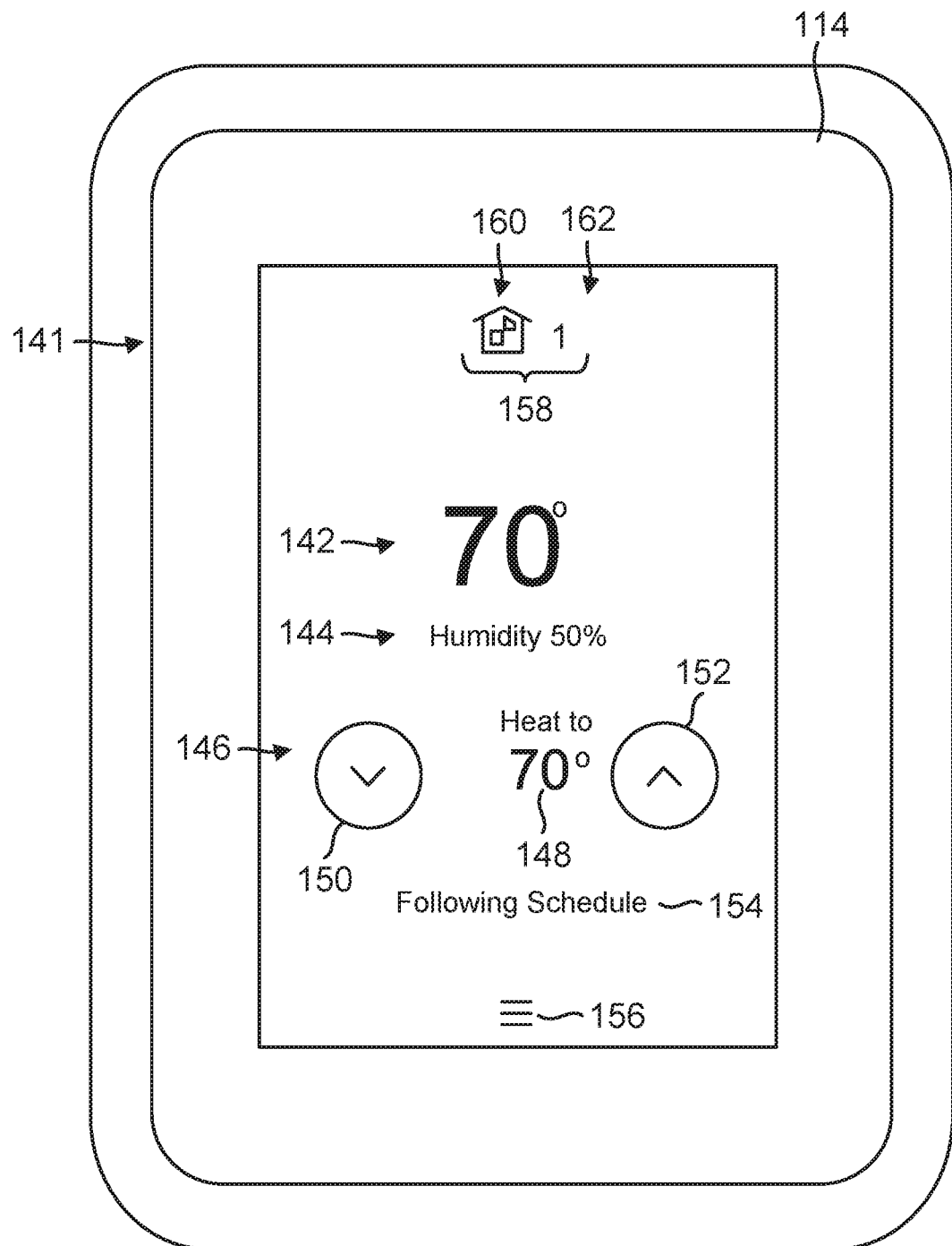
FIGS. 6 through 9 are illustrative screens that may be displayed on the user interface of the HVAC controller of FIG. 4 with respect to remote sensor utilization.

Returning to FIG. 4, in some cases the controller 118 may be configured to display one or more screens on the user interface 114 that include a home screen. With reference to FIG. 6, the home screen may include a selectable display element 158 that indicates a number of the plurality of sensors that are currently being used by the controller 118 in controlling the HVAC system. Upon selection by a user of the selectable display element 158 on the home screen, and with reference to FIG. 7, the controller 118 may be configured to display a sensor priority screen that includes a plurality of graphic constructs. Each graphic construct identifies one of the different spaces in the building structure and displays a current temperature reported by the corresponding sensor in that space. In some cases, a user is permitted to scroll through the plurality of graphic constructs on the sensor priority screen, particularly if there are more graphic constructs than will easily fit on the user interface 114 at one time.

In some instances, each of the graphic constructs may identify one of the different spaces in the building structure, display a current temperature for that space and display a current occupancy status for that space. In some cases, at least some of the graphic constructs may include an indication of whether any of the different spaces in the building structure are currently calling for HVAC system activation, for example. In some instances, at least some of the graphic constructs also include an indication of which of the different spaces in the building structure have been designated as priority spaces, meaning that the current temperatures for those spaces are currently being used by the controller 118 in controlling the HVAC system.

The sensor priority screen also designates which of the graphic constructs correspond to each of the number of the plurality of sensors that are currently being used by the controller 118 in controlling the HVAC system. For example, in some instances, the controller 118 may highlight the graphic constructs to indicate which of the plurality of sensors are currently being used by the controller 118 in controlling the HVAC system. In some cases, at least some of the plurality of graphic constructs also include an indication of whether each of the different spaces are currently occupied. The controller 118 is configured to control the HVAC system in accordance with the current temperature reported by each of the number of the plurality of sensors that are currently being used by the controller 118 in controlling the HVAC system.

In some instances, at least some of the plurality of sensors provide an indication of occupancy to the HVAC controller 110, and the current temperatures reported by the plurality of sensors that correspond to the occupied spaces are used by the HVAC controller 110 in controlling the HVAC system. At least some of the different spaces in the building structure may be designated as priority spaces regardless of current occupancy status of the different spaces. In some cases, each of the plurality of graphic constructs include an alphanumeric description that identifies the corresponding space. The HVAC controller 110 may repeatedly receive updated current temperatures from the plurality of sensors and may be configured to refresh each graphic construct as updates are received.

In some cases, the controller 118 may be configured to display the plurality of graphic constructs on the user interface 114 in either of a first mode or a second mode, where the first mode and the second mode are user selectable via the user interface 114. In some cases, the user may be allowed to select which spaces are designated as selected spaces in the first mode (see FIG. 7). At least some of the selected spaces may be spaced that are designated to be priority spaces.

In some instances, and in the first mode, each graphic construct identifies one of the different spaces in the building structure and displays a current temperature reported by the corresponding sensor, and may also designate whether the corresponding space is currently selected for use by the controller 118 in controlling the HVAC system. In some instances, and in the second mode (see FIG. 9), each graphic construct identifies one of the different spaces in the building structure and displays a current temperature reported by the corresponding sensor, and wherein in the second mode, at least some of the spaces reporting a current occupancy status of occupied will be used by the controller in controlling the HVAC system. The controller 118 may, for example, be configured to control the HVAC system using the current temperature reported by the sensors in the spaces that are a current occupancy status of occupied, sometimes regardless of whether the sensors are selected as priority sensors by the user.

FIGS. 6 through 9 are screen captures illustrating screens that may be displayed on the user interface 114 of the HVAC controller 110. FIG. 6 shows a screen 141 that may be displayed on the user interface 114. In some cases, the screen 141 may be considered as being a home screen. The current temperature is 70 degrees, as indicated by a current temperature icon 142. The current humidity is 50 percent, as indicated by a current humidity icon 144. The system is currently in heating mode, as indicated by a mode graphic 146, which includes a current set point icon 148, a down arrow 150 for decreasing the set point and an up arrow 152 for increasing the set point. A schedule icon 154 indicates that the HVAC controller 110 is currently following a programmed schedule. A menu button 156 provides additional functionality, as will be discussed subsequently.

The screen 141 includes a selectable display element 158 that includes an icon 160 that indicates whether the controller 118 is controlling the HVAC system in accordance with one or more remote sensors that have been indicated as having priority ranking (e.g. first mode), or in accordance with one or more sensors indicating that particular rooms are occupied (e.g. second mode). The selectable display element 158 also includes an icon 162 that indicates how many remote sensors are currently being relied upon in controlling the HVAC system. As illustrated in FIG. 6, the HVAC controller 110 is using one remote sensor (indicated by the icon 162) and is controlling in accordance with a priority ranking (e.g. first mode, indicated by the icon 160). Selecting the selectable display element 158 in FIG. 6 will cause the HVAC controller 110 to display a priority screen 170, as shown for example in FIG. 7.

Figure 7:
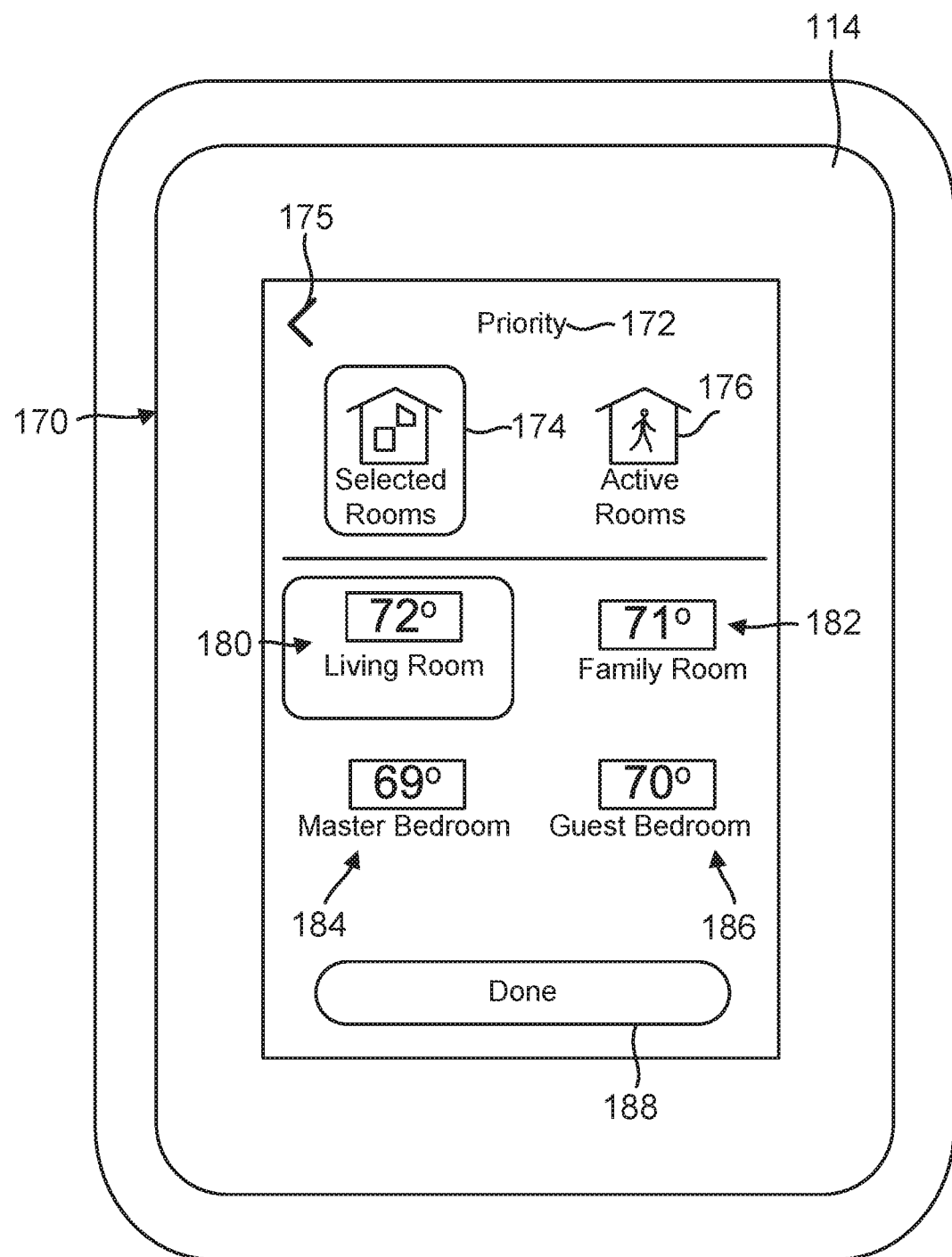

FIG. 7 shows the priority screen 170 displayed on the user interface 114 of the HVAC controller 110. This is easily identified as the priority screen 170 by the PRIORITY indicia 172 displayed near the top. A BACK arrow 175 allows the user to return to the previous screen, if desired. The illustrative priority screen 170 includes a Selected Rooms icon 174 and an Active Rooms icon 176. The Selected Rooms icon 174 is highlighted, indicating that the HVAC controller 110 is controlling in accordance with one or more selected sensors (e.g. first mode). As illustrated in FIG. 6, it is only a single sensor in this particular example. The priority screen 170 includes graphic constructs representing each room that has a remote sensor. As illustrated, there is a Living Room graphic construct 180, which is highlighted, a Family Room graphic construct 182, a Master Bedroom graphic construct 184 and a Guest Bedroom graphic construct 186. As can be seen, each of the graphic constructs 180, 182, 184, 186 include indicia identifying which building space each corresponding sensor is located in. In some cases, as illustrated, each of the graphic constructs 180, 182, 184, 186 also display a current temperature value being reported to the HVAC controller 110 from each of the remote temperature sensors. In some cases, the graphic constructs 180, 182, 184, 186 may also display a current occupancy status of the corresponding building space. A DONE button 188, when selected, instructs the HVAC controller 110 to return to a previous menu level.

Figure 8:
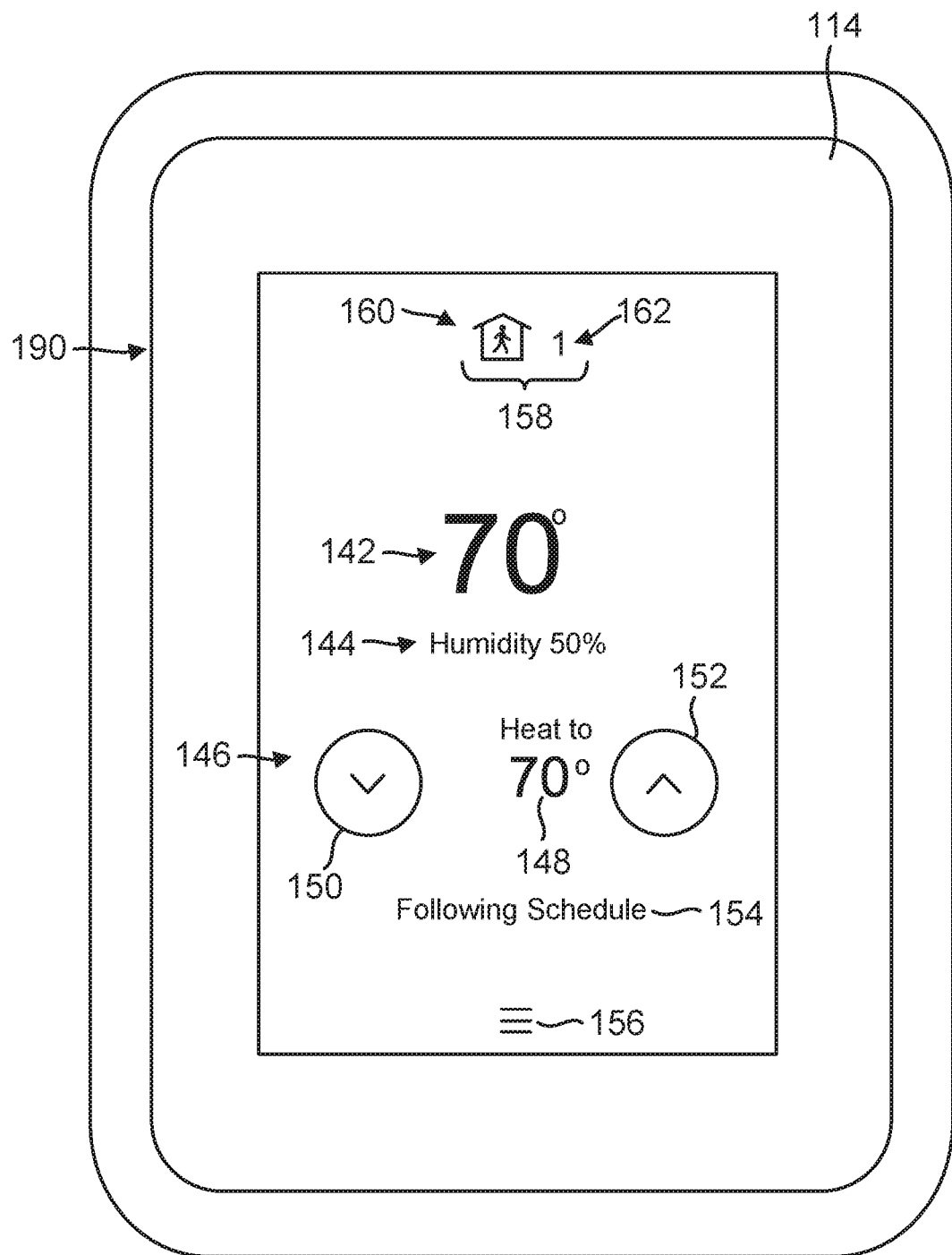
Figure 9:
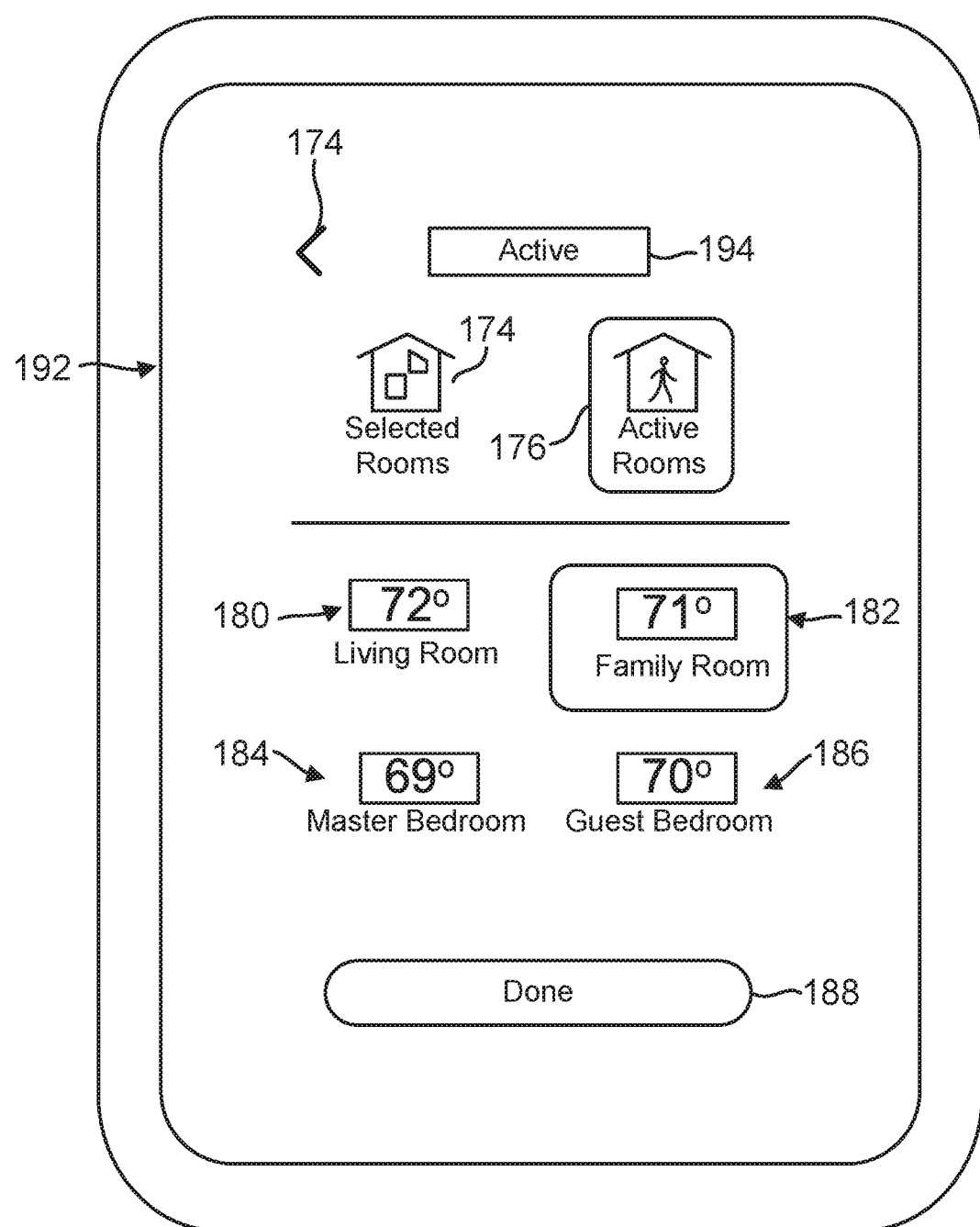

FIGS. 8 and 9 are similar to FIGS. 6 and 7, but provide examples of screens that may be displayed by the HVAC controller 110 when the HVAC controller 110 is controlling with respect to which room or rooms are active or occupied (e.g. second mode), as opposed to which rooms have been designated as having priority (e.g. first mode). FIG. 8 shows a screen 190 that may be considered as being a home screen. The selectable display element 158 shows that the HVAC controller 110 is controlling with respect to active rooms, as indicated by the icon 160, and that there is one active room that is dictating control of the HVAC controller 110, as indicated by the icon 162. In FIG. 9, it can be seen that it is the sensor in the family room that is currently providing an occupied or active status, and thus it is the temperature of 71 degrees reported by that particular sensor that is being used in controlling operation of the HVAC system.

Returning to FIG. 4, in some cases the controller 118 may be configured to be an AUTOCHANGEOVER mode, where the controller 118 automatically changes between a HEAT mode and a COOL mode in accordance with a sensed temperature in the building structure, a HEAT temperature set point and a COOL temperature set point. This means that there may be a HEAT temperature set point and a COOL temperature set point both active at the same time. If a sensed temperature within the building structure drops below the HEAT temperature set point, and beyond a hysteresis factor, the controller 118 will turn on the heat to control to the HEAT temperature set point. If a sensed temperature within the building structure increases above the COOL temperature set point, and beyond a hysteresis factor, the controller 118 will turn on the air conditioning or other cooling apparatus to control to the COOL temperature set point. In some cases, spring and fall days may provide examples of when the heat and the air conditioning may legitimately both be used in the course of a single day. An overnight temperature may be low enough to justify turning on the heat. As the day heats up, the internal temperature of the building structure may increase to a point that cooling is justified.

In this, it will be appreciated that the COOL temperature set point must be higher than the HEAT temperature set point. In many cases, there is a minimum temperature difference, referred to as a deadband, that is enforced between the HEAT temperature set point and the COOL temperature set point. The deadband may be user-selectable and/or installer-selectable. In some instances, the deadband may be factory-programmable. In a particular example, the deadband may be 2 degrees or 3 degrees. It will be appreciated that if the system is in an AUTOCHANGEOVER mode, in which the controller 118 may be configured to automatically change between a HEAT mode and a COOL mode in accordance with a sensed temperature in the building structure, there can be difficulties if a user tries to adjust the HEAT temperature set point upwards too close to the COOL temperature set point, or if the user tries to adjust the COOL temperature set point downwards too close to the HEAT temperature set point.

The controller 118 is configured to display one or more screens on the user interface displaying the HEAT temperature set point and the COOL temperature set point and allowing a user to change the HEAT temperature set point and/or the COOL temperature set point. The controller 118 is configured to enforce a minimum DEADBAND between the HEAT temperature set point and the COOL temperature set point when the user adjusts one of the HEAT temperature set point and the COOL temperature set point towards the other of the HEAT temperature set point and the COOL temperature set point to an extent that would violate the minimum DEADBAND by automatically adjusting the other of the HEAT temperature set point and the COOL temperature set point from an original setting to maintain the minimum DEADBAND. When the user subsequently adjusts the one of the HEAT temperature set point and the COOL temperature set point back away from the other of the HEAT temperature set point and the COOL temperature set point after the controller 118 has adjusted the other of the HEAT temperature set point and the COOL temperature set point, the controller 118 may also adjust the other of the HEAT temperature set point and the COOL temperature set point back in order to maintain the minimum DEADBAND until the other of the HEAT temperature set point and the COOL temperature set point reaches its original setting.

In some cases, the controller 118 is configured to display a HEAT temperature set point icon that includes a numeric representation of the HEAT temperature set point and a COOL temperature set point icon that includes a numeric representation of the COOL temperature set point. In response to the user selecting one of the HEAT temperature set point icon and the COOL temperature set point icon, the controller 118 may display the selected temperature set point and an UP arrow and a DOWN arrow (or a rotary dial or knob, slider button, etc.) that can be used to raise or lower the selected temperature set point. In some instances, the controller 118 is configured to display the HEAT temperature set point and the COOL temperature set point on a graphical representation of a relationship between the HEAT temperature set point and the COOL temperature set point (see, for example, FIG. 14A-14D). The controller 118 may then move the displayed HEAT temperature set point and the COOL temperature set point on the graphical representation in response to the user adjusting one of the HEAT temperature set point and the COOL temperature set point and/or in response to the controller 118 automatically adjusting the other of the HEAT temperature set point and the COOL temperature set point in order to maintain the minimum DEADBAND. In some instances, when the controller 118 automatically adjusts the other of the HEAT temperature set point and the COOL temperature set point from the original setting to maintain the minimum DEADBAND, the controller 118 may display an alphanumeric message informing the user why the controller 118 has adjusted the other of the HEAT temperature set point and the COOL temperature set point.

In some instances, the user must subsequently adjust the one of the HEAT temperature set point and the COOL temperature set point back away from the other of the HEAT temperature set point and the COOL temperature set point within a predetermined time window after the controller 118 has adjusted the other of the HEAT temperature set point and the COOL temperature set point in order for the controller 118 to also re-adjust the other of the HEAT temperature set point and the COOL temperature set point back in order to maintain the minimum DEADBAND until the other of the HEAT temperature set point and the COOL temperature set point reaches its original setting. This can be considered a re-adjustment time out feature.

Figure 10:
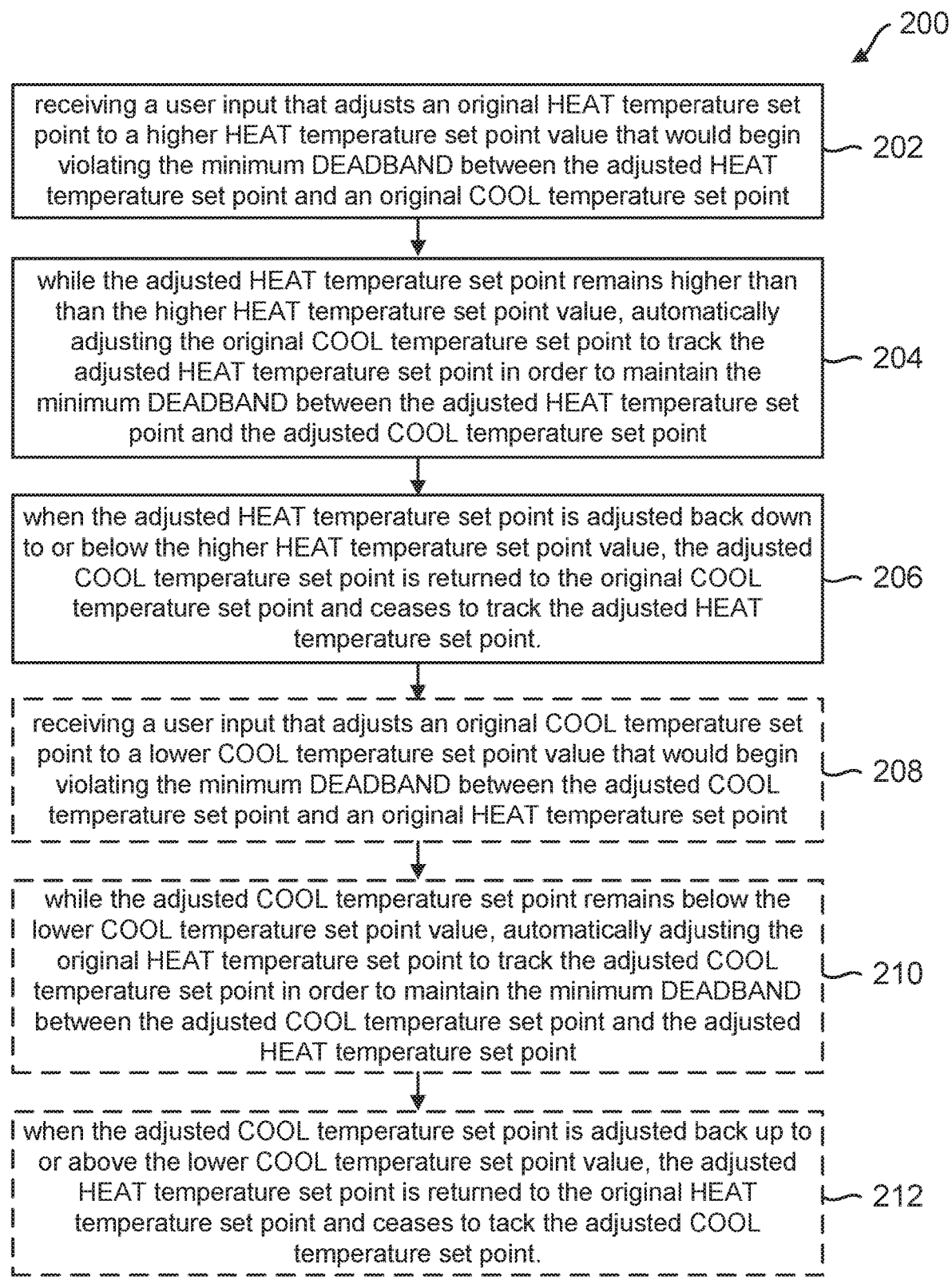
FIGS. 10 through 13 are flow diagrams illustrating methods that may be carried out by the HVAC controller of FIG. 4 to help enforce a deadband between a HEAT temperature set point and a COOL temperature set point.

FIG. 10 is a flow diagram showing an illustrative method 200 for enforcing a minimum DEADBAND between a HEAT temperature set point and a COOL temperature set point in an AUTOCHANGEOVER mode of a Heating, Cooling and Ventilation (HVAC) controller. As indicated at block 202, a user input is received that adjusts an original HEAT temperature set point to a higher HEAT temperature set point value that would begin violating the minimum DEADBAND between the adjusted HEAT temperature set point and an original COOL temperature set point. As indicated at block 204, and while the adjusted HEAT temperature set point remains higher than the higher HEAT temperature set point value, the original COOL temperature set point is automatically adjusted to track the adjusted HEAT temperature set point in order to maintain the minimum DEADBAND between the adjusted HEAT temperature set point and the adjusted COOL temperature set point. When the adjusted HEAT temperature set point is adjusted back down to or below the higher HEAT temperature set point value, the adjusted COOL temperature set point is returned to the original COOL temperature set point and ceases to track the adjusted HEAT temperature set point, as indicated at block 206.

In some cases, and as optionally indicated at block 208, a user input is received that adjusts an original COOL temperature set point to a lower COOL temperature set point value that would begin violating the minimum DEADBAND between the adjusted COOL temperature set point and an original HEAT temperature set point. As indicated at block 210 and while the adjusted COOL temperature set point remains below the lower COOL temperature set point value, the original HEAT temperature set point is automatically adjusted to track the adjusted COOL temperature set point in order to maintain the minimum DEADBAND between the adjusted COOL temperature set point and the adjusted HEAT temperature set point. When the adjusted COOL temperature set point is adjusted back up to or above the lower COOL temperature set point value, and as indicated at block 212, the adjusted HEAT temperature set point is returned to the original HEAT temperature set point and ceases to track the adjusted COOL temperature set point.

Figure 11:
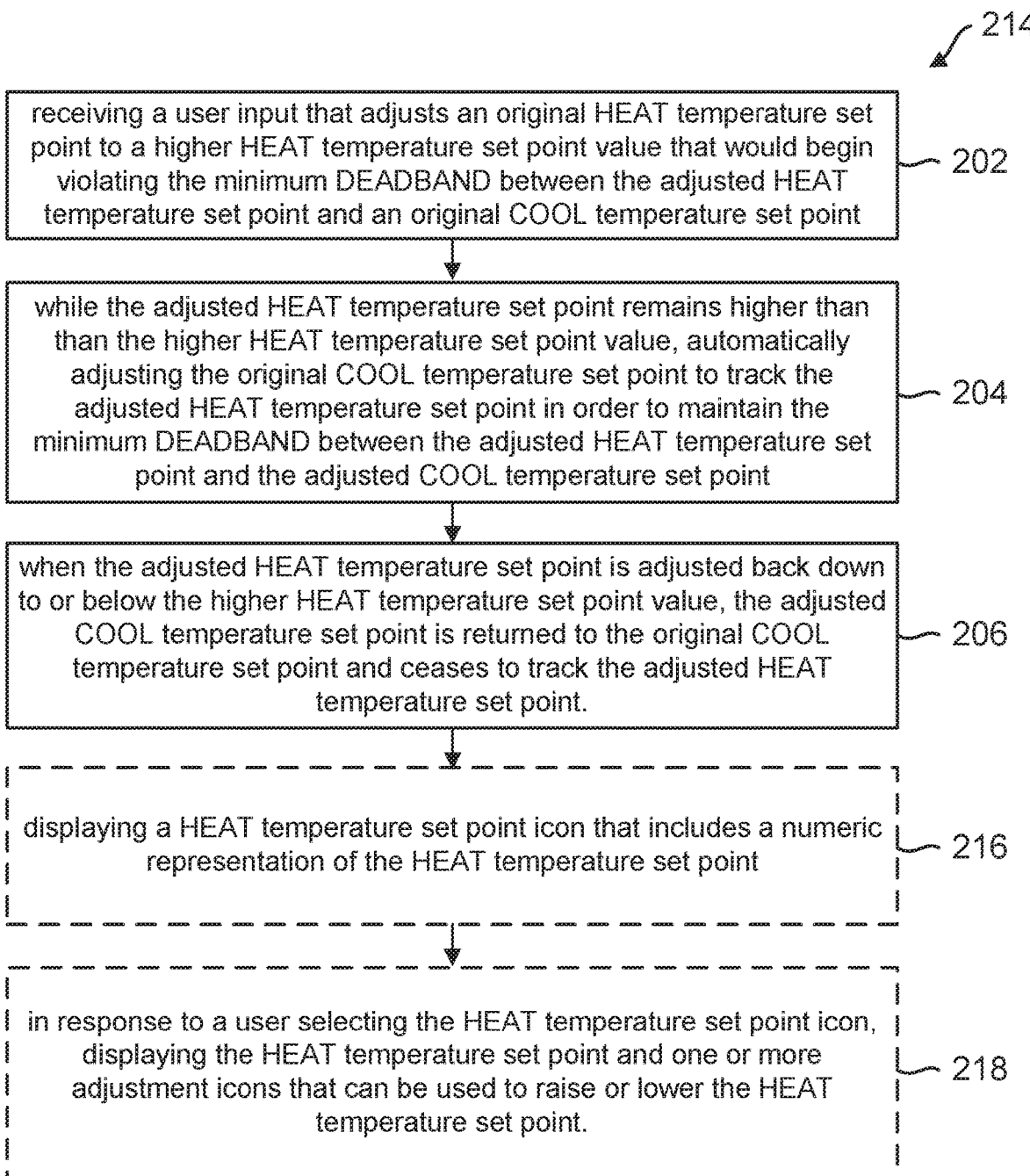

FIG. 11 is a flow diagram showing an illustrative method 214 for enforcing a minimum DEADBAND between a HEAT temperature set point and a COOL temperature set point in an AUTOCHANGEOVER mode of a Heating, Cooling and Ventilation (HVAC) controller. As indicated at block 202, a user input is received that adjusts an original HEAT temperature set point to a higher HEAT temperature set point value that would begin violating the minimum DEADBAND between the adjusted HEAT temperature set point and an original COOL temperature set point. As indicated at block 204, and while the adjusted HEAT temperature set point remains higher than the higher HEAT temperature set point value, the original COOL temperature set point is automatically adjusted to track the adjusted HEAT temperature set point in order to maintain the minimum DEADBAND between the adjusted HEAT temperature set point and the adjusted COOL temperature set point. When the adjusted HEAT temperature set point is adjusted back down to or below the higher HEAT temperature set point value, the adjusted COOL temperature set point is returned to the original COOL temperature set point and ceases to track the adjusted HEAT temperature set point, as indicated at block 206.

In some cases, and as optionally indicated at block 216, a HEAT temperature set point icon may be displayed that includes a numeric representation of the HEAT temperature set point. In response to a user selecting the HEAT temperature set point icon, and as indicated at block 218, the HEAT temperature set point and one or more adjustment icons may be displayed that can be used to raise or lower the HEAT temperature set point.

Figure 12:
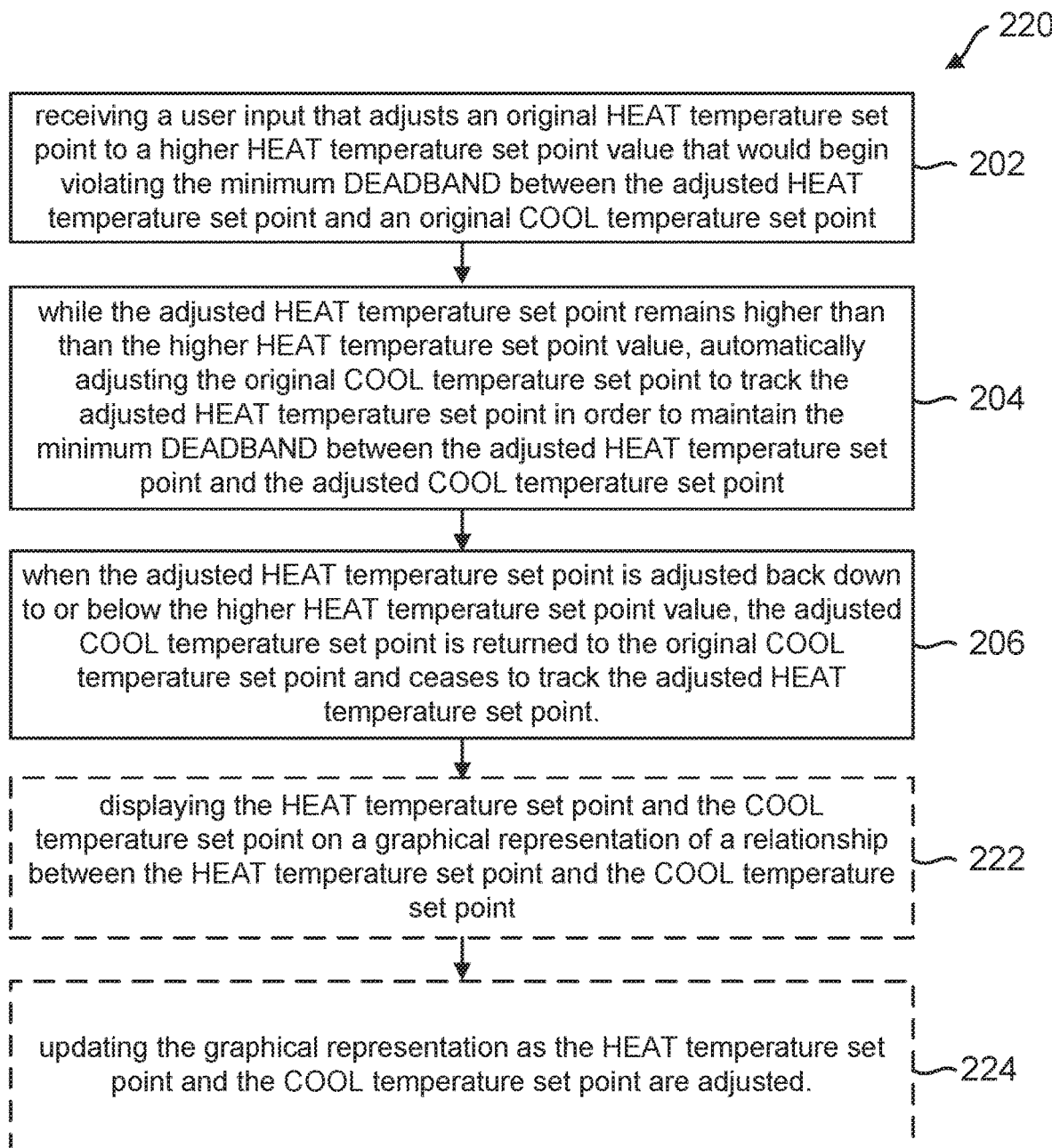

FIG. 12 is a flow diagram showing an illustrative method 220 for enforcing a minimum DEADBAND between a HEAT temperature set point and a COOL temperature set point in an AUTOCHANGEOVER mode of a Heating, Cooling and Ventilation (HVAC) controller. As indicated at block 202, a user input is received that adjusts an original HEAT temperature set point to a higher HEAT temperature set point value that would begin violating the minimum DEADBAND between the adjusted HEAT temperature set point and an original COOL temperature set point. As indicated at block 204, and while the adjusted HEAT temperature set point remains higher than the higher HEAT temperature set point value, the original COOL temperature set point is automatically adjusted to track the adjusted HEAT temperature set point in order to maintain the minimum DEADBAND between the adjusted HEAT temperature set point and the adjusted COOL temperature set point. When the adjusted HEAT temperature set point is adjusted back down to or below the higher HEAT temperature set point value, the adjusted COOL temperature set point is returned to the original COOL temperature set point and ceases to track the adjusted HEAT temperature set point, as indicated at block 206.

In some cases, and as optionally indicated at block 222, the HEAT temperature set point and the COOL temperature set point may be displayed on a graphical representation of a relationship between the HEAT temperature set point and the COOL temperature set point. As indicated at block 224, the graphical representation may be updated as the HEAT temperature set point and the COOL temperature set point are adjusted.

Figure 13:
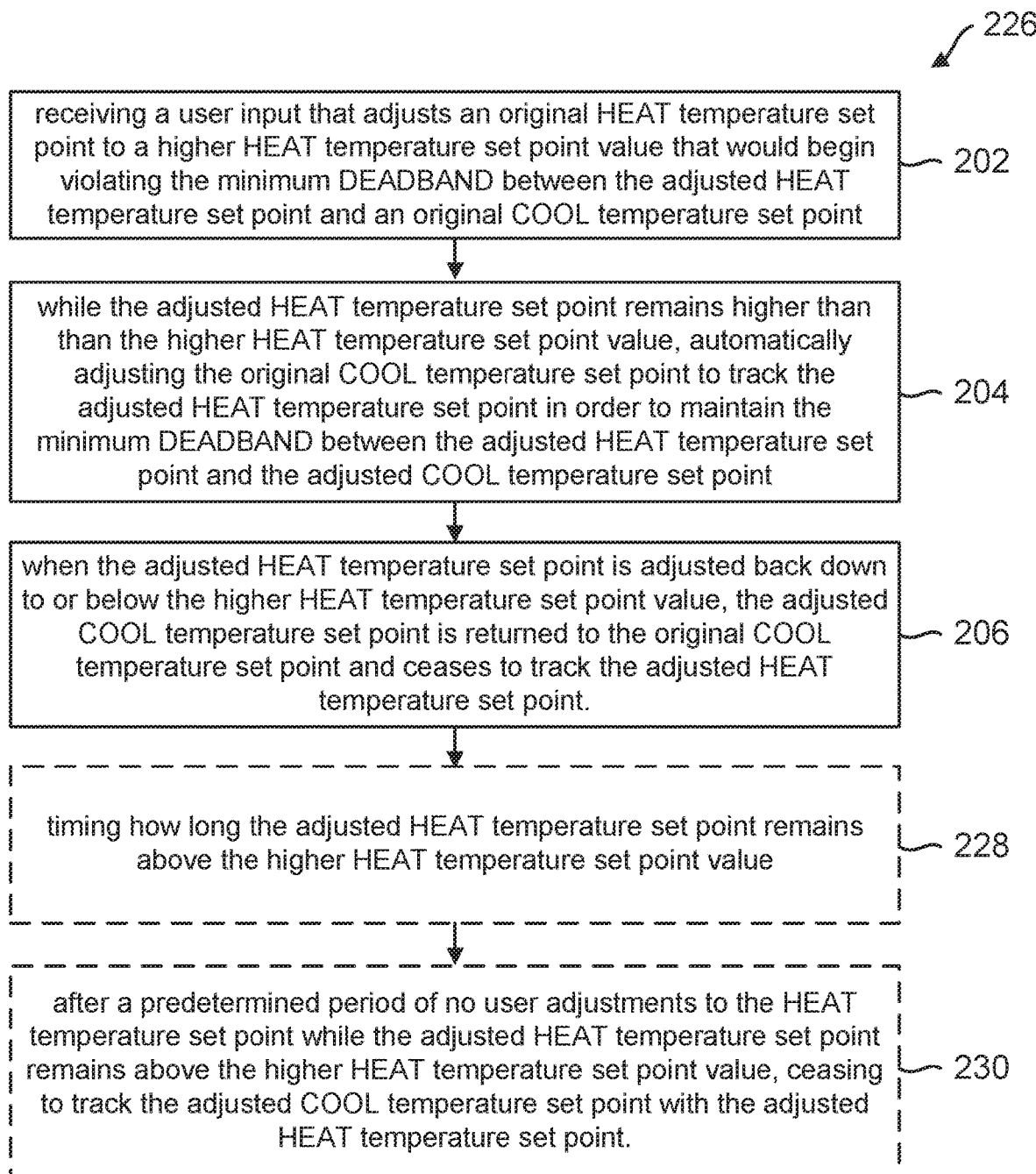

FIG. 13 is a flow diagram showing an illustrative method 226 for enforcing a minimum DEADBAND between a HEAT temperature set point and a COOL temperature set point in an AUTOCHANGEOVER mode of a Heating, Cooling and Ventilation (HVAC) controller. As indicated at block 202, a user input is received that adjusts an original HEAT temperature set point to a higher HEAT temperature set point value that would begin violating the minimum DEADBAND between the adjusted HEAT temperature set point and an original COOL temperature set point. As indicated at block 204, and while the adjusted HEAT temperature set point remains higher than the higher HEAT temperature set point value, the original COOL temperature set point is automatically adjusted to track the adjusted HEAT temperature set point in order to maintain the minimum DEADBAND between the adjusted HEAT temperature set point and the adjusted COOL temperature set point. When the adjusted HEAT temperature set point is adjusted back down to or below the higher HEAT temperature set point value, the adjusted COOL temperature set point is returned to the original COOL temperature set point and ceases to track the adjusted HEAT temperature set point, as indicated at block 206.

In some cases, and as optionally indicated at block 228, the method includes timing how long the adjusted HEAT temperature set point remains above the higher HEAT temperature set point value. After a predetermined period of no user adjustments to the HEAT temperature set point while the adjusted HEAT temperature set point remains above the higher HEAT temperature set point value, and as indicated at block 230, the method includes ceasing to track the adjusted COOL temperature set point with the adjusted HEAT temperature set point when the adjusted HEAT temperature set point is adjusted back down below the higher HEAT temperature set point value.

Figures 14A, 14B, 14C, 14D:
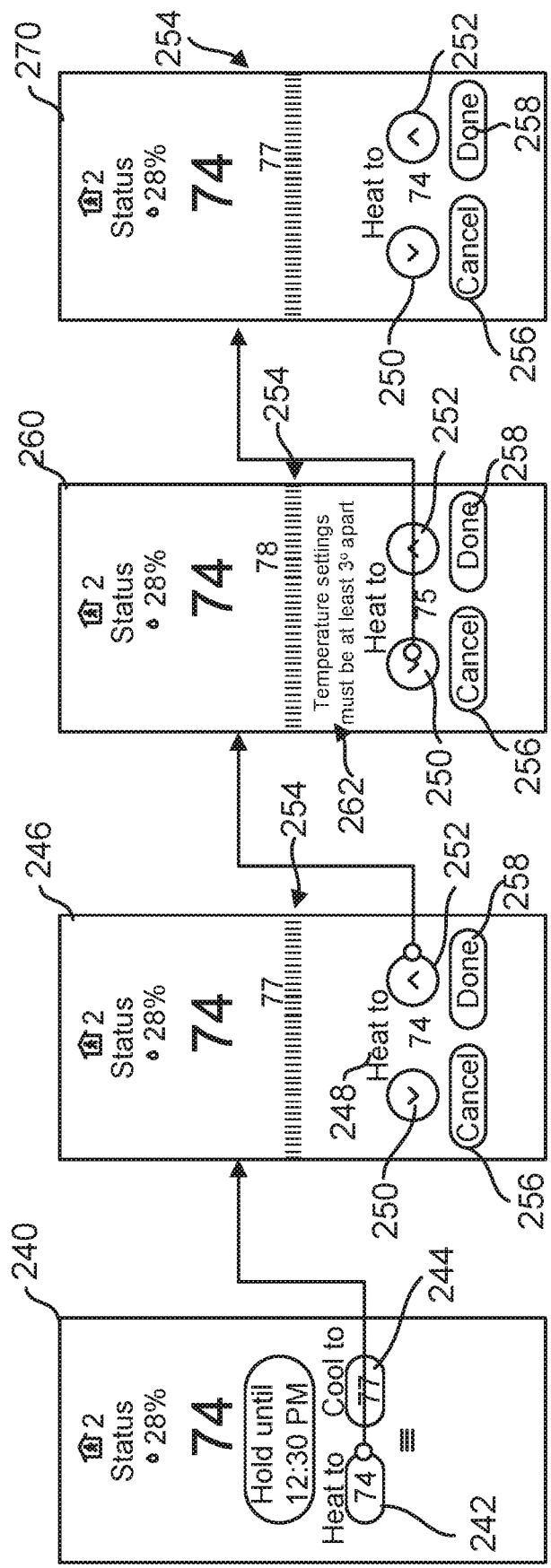
FIGS. 14A through 14D are illustrative screens that may be displayed on the user interface of the HVAC controller of FIG. 4 with respect to enforcing a deadband between a HEAT temperature set point and a COOL temperature set point.

FIGS. 14A through 14D provide an illustration of how the controller 118 may permit a user to adjust the HEAT temperature set point while maintaining a minimum DEADBAND. While FIGS. 14A through 14D show the user adjusting the HEAT temperature set point, the user may adjust the COOL temperature set point in a similar fashion. In FIG. 14A, the controller 118 is displaying a home screen 240. In this particular example, it can be seen that the controller 118 is controlling the HVAC system in accordance with temperature values provided by two remote temperature sensors that are both in rooms currently indicated to be occupied. The current temperature is 74 degrees, the humidity is at 28 percent, and the controller 118 is operating in accordance with a time period that ends at 12:30 pm that day. The home screen 240 includes a HEAT temperature set point icon 242 indicating that the HEAT temperature set point is 74 degrees and a COOL temperature set point icon 244 indicating that the COOL temperature set point is 77 degrees. For this example, it will be appreciated that the minimum DEADBAND has been set equal to 3 degrees. As an example, selecting the HEAT temperature set point icon 242 causes the controller 118 to display a screen 246 as shown in FIG. 14B.

As seen in FIG. 14B, the screen 246 includes a current HEAT temperature set point icon 248 as well as a down arrow 250 and an up arrow 252 that may be used to adjust the current HEAT temperature set point. The screen 246 also includes a graphical representation 254 of a relationship between the HEAT temperature set point and the COOL temperature set point. As illustrated, the current HEAT temperature set point is displayed on the graphical representation 254 as a bolded or highlighted line while the current COOL temperature set point is indicated both by bolded or highlighted line as well as a numerical display of the current COOL temperature set point. The screen 246 also includes a CANCEL button 256 that cancels the change to the HEAT temperature set point as well as a DONE button 258 that tells the controller 118 that the user has completed their intended change to the HEAT temperature set point. Hitting the up arrow 252 on the screen 246 causes the controller 118 to display a screen 260 as shown in FIG. 14C.

As seen in FIG. 14C, the screen 260 shows what happens when the user attempts to violate the DEADBAND. As previously noted, in this example the minimum DEADBAND is 3 degrees. By increasing the HEAT temperature set point from 74 degrees to 75 degrees, the controller 118 automatically increased the COOL temperature set point from 77 degrees to 78 degrees in order to preserve the 3 degree minimum DEADBAND. The controller 118 also displays an alphanumeric message 262, directly beneath the graphical representation 254, informing the user of the minimum DEADBAND requirement. If the user were to select the DONE button 258 at this point, the new HEAT temperature set point would be 75 degrees and the new COOL temperature set point would be 78 degrees.

However, if the user selects the down arrow 250, as indicated, the controller 118 will display a screen 270 as shown in FIG. 14D. As can be seen, since the user reduced the HEAT temperature set point back to 74 degrees, the controller 118 was able to automatically return the COOL temperature set point back to its original 77 degree setting. If the user were to further reduce the HEAT temperature set point, the COOL temperature set point would remain at its original COOL temperature set point of 77 degrees.

FIG. 15 is a schematic block diagram of an illustrative HVAC controller 280 for controlling an HVAC system within a building structure. The illustrative HVAC controller 280 includes a housing 282 and a user interface 284 that is accessible from an exterior of the housing 282. A controller 286 is operably coupled to the user interface 284 and is configured to display a HOME screen on the user interface 284. In this example, the HOME screen provides the user with current system operating information as well as enables the user to access a hierarchical menu structure for viewing and/or editing one or more settings of the HVAC controller 280. In some cases, the hierarchical menu structure includes a plurality of menu branches each having two or more hierarchical menu levels with a leaf menu at the bottom of each branch. For a first group of the leaf menus, the user must navigate "back" through at least some of the hierarchical menu structure to return to the HOME screen, or wait for a timeout period to expire which then automatically returns to the HOME screen. For a second group of the leaf menus, the user is returned to the HOME screen (or some other screen other than the next higher menu in the hierarchical menu structure) after the user indicates the user is done with the leaf menu, without having to wait for the timeout period.

In some cases, the second group of the leaf menus includes a leaf menu for changing a system mode of the HVAC controller 280. In some instances, the second group of the leaf menus includes a leaf menu for changing a fan mode of the HVAC controller 280. The second group of the leaf menus may include a leaf menu for changing a sensor priority of the HVAC controller 280. The second group of the leaf menus may include a leaf menu for changing a humidity setting of the HVAC controller 280. In some cases, the second group of the leaf menus includes a leaf menu for changing a ventilation setting of the HVAC controller 280.

In some cases, at least some of the second group of leaf menus include a first icon that the user can select to indicate the user is done with the leaf menu, and in response to the user selecting the first icon, the controller 286 reverts back to the HOME screen as well as a second icon that the user can select to indicate the user is done with the leaf menu, and in response to the user selecting the second icon, the controller 286 reverts to a MENU screen just below the HOME screen in the hierarchical menu structure.

The first group of the leaf menus may include a leaf menu for changing one or more system management parameters, wherein the one or more system management parameters include one or more of device and sensor settings, thermostat information settings, equipment status settings, dehumidification away mode settings, and dealer information. In some cases, the first group of the leaf menus may include a leaf menu for changing one or more system configuration parameters, wherein the one or more system configuration parameters include one or more of security settings, preferences and installer options. At least some of the first group of the leaf menus may include a BACK icon for navigating to a next higher menu in the hierarchical menu structure. In some cases, at least some of the first group of the leaf menus includes an icon that the user can select to indicate the user is done with the leaf menu, and in response to the user selecting the icon, the controller 286 reverts to a MENU screen just below the HOME screen in the hierarchical menu structure.

In some cases, the HOME Screen includes a MENU icon. In response to the user selecting the MENU icon, the controller 286 is configured to display a MENU screen on the user interface 284, the MENU screen may include a plurality of items that can be selected by the user in order to change one or more settings pertaining to the selected item, where the controller 286 uses the one or more settings in controlling one or more features of the HVAC system. In some cases, the one or more settings pertain to one or more of mode settings, fan settings, priority settings, schedule settings, weather settings, humidification settings, dehumidification settings and ventilation settings.

In response to the user selecting an item on the MENU screen, the controller 286 is configured to display one or more sub-menu screens on the user interface 284 that solicit the user to enter and/or change one or more settings that pertain to the selected item. When the user has indicated that they have completed entering and/or changing the one or more settings that pertain to the selected item, typically on a leaf menu in the hierarchical menu structure, the controller 286 is configured to revert to displaying the HOME screen, which is at the top of the hierarchical menu structure. In some cases, the user indicates that they have completed entering and/or changing the one or more settings that pertain to the selected item by selecting an icon such as a DONE icon that is displayed on the one or more menu screens. When the user decides not to enter or change any of the one or more settings that pertain to the selected item, the user can instruct the controller 286 to revert to the MENU screen, such as by selecting a RETURN icon. Alternatively, after the user has entered and/or changed the one or more settings that pertain to the selected item, and the user has selected the RETURN icon, the controller 286 is configured to revert to the MENU screen. In some cases, in response to the user selecting at least one other item on the MENU screen, the controller 286 is configured to display one or more menu screens on the user interface 284 that solicit the user to enter and/or change one or more settings that pertain to the selected item, where the one or more menu screens do not include a DONE icon that would revert directly to the HOME screen.

Figure 16:
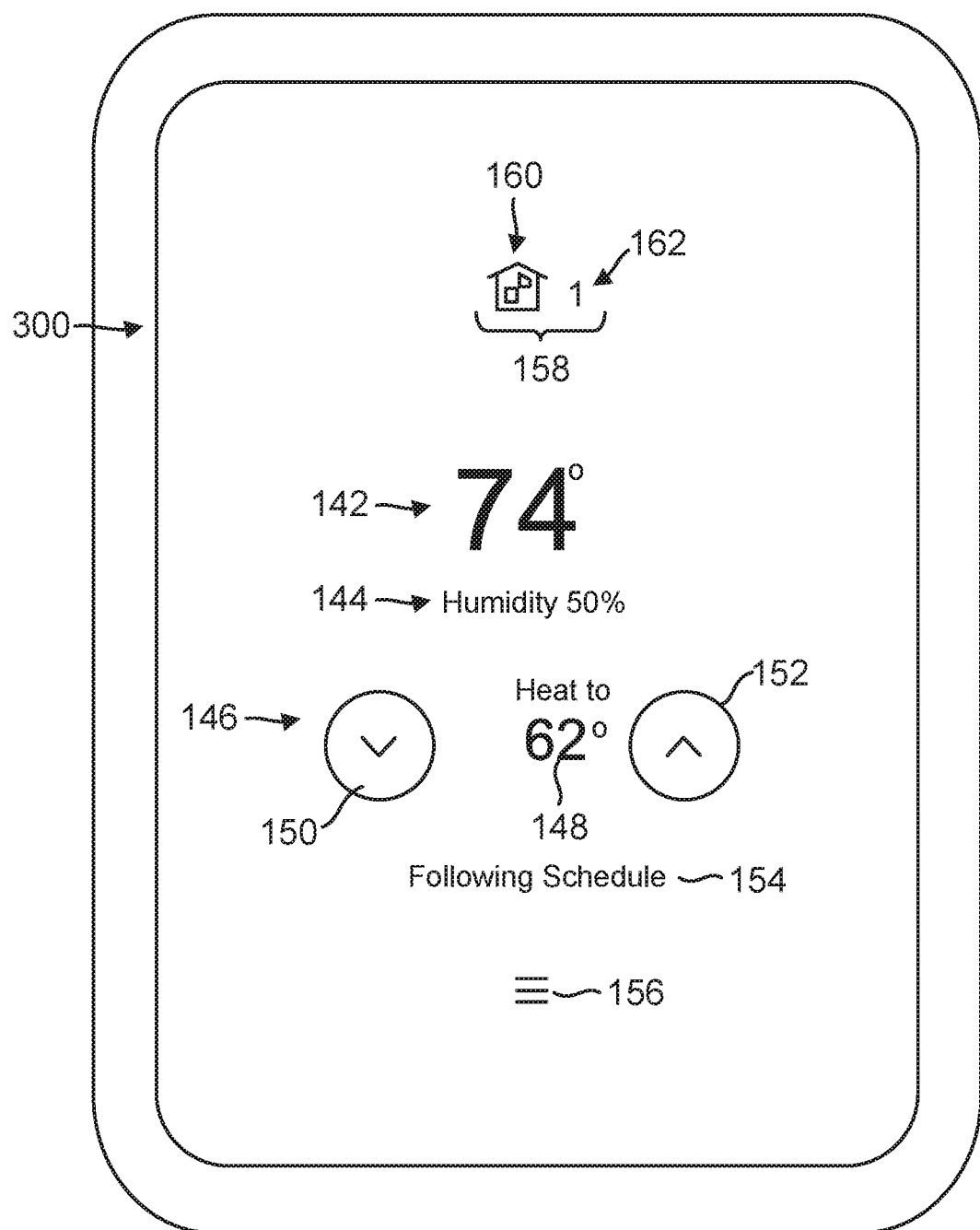
FIGS. 16 through 20 are illustrative screens that may be displayed on the user interface of the HVAC controller of FIG. 15.

FIG. 16 shows an illustrative screen 300 that may be displayed on the user interface 114. In some cases, the screen 300 may be considered as being a home screen. The current temperature is 70 degrees, as indicated by the current temperature icon 142. The current humidity is 50 percent, as indicated by the current humidity icon 144. The system is currently in heating mode, as indicated by the mode graphic 146, which includes the current set point icon 148, the down arrow 150 for decreasing the set point and the up arrow 152 for increasing the set point. The schedule icon 154 indicates that the HVAC controller 110 is currently following a programmed schedule. The menu button 156 provides access to additional functionality.

Figure 17A:
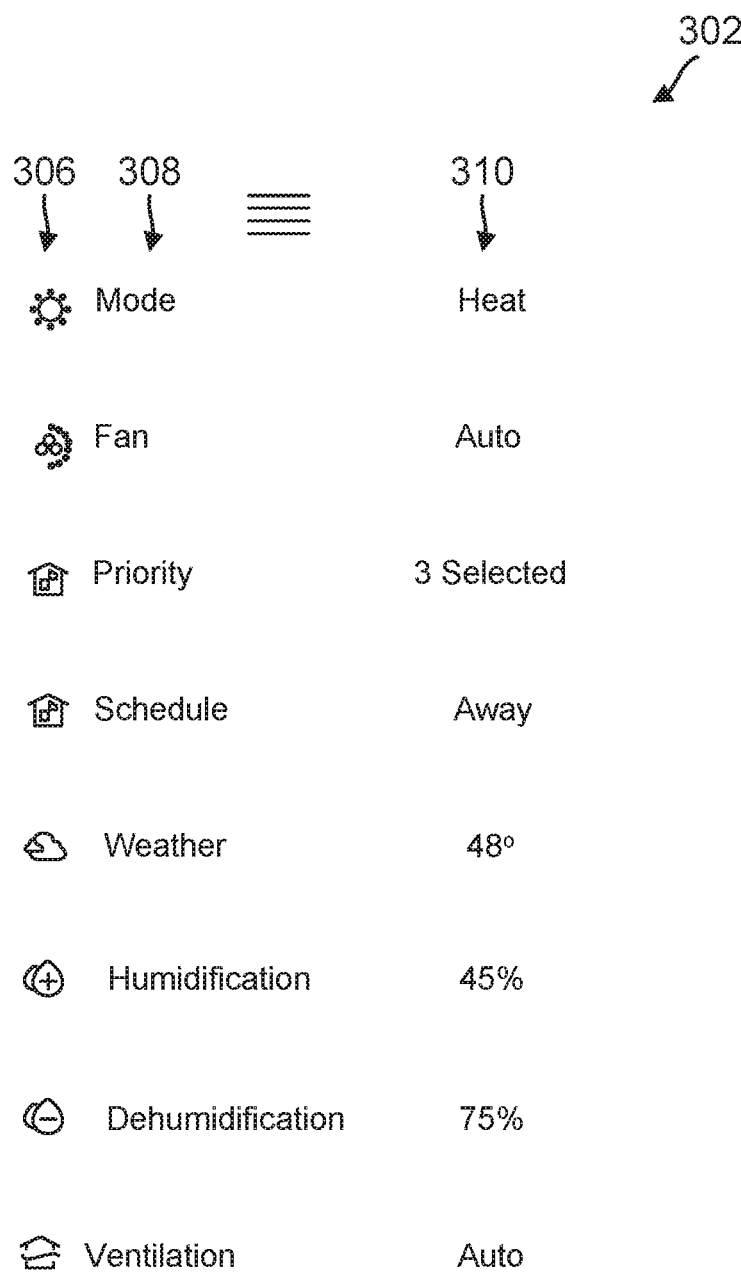

In one example, selecting the menu button 156 will cause the HVAC controller 110 (FIG. 4) or the HVAC controller 280 (FIG. 15) to display a list of menu items on a menu screen. The specific items listed may vary, depending on what sort of equipment is part of the HVAC system, what remote sensors have been configured, and the like. FIG. 17A shows a list 302 of a first group of menu items displayed on the menu screen and FIG. 17B shows a list 304 of a second group of menu items displayed on the menu screen. In some cases, the list 302 may include a column 306 of graphical icons that may for example be used on other screens, a column 308 of text identifying each menu item, as well as a column 310 providing an indication of the current setting for each of the menu items. The list 304 may simply provide a single column listing menu items. In some cases, the items on the list 304 may be divided into management items 312 and configuration items 314, but this is not required. In some cases, the first group of menu items may provide for a way to return directly to the HOME screen (see FIG. 16) while the second group of menu items may not permit a direct return to the HOME screen, but may instead revert to a previous or next level up menu in the hierarchical menu structure.

Figure 18:
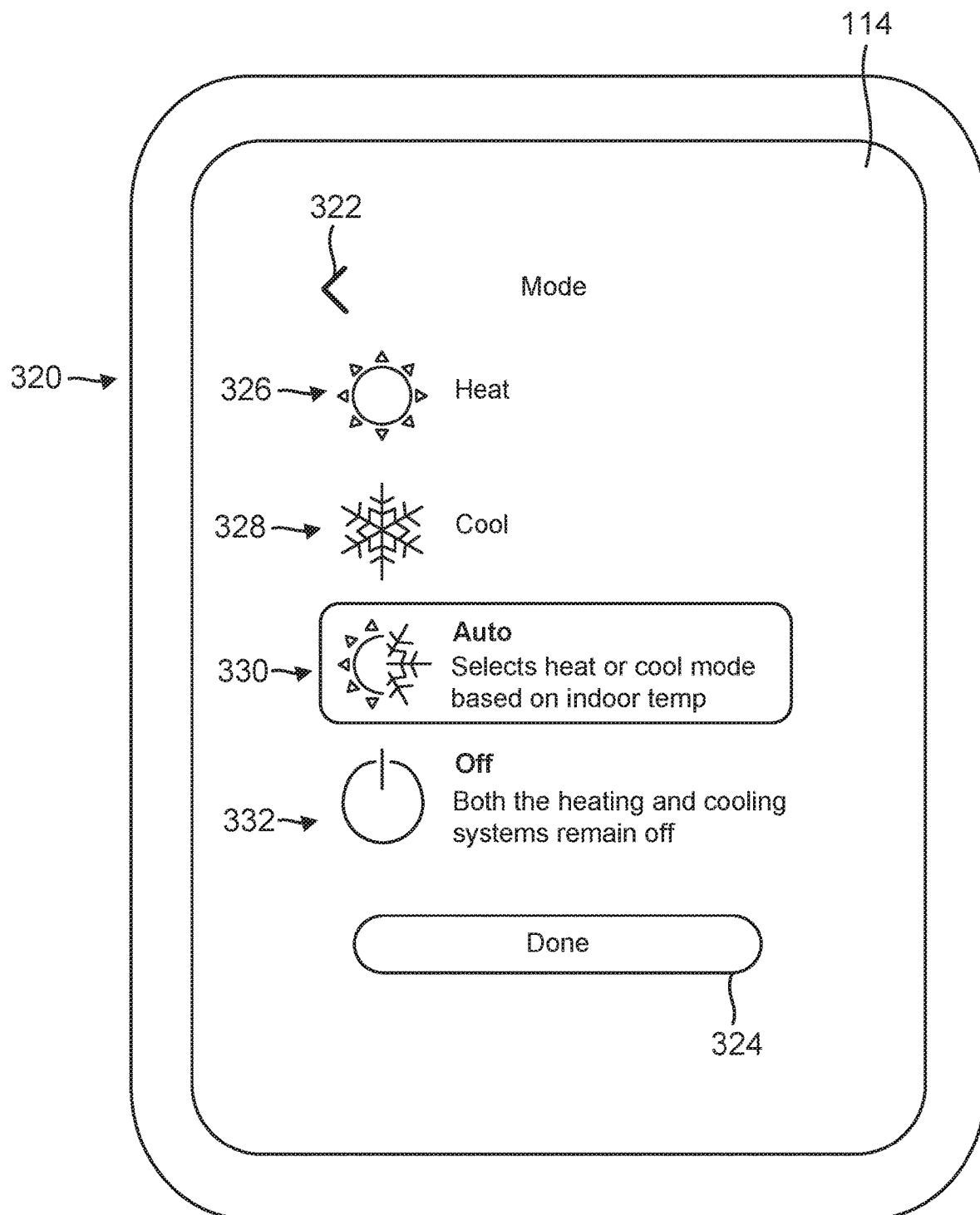
Figure 19:
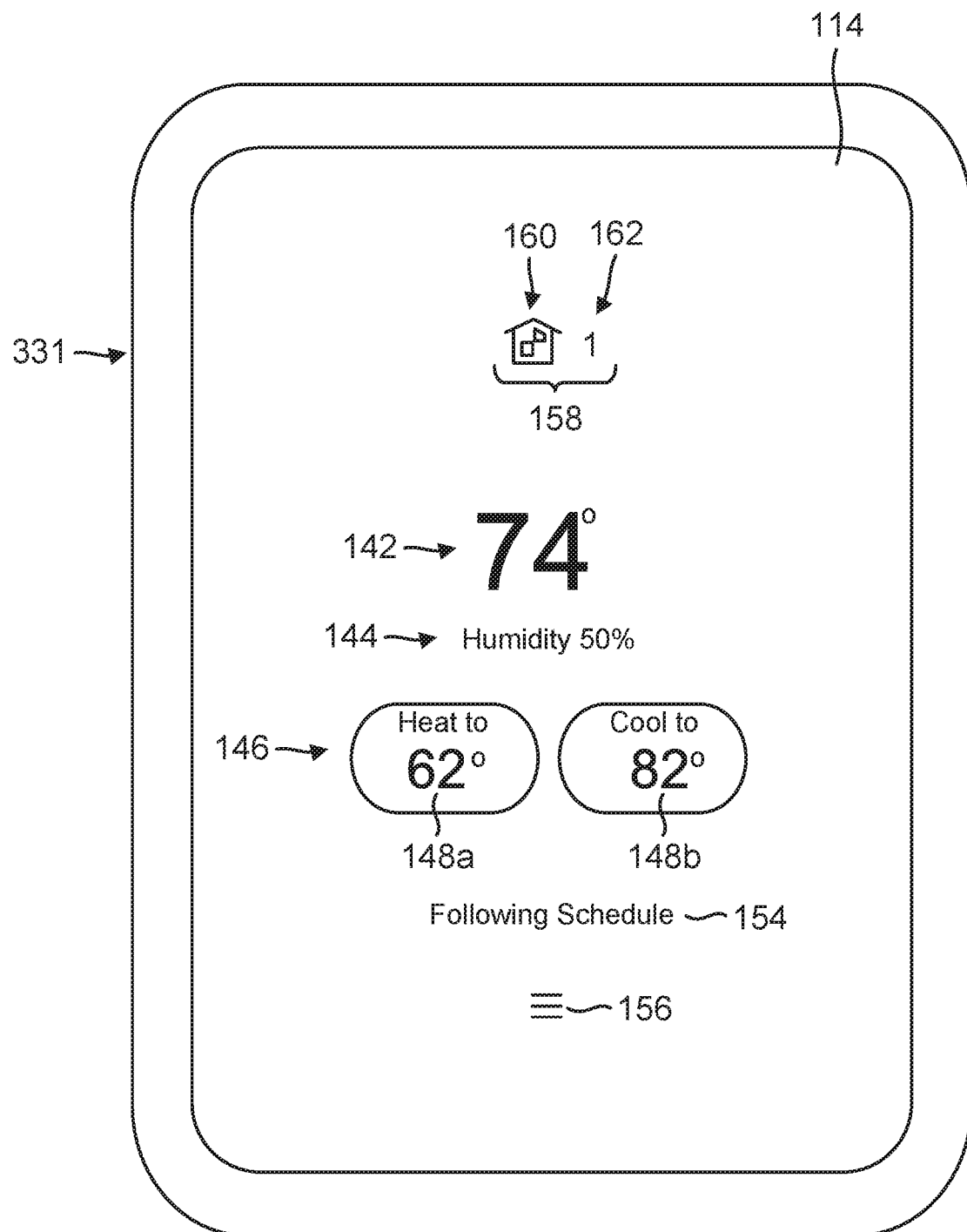

Returning to FIG. 17A, and in the example shown, selecting the Mode item from the list 302 causes the HVAC controller 110, 280 to display a leaf screen 320, as shown in FIG. 18. The leaf screen 320 includes a RETURN button 322, which if selected returns the user to the previous menu screen, and a DONE button 324, which if selected returns the user directly to the HOME screen. The leaf screen 320 enables the user to change the current mode of the HVAC controller 110, 280, if desired. As shown, the options are HEAT mode, as indicated by a HEAT icon 326, a COOL mode, as indicated by a COOL icon 328, an AUTOCHANGEOVER mode, as indicated by an AUTO icon 330, and OFF, as indicated by an OFF icon 332. The user has elected to change to the AUTOCHANGEOVER mode, as indicated by the AUTO icon 330 being highlighted. At this point, selecting the RETURN button 322 would simply return the user to the previous menu (e.g. FIG. 17A) without saving any changes. However, selecting the DONE button 324 will cause the changes to go into effect, and will cause the HVAC controller 110, 280 to revert to a HOME screen (e.g. FIG. 16). FIG. 19 provides an example of a screen 331 that may be displayed in response to the user selecting the DONE button 324 in FIG. 18. The screen 331 is a HOME screen, but the mode graphic 146 now includes a HEAT temperature set point icon 148a and a COOL temperature set point icon 148b, as a result of switching the system from the HEAT mode to the AUTOCHANGEOVER mode. It will be appreciated that selecting the DONE button 324 after making changes to any of the menu items in the first group will have a similar result.

Figure 20:
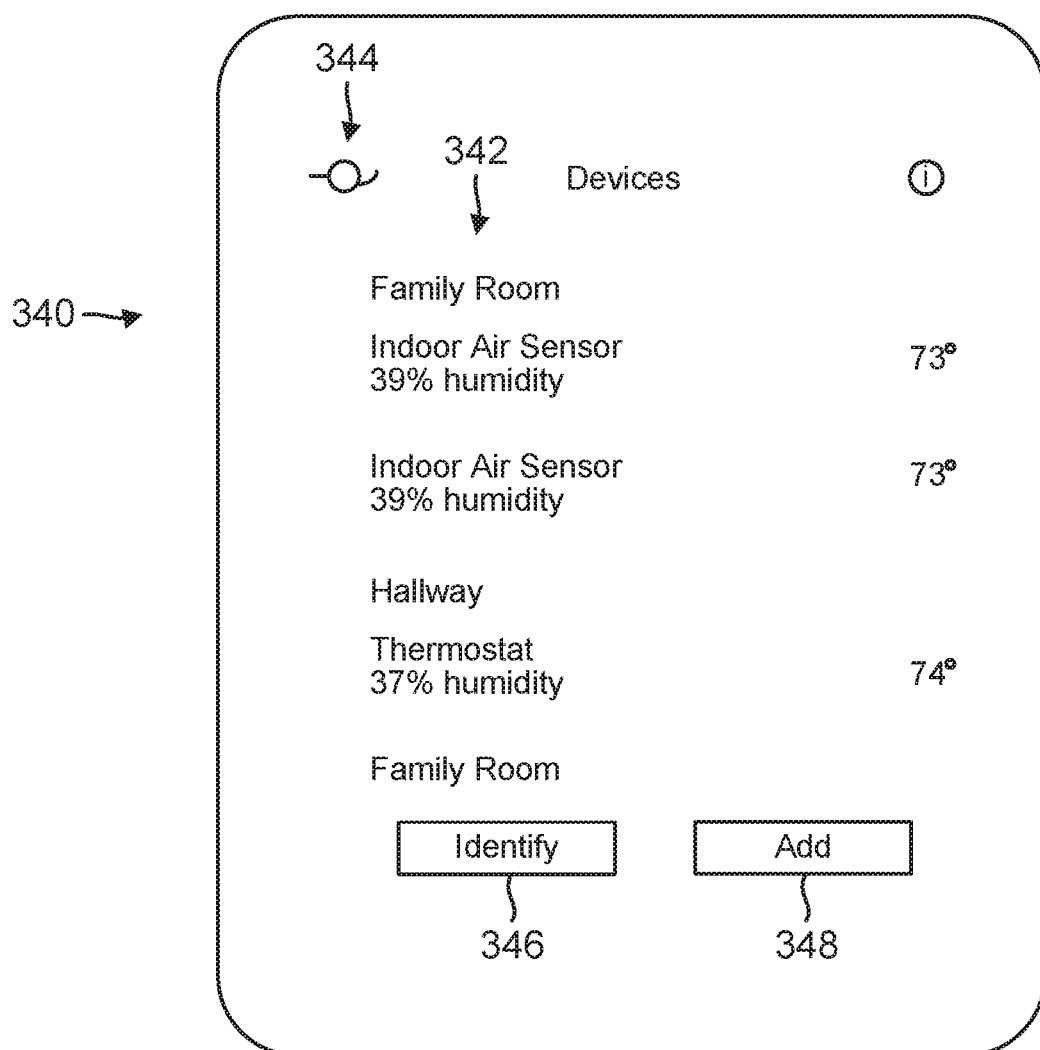

Returning to FIG. 17B, choosing Devices and Settings from the second list 304 may cause the display of a screen 340 that displays a list 342 of installed devices with their current settings, as shown in FIG. 20. A RETURN button 344 (see FIG. 20) enables the user to return to the previous menu (e.g. FIG. 17B). An identify button 346 allows a user to instruct one of the remote sensors to identify itself, such as by illuminating an LED or making an audible sound. An Add button 348 allows a user to configure additional sensors and other devices. It will be noted that there is no DONE button on the screen 340. Once the user has made their edits, or decided against it, they simply press the RETURN button 344 to return to the previous menu (e.g. FIG. 17B).

Figure 21:
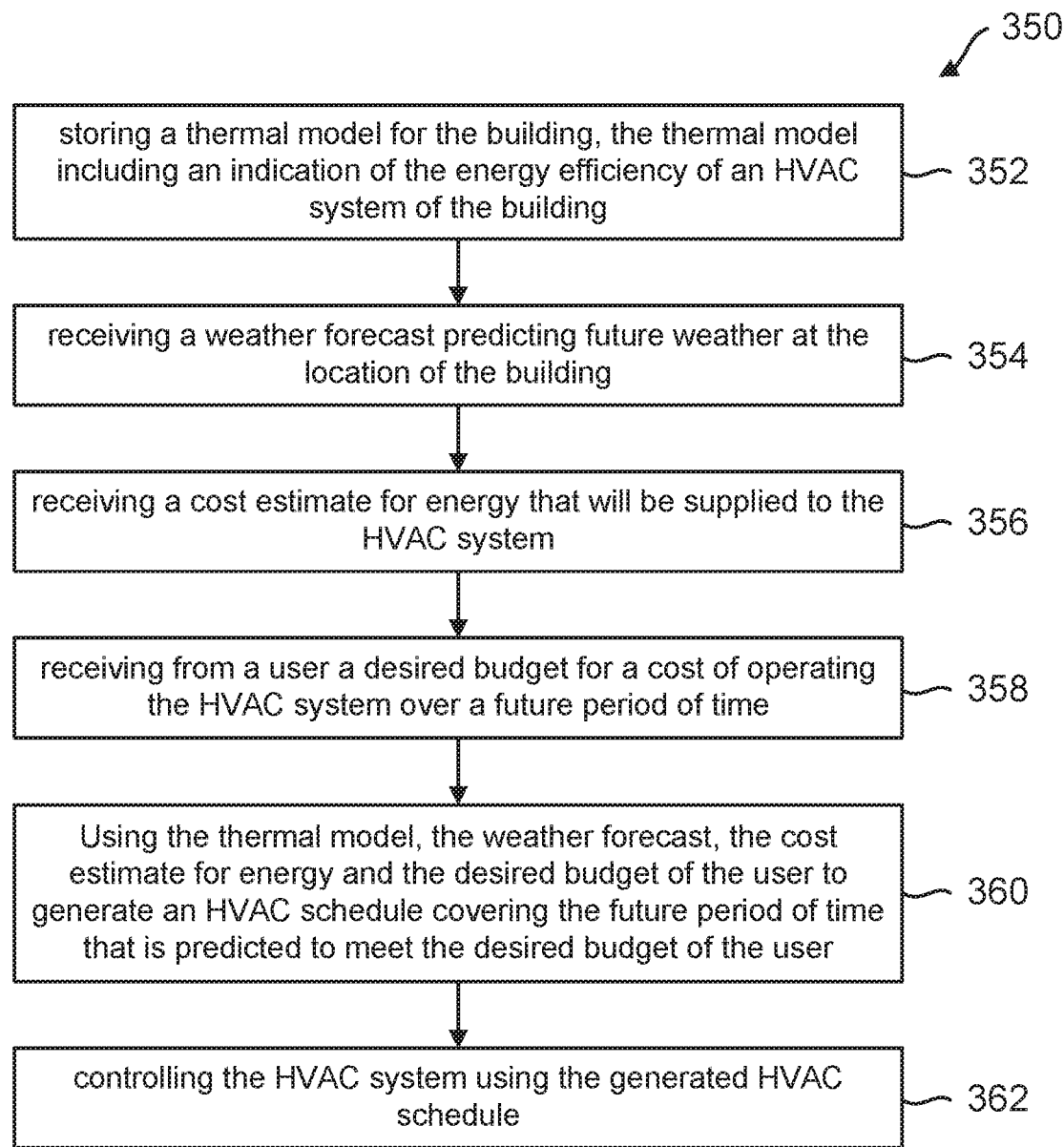
FIGS. 21 and 22 are flow diagrams of illustrative methods that may be supported by the HVAC controllers of FIG. 4 and FIG. 15.

FIG. 21 is a flow diagram illustrating a method 350 for automatically generating an HVAC schedule for a building, wherein the HVAC schedule includes two or more time periods and each time period includes a temperature set point. In some instances, the method 350 may be carried out in the HVAC controller 110 or the HVAC controller 280. In some cases, the method 350 may be carried out at least in part in the remote server 66 (FIG. 1). A thermal model for the building is stored, where the thermal model includes among other things an indication of the energy efficiency of an HVAC system of the building, as indicated at block 352. The thermal model may also include an indication of the thermal efficiency of the building envelope. In some cases, the thermal model may be tailored to the particular building, and may be based at least in part on a historical performance of the HVAC system, external weather conditions, etc. In some instances, the indication of the energy efficiency of the HVAC system in the building is entered by a user, such as by entering the SEER number, a model number, and/or any other indication that can be used to identify an efficiency level of the HVAC system. Alternatively, or in addition, the indication of the energy efficiency of the HVAC system can be generated based on a historical performance of the HVAC system over time and under different weather conditions.

In some cases, a weather forecast predicting future weather at the location of the building may be received, as noted at block 354. As seen at block 356, a cost estimate for energy that will be supplied to the HVAC system is received. In some cases, the cost estimate for energy (e.g. cost of natural gas, cost of electricity, etc.) that is supplied to the HVAC system is provided by a utility, sometimes throughout a day. In some cases, the cost estimate for energy that is supplied to the HVAC system is entered by the user. In some cases, the cost estimate for energy that is supplied to the HVAC system may include a cost forecast predicting future energy costs over a future period of time.

In some cases, a desired budget for the cost of operating the HVAC system over a future period of time may be received from the user, as indicated at block 358. An HVAC schedule covering the future period of time that is predicted to meet the desired budget of the user may be generated using the thermal model, the weather forecast, the cost estimate for energy and the desired budget of the user, as noted at block 360. The HVAC system may then be controlled using the generated HVAC schedule, as indicated at block 362. In some cases, generating the HVAC schedule covering the future period of time includes defining temperature set points for one or more of the two or more time periods of the HVAC schedule. In some instances, generating the HVAC schedule covering the future period of time includes defining a beginning and/or an ending time for one or more of the two or more time periods of the HVAC schedule. In some cases, generating the HVAC schedule covering the future period of time includes adding and/or eliminating time periods of the HVAC schedule. Generating the HVAC schedule covering the future period of time may include defining a ventilation setting and/or a humidity setting for one or more of the two or more time periods of the HVAC schedule. These are just examples.

Figure 22:
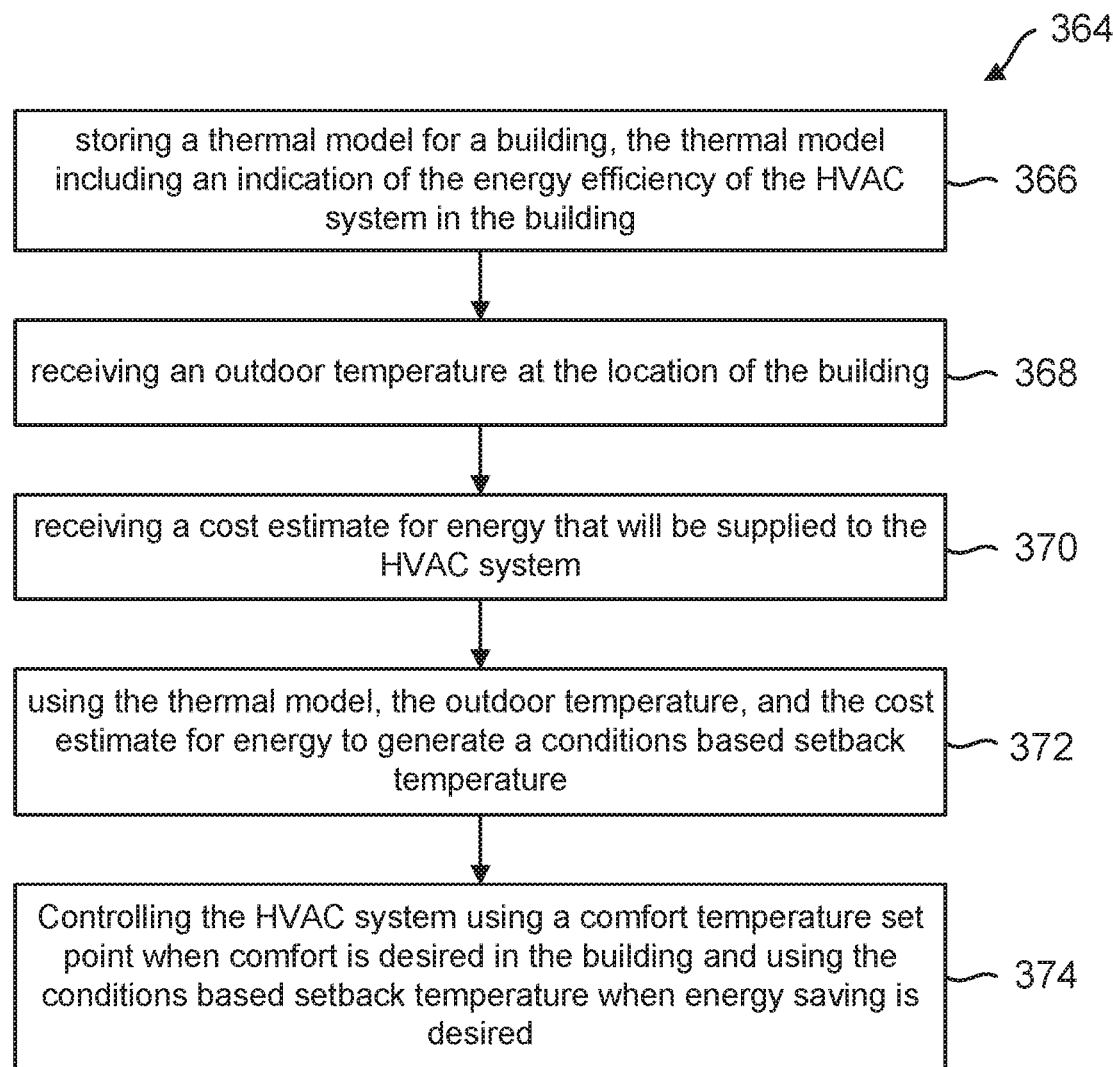

FIG. 22 is a flow diagram of an illustrative method 364 for generating a conditions based setback temperature. In some instances, the method 364 may be carried out in the HVAC controller 110 or the HVAC controller 280. In some cases, the method 364 may be carried out at least in part in the remote server 66 (FIG. 1). As indicated at block 366, a thermal model for a building may be stored. The thermal model may include among other things an indication of the energy efficiency of the HVAC system in the building. An outdoor temperature at the location of the building may be received, as indicated at block 368. A cost estimate for energy that will be supplied to the HVAC system may be received, as indicated at block 370. As indicated at block 372, the thermal model, the outdoor temperature, and the cost estimate for energy may be used to generate a conditions based setback temperature. In some cases, the conditions based setback temperature may be static or may change during a period of time when energy savings are desired, such as during setback period in an HVAC schedule. For example, in some cases, as the outdoor temperature falls overnight, the conditions based setback temperature may also fall. As the outdoor temperature rises toward morning, the conditions based setback temperature may also rise. This is just an example. It is contemplated that the HVAC system may be controlled using a comfort temperature set point when comfort is desired in the building and using the conditions based setback temperature when energy saving is desired, as indicated at block 374.

In some cases, a weather forecast predicting future weather at the location of the building may be received, wherein the weather forecast includes the outdoor temperature at the location of the building. In some instances, the comfort temperature set point and the conditions based setback temperature are part of a programmed HVAC schedule that includes at least one comfort time period that uses the comfort temperature set point and at least one energy saving time period that uses the conditions based setback temperature. The HVAC controller, using the thermal model, the outdoor temperature, and the cost estimate for energy, may adjust a beginning and/or an ending time of one or more of the at least one energy saving time period, and may set the conditions based setback temperature for each energy saving time period.

Figure 23:
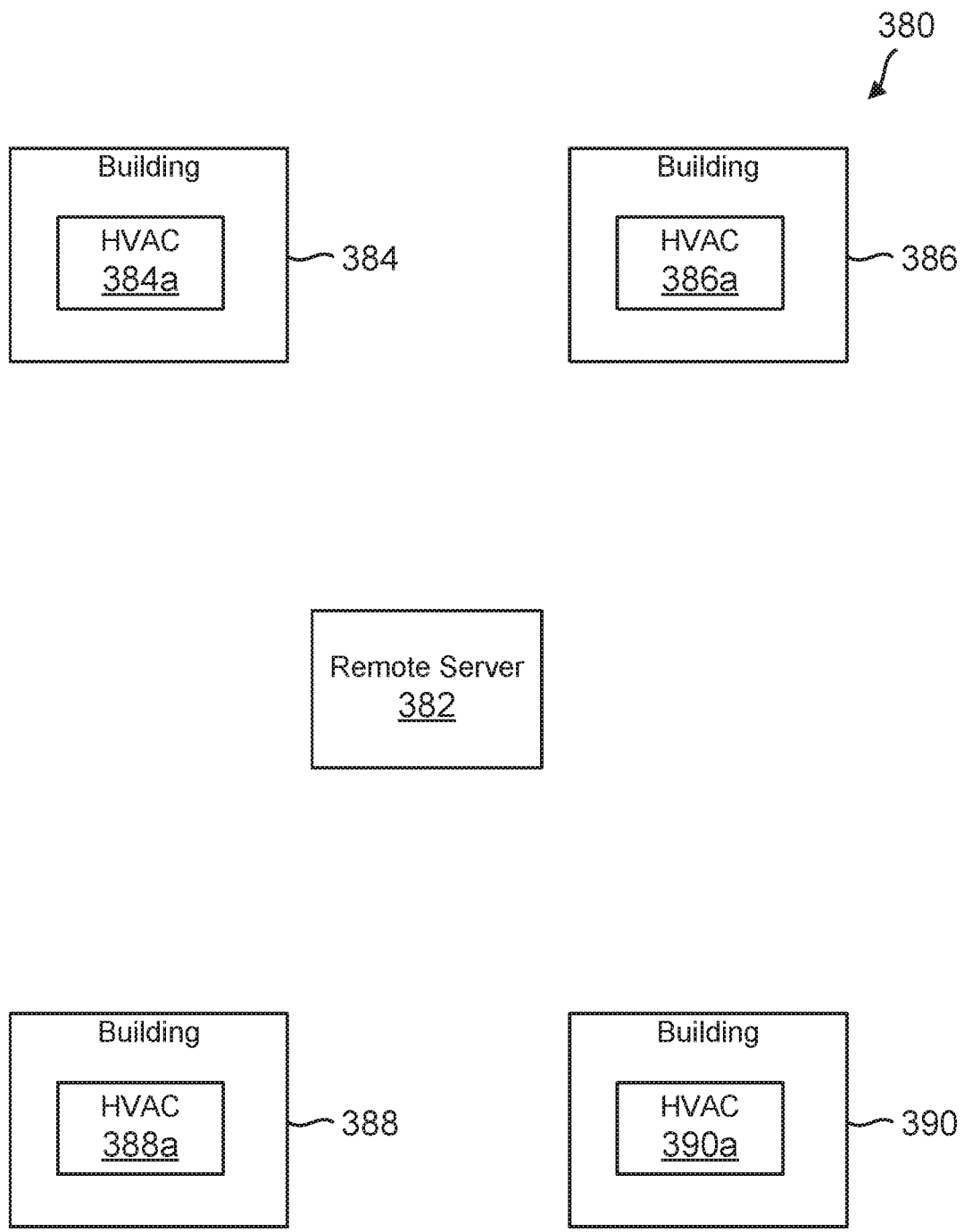
FIG. 23 is a schematic block diagram of an illustrative remote server connectable to HVAC Controllers in each of a plurality of client buildings to support the illustrative methods of FIGS. 21-22.

FIG. 23 is a schematic block diagram of a system 380 that may be configured to help generate conditions based setback temperatures for one or more HVAC systems in one or more buildings. The system 380 is illustrated as including a server 382, which may be considered as being an example of the remote server 66 (FIG. 1), a building 384, a building 386, a building 388 and a building 390. That a total of four building is shown is merely illustrative, as there may be any number of buildings. The building 384 includes an HVAC system 384a, the building 386 includes an HVAC system 386a, the building 388 includes an HVAC system 388a and the building 390 includes an HVAC system 390a. The server 382 may be configured to generate a thermal model for each of the buildings 384, 386, 388, 390. While not necessarily required, each of the thermal models may include an indication of the energy efficiency of an HVAC system in the corresponding building. The server 382 may receive a weather forecast predicting future weather at the location of each of buildings 384, 386, 388, 390 as well as receiving a cost estimate for energy that will be supplied to the HVAC system of each of the buildings 384, 386, 388, 390. For each of the buildings 384, 386, 388, 390, the server 382 may use the thermal model, the outdoor temperature, and the cost estimate for energy associated with a corresponding building to generate a conditions based setback temperature for the HVAC system of the corresponding building. For each of the buildings 384, 386, 388, 390, the server 382 may send the corresponding conditions based setback temperature to an HVAC controller of the HVAC system 384a, 386a, 388a, 390a of the corresponding building.

In some cases, the thermal model for each of the buildings 384, 386, 388, 390 may be based on indoor temperature readings received via the HVAC controller of the HVAC system 384a, 386a, 388a, 390a, on/off times of the HVAC system 384a, 386a, 388a, 390a of the corresponding building, and/or outdoor temperature conditions at the corresponding building. In some instances, the thermal model for a particular one of the plurality of buildings 384, 386, 388, 390 may be based on information received from at least one other of the plurality of buildings 384, 386, 388, 390. The server 382 may also receive from each of the buildings 384, 386, 388, 390 one or more equipment and/or configuration settings for the corresponding HVAC system 384a, 386a, 388a, 390a, one or more user settings for the corresponding HVAC system 384a, 386a, 388a, 390a, and/or one or more recorded user interactions for the corresponding HVAC system 384a, 386a, 388a, 390a.

Figure 24:
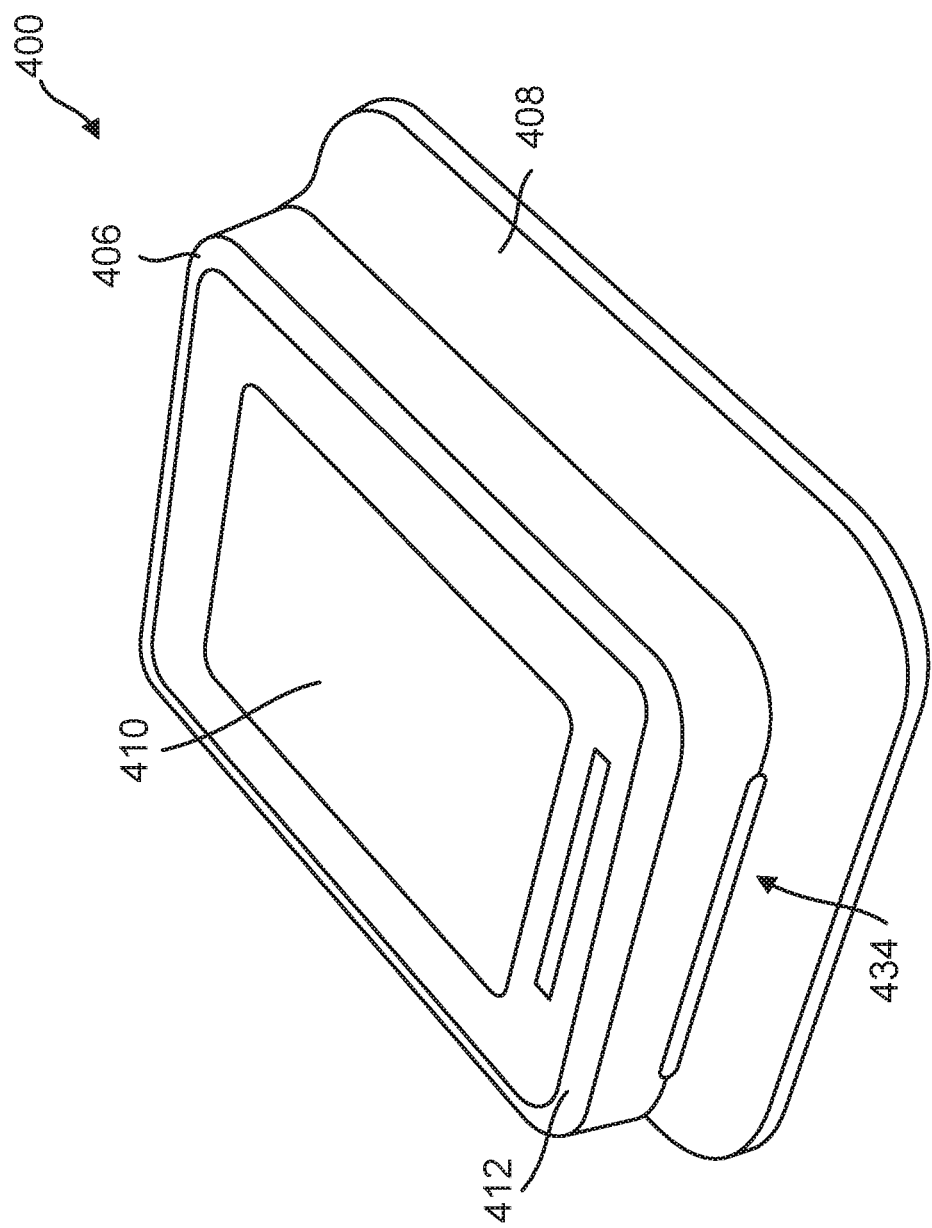
FIG. 24 is a perspective view of an illustrative thermostat assembly including a larger trim ring.
Figure 25:
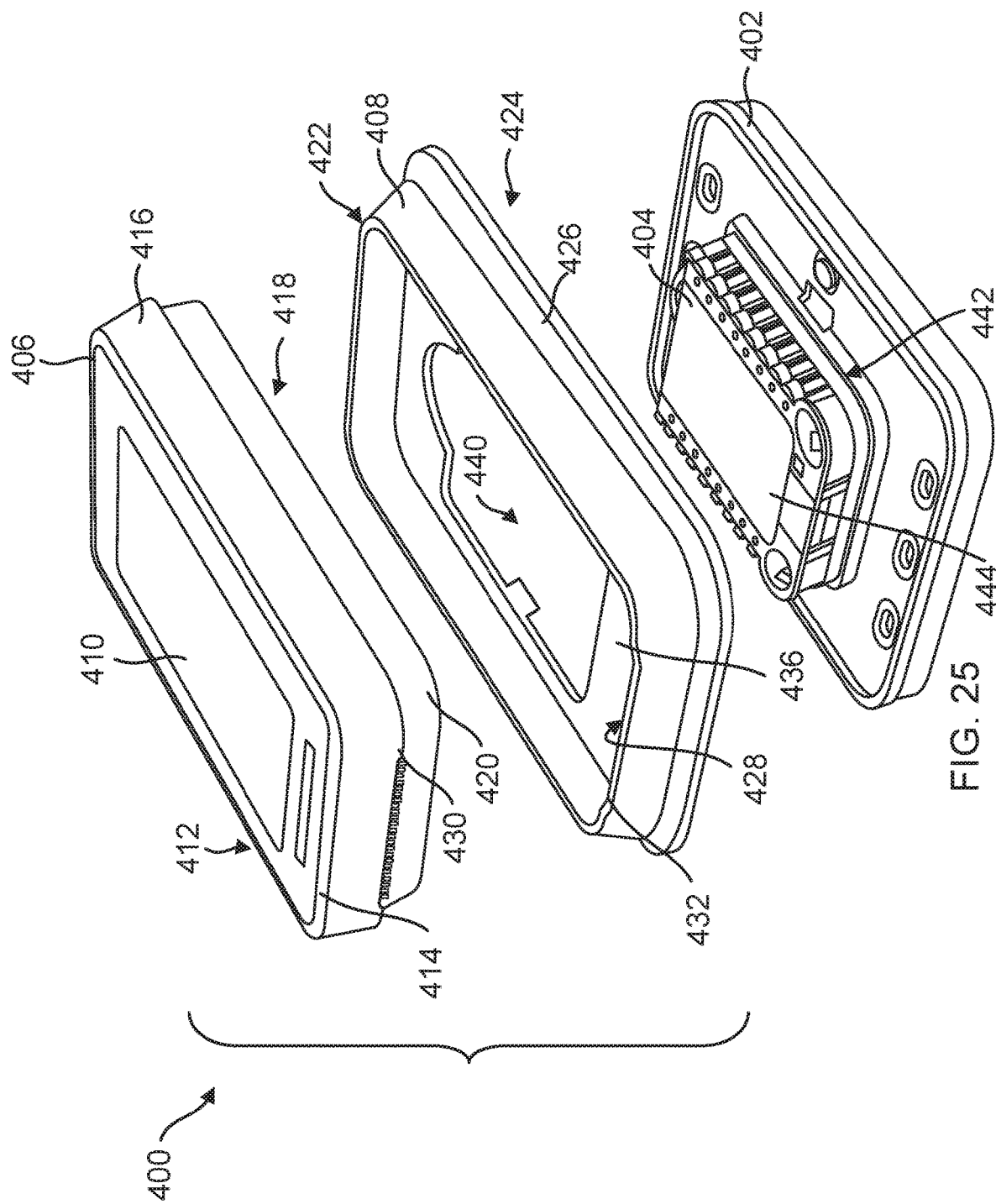
FIG. 25 is an exploded perspective view of the illustrative thermostat assembly of FIG. 24, positioned to be mounted to an adaptor plate and wall mountable connector.
Figure 26:
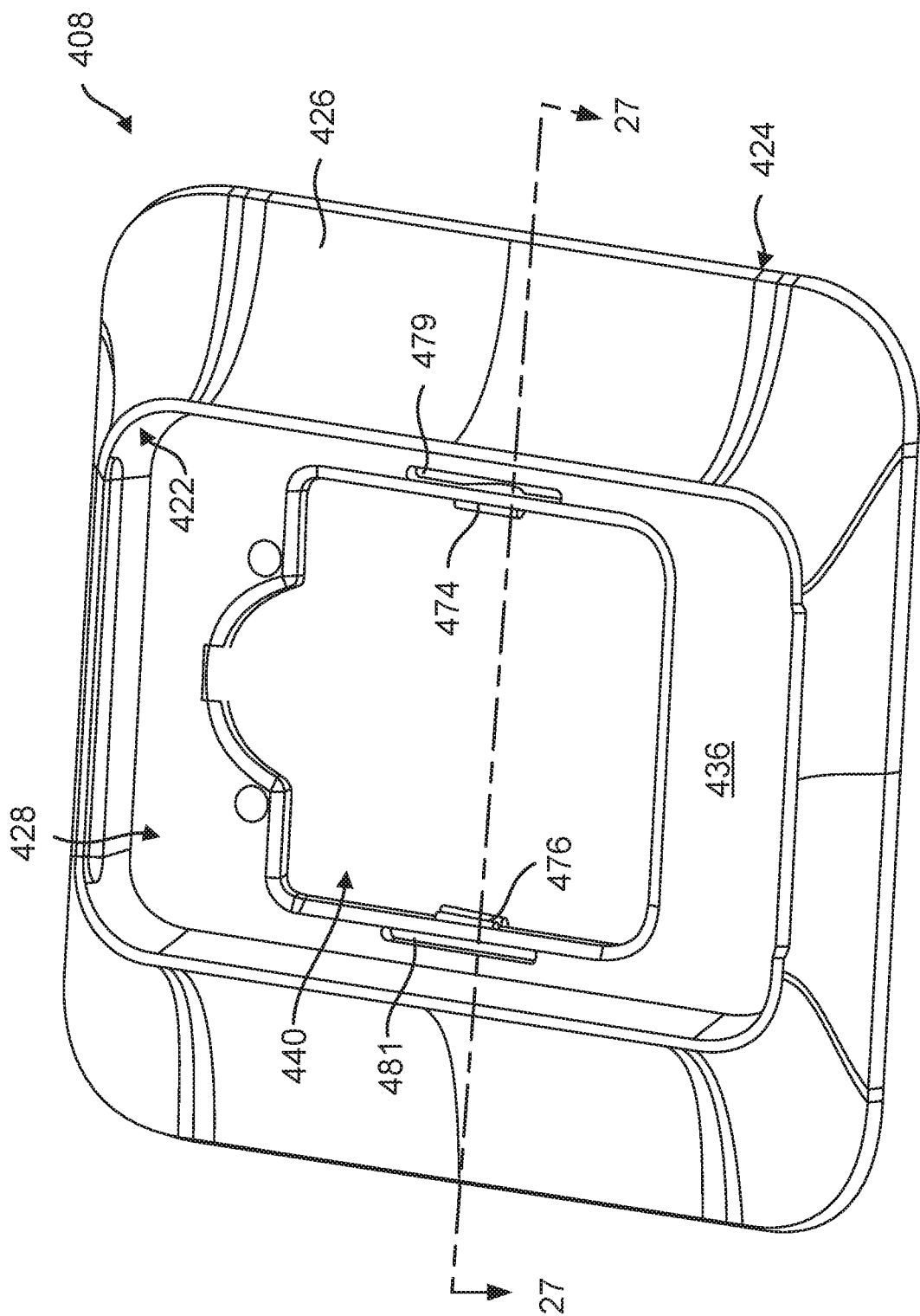
FIG. 26 is a front perspective view of a larger trim ring forming part of the illustrative thermostat assembly of FIG. 24.

FIG. 24 is a perspective view of a thermostat assembly 400 for controlling an HVAC system and FIG. 25 is an exploded perspective view of the thermostat assembly 400 positioned relative to an adaptor plate 402 and a wall mountable connector 404. The thermostat assembly 400 may, for example, be considered as being an example of the HVAC controller 18 (FIG. 1), the HVAC controller 110 (FIG. 4) or the HVAC controller 280 (FIG. 15). The thermostat assembly 400 may include a thermostat 406 and a trim ring 408. The trim ring 408 is also illustrated in FIG. 26, which is a perspective view thereof, and in FIG. 27, which is a cross-sectional view taken along line 27-27 of FIG. 26.

While the trim ring 408 is not required for function of the thermostat 406, the trim ring 408 does provide part of the design aesthetic of the thermostat assembly 400 as well as functioning as a cover plate that helps to cover blemishes on a wall to which the thermostat assembly 400 will be mounted. As will be discussed, the trim ring 408 may also help to both accommodate and hide from view the adaptor plate 402 and the wall mountable connector 404, when present. In some cases, the adaptor plate 402 may be configured to be secured to an in-wall junction box, although this is not required. In some cases, the trim ring 408 may be considered as appropriate for use with the thermostat 406 when the wall mountable connector 404 is secured to the adaptor plate 402, rather than having the wall mountable connector 404 secured directly to a wall or other vertical mounting surface without the adaptor plate 402.

The thermostat 406 includes a user interface 410 such as, but not limited to, a touch screen display and a thermostat housing 412. As shown in FIG. 25, the thermostat housing 412 includes a front portion 414 with a front portion side wall 416 and a back portion 418 with a back portion side wall 420. In some cases, as illustrated, the back portion side wall 420 is inwardly offset from the front portion side wall 416, resulting in a smaller cross-section along the back portion side wall 420. As can be seen, in some cases, the back portion side wall 420 defines a smaller perimeter than the front portion side wall 416. The user interface 410 is accessible from a position exterior the front portion 414. The illustrative thermostat 406 includes a controller (such as the controller 118 or the controller 286) that is disposed within the thermostat housing 412. The controller 118, 286 is configured to accept input from the user via the user interface 410 and to provide one or more control signals to control a corresponding HVAC system, often through a wall mountable connector 404.

The trim ring 408 has a front side 422 and a back side 424. The back side 424 is configured to face a mounting wall (not illustrated) and the front side 422 is configured to receive at least part of the back portion 418 of the thermostat housing 412. The trim ring 408 includes an outer surface 426 that transitions from a larger back side profile to a smaller front side profile. In some instances, the front portion 414 of the thermostat housing 412 has a profile adjacent the trim ring 408, and the profile of the front side 422 of the trim ring 408 may be configured to match the profile of the front portion 414 of the thermostat housing 412 adjacent the trim ring 408.

As can be seen in FIG. 24, the profile of the trim ring 408 may flow smoothly into the profile of the thermostat housing 412 to provide a desirable design aesthetic. The front side 422 of the trim ring 408 includes a thermostat recess 428 that is configured to receive at least part of the back portion 418 of the thermostat housing 412. In some cases, the thermostat housing 412 may include a vent relief 430 that is formed along a lower edge (and/or upper edge) of the thermostat housing 412, and the trim ring 408 may include a corresponding vent relief 432 formed along a lower edge (and/or upper edge) of the trim ring 408. In combination, the vent relief 430 of the thermostat housing 412 and the vent relief 432 of the trim ring 408 may form a vent aperture 434, best seen in FIG. 24.

Figure 27:
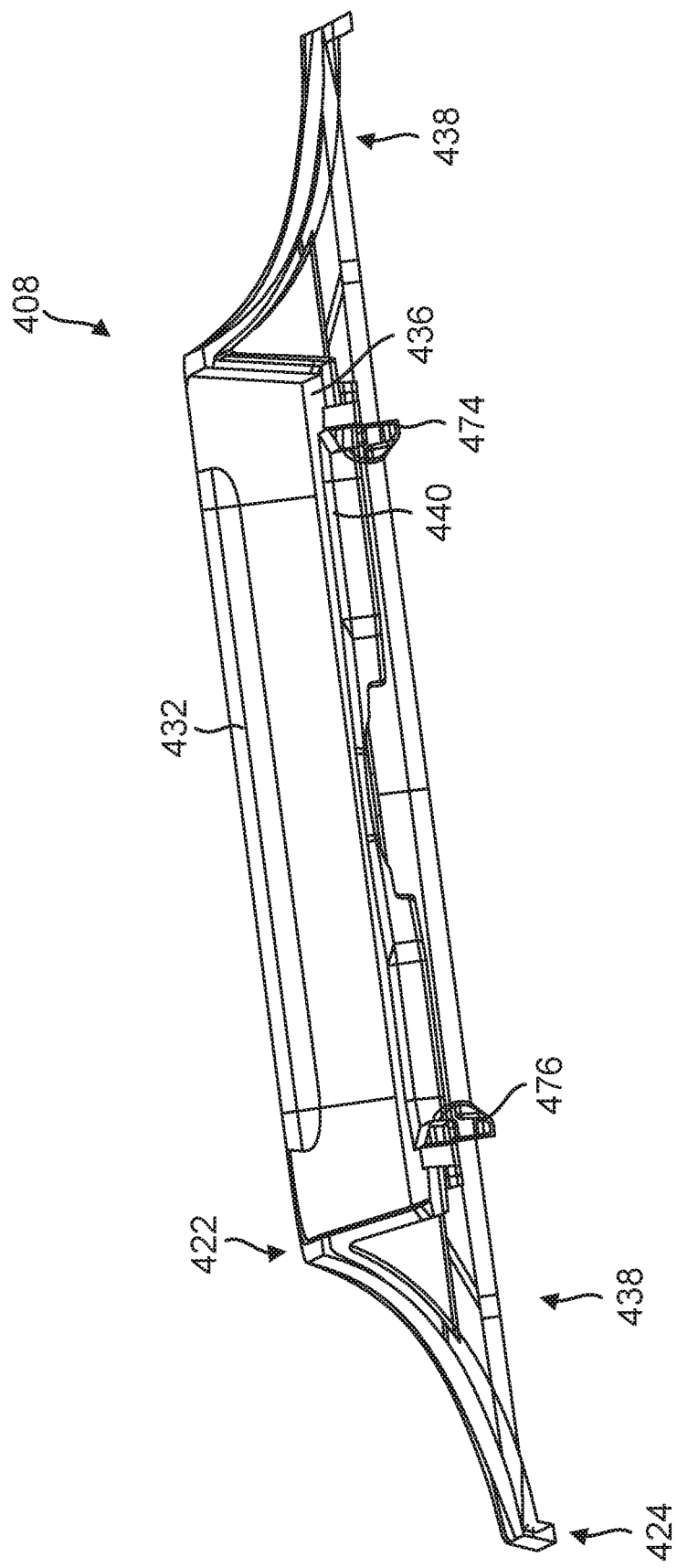
FIG. 27 is a cross-sectional view of the larger trim ring of FIG. 26, taken along the line 27-27.

As seen in FIG. 25, the trim ring 408 may have a thermostat recess 428 that is configured to accommodate at least part of the back portion 418 of the thermostat housing 412. In some instances, as illustrated, the thermostat recess 428 has a depth that is defined by a back wall 436. The depth of the thermostat recess 428 may be seen, for example, in FIG. 27. In some cases, the depth of the thermostat recess 428 may be equal or about equal to a corresponding depth of the back portion 418 of the thermostat housing 412. FIG. 27 shows that the trim ring 408 may include an adaptor plate recess 438 that is configured to accommodate the adaptor plate 402 within the adaptor plate recess 438. As a result, a back side 424 of the trim ring 408 is able to come into contact and be flush with the wall or other vertical surface to which the thermostat assembly 400 is mounted.

In the example shown, an aperture 440 extends through the back wall 436 of the thermostat recess 428 in order to accommodate the wall mountable connector 404. It will be appreciated that the aperture 440 may have a shape that accommodates or corresponds to that of the wall mountable connector 404, such that the trim ring 408 may be secured to the adaptor plate 402 after the wall mountable connector 404 has been secured to the adaptor plate 402. The illustrative wall mountable connector 404 has a first side 442 for facing the wall and a second, opposing, side 444. The wall mountable connector 404 is configured to be secured to the adaptor plate 402. While not expressly visible, the wall mountable connector 404 includes a field wiring connection block that is configured to provide an electrical connection to a plurality of field wires, and a thermostat terminal block that is configured to provide an electrical connection to the thermostat 406.

Figure 28:
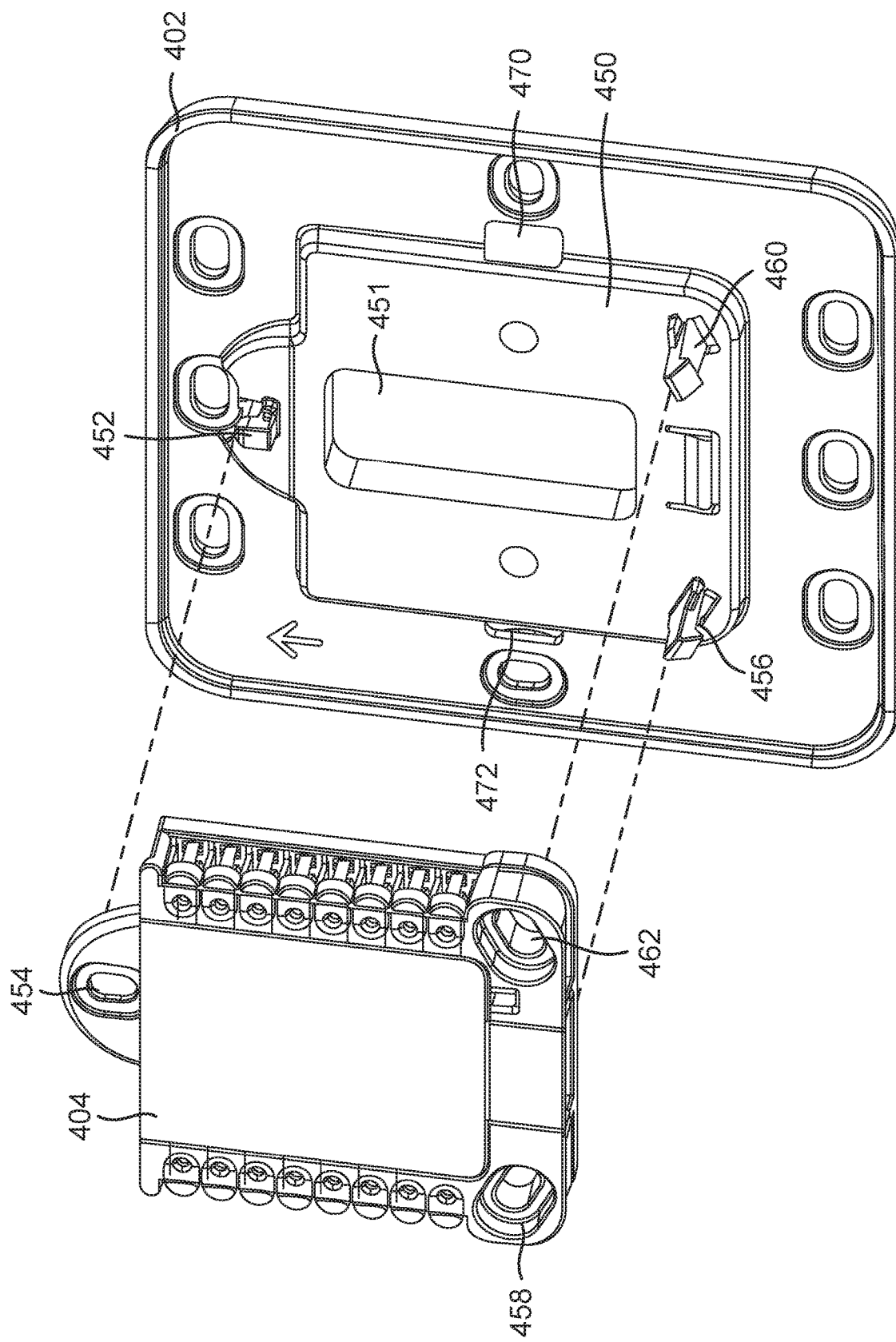
FIG. 28 is an exploded perspective view of the adaptor plate and wall mountable connector of FIG. 25.

FIG. 28 is an exploded perspective view of the wall mountable connector 404 and the adaptor plate 402, showing the wall mountable connector 404 disposed above or in front of the adaptor plate 402. In some cases, as illustrated, the adaptor plate 402 may include a raised portion 450 that has a shape that corresponds to an outer profile of the wall mountable connector 404. The adaptor plate 402 may also include a field wire aperture 451 that permits field wires extending from a junction box (not illustrated) or the like, through the adaptor plate 402, and into a recess in the back of the wall mountable connector 40. In some instances, the raised portion 450 of the adaptor plate 402 may include mounting latches that correspond to mounting apertures formed within the wall mountable connector 404. In some cases, the raised portion 450 includes an upper mounting latch 452 that is configured to engage a corresponding upper mounting feature 454 formed in the wall mountable connector 404. In the example shown, a first lower mounting latch 456 is configured to engage a corresponding first lower mounting feature such as a first lower mounting aperture 458 formed in the wall mountable connector 404. Similarly, a second lower mounting latch 460 is configured to engage a corresponding second lower mounting feature such as a second lower mounting aperture 462 formed in the wall mountable connector 404. Additional details regarding the wall mountable connector 404 and the adaptor plate 402, and how the wall mountable connector 404 secures to the adaptor plate 402, may be found in U.S. Pat. No. 9,768,564 issued Sep. 19, 2017 entitled WALL MOUNTABLE CONNECTOR WITH MOUNTING FEATURES, which application is incorporated by reference herein in its entirety.

As noted, the adaptor plate 402 may be configured to be secured to an in-wall junction box, and the wall mountable connector 404 may be configured to be secured to the adaptor plate 402. In some cases, the trim ring 408 may be configured to be secured to the adaptor plate 402. With reference to FIG. 28, the adaptor plate 402 includes mounting apertures 470 and 472 that are disposed on either side of the raised portion 450 of the adaptor plate 402. These mounting apertures 470, 472 are configured and positioned to accept corresponding mounting tabs 474 and 476 (see FIG. 26) that are formed on either side of the aperture 440 that, as discussed, is configured to permit the trim ring 408 to fit down over the wall mountable connector 404. In some cases, as illustrated, the trim ring 408 includes a relief 479 that is cut out adjacent the mounting tab 474 and a relief 481 that is cut out adjacent the mounting tab 476 to lend additional flexibility for ease of securing the trim ring 408 to the adaptor plate 402. The thermostat 406 is then secured to the wall mountable connector 404 via the electrical connections therebetween.

Figure 29:
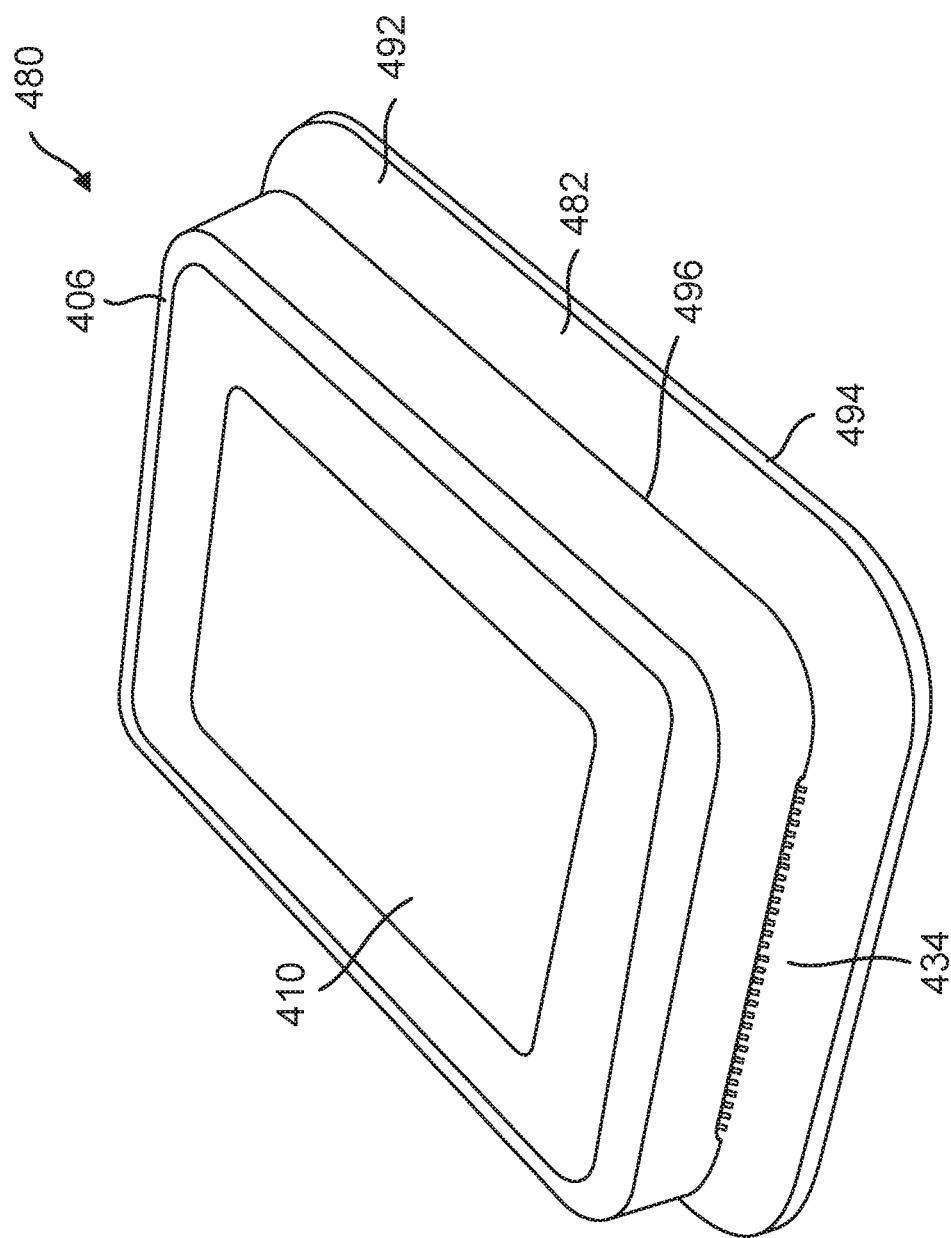
FIG. 29 is a perspective view of an illustrative thermostat assembly including a smaller trim ring.
Figure 30:
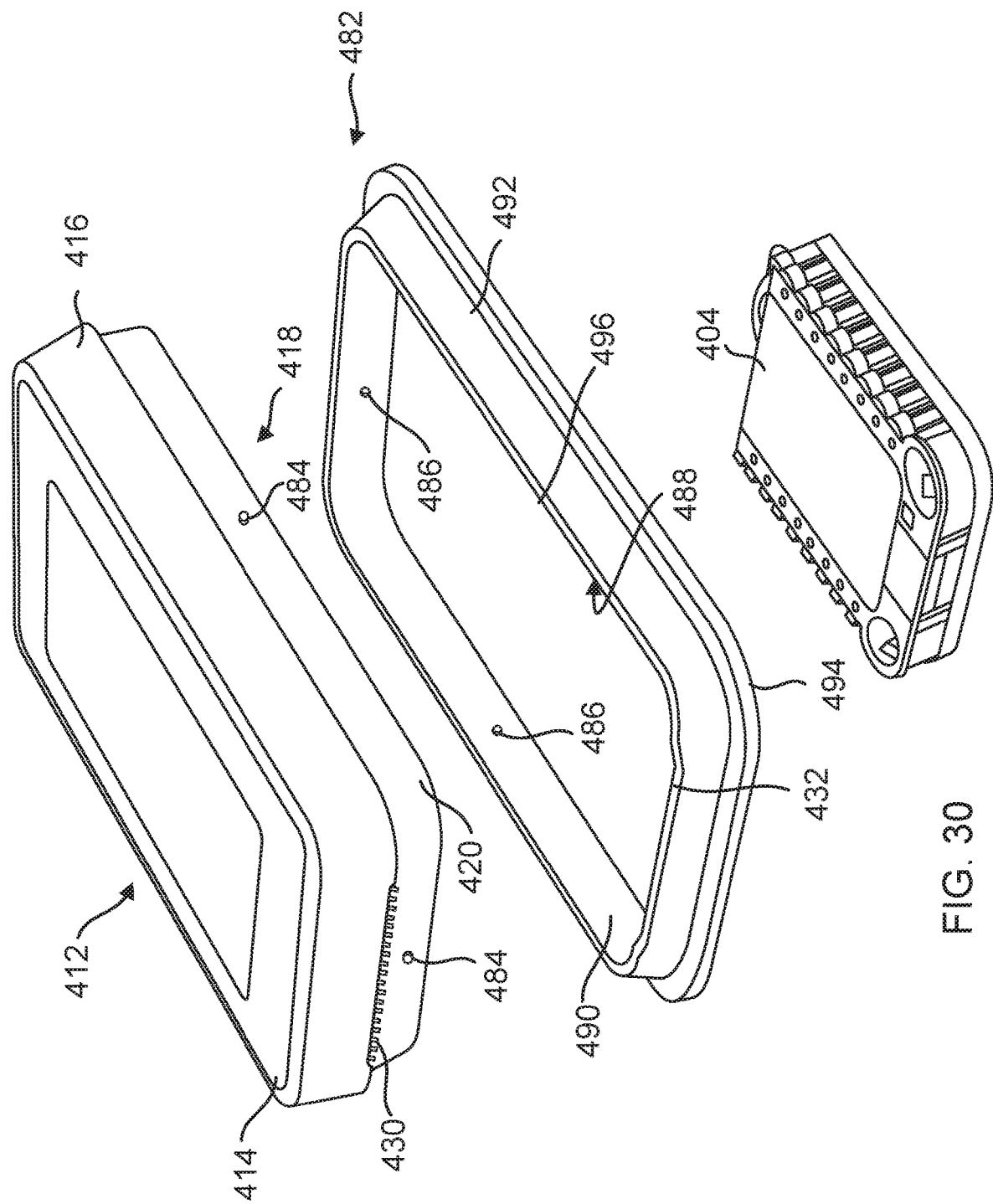
FIG. 30 is an exploded perspective view of the illustrative thermostat assembly of FIG. 29, positioned to be mounted to a wall mountable connector.

FIG. 29 is a perspective view of a thermostat assembly 480 for controlling an HVAC system and FIG. 30 is an exploded perspective view of the thermostat assembly 480 positioned relative to the wall mountable connector 404. The thermostat assembly 480 may, for example, be considered as being an example of the HVAC controller 18 (FIG. 1), the HVAC controller 110 (FIG. 4) or the HVAC controller 280 (FIG. 15). The illustrative thermostat assembly 480 includes the thermostat 406 and a trim ring 482. In some cases, the trim ring 482 may be used when the thermostat 406 is to be secured directly to the wall mountable connector 404, without use of the adaptor plate 402. This is just an example. In some cases, the trim ring 482 has an outer profile 492 that transitions from a back side 494 having a back side perimeter that is greater than a front portion perimeter of the thermostat housing 412 to a front side 496 having a front side perimeter that substantially matches the front portion perimeter of the thermostat housing 412. As can be seen in FIG. 29, the profile of the trim ring 482 may flow smoothly into the profile of the thermostat housing 412 to provide a desirable design aesthetic.

In some cases, the back portion 418 of the thermostat housing 412 includes trim ring mounting features 484 that are disposed along the back portion side wall 420 that are configured to releasable engage corresponding mounting features 486 formed as part of the trim ring 482 (see FIG. 30). In some cases, the trim ring mounting features 484 are protrusions and the corresponding mounting features 486 are apertures into which the protrusions fit. In some cases, the trim ring 482 defines an aperture 488 that is configured to enable the thermostat 406 to extend through the aperture or recess 488 and engage the wall mountable connector 404. The aperture or recess 488 is defined at least in part by a aperture or recess side wall 490. In some cases, the corresponding mounting features 486 are formed within the aperture or recess side wall 490.

The trim ring 482 is configured to be secured to the thermostat 406, which is itself secured to the wall mountable connector 404 via electrical and mechanical connections therebetween. In some cases, the aperture or recess 488 is configured to accommodate the back portion 418 of the thermostat housing 412. In some instances, the aperture or recess 488 has a depth that is about equal to a depth of the back portion 418 of the thermostat housing 412. In some cases, as shown, the aperture or recess 488 extends through the trim ring 482 from the back side 494 to the front side 496. In this example, the trim ring 482 does not interfere with mounting the thermostat 406 to the wall mountable connector 404.

Figure 31:
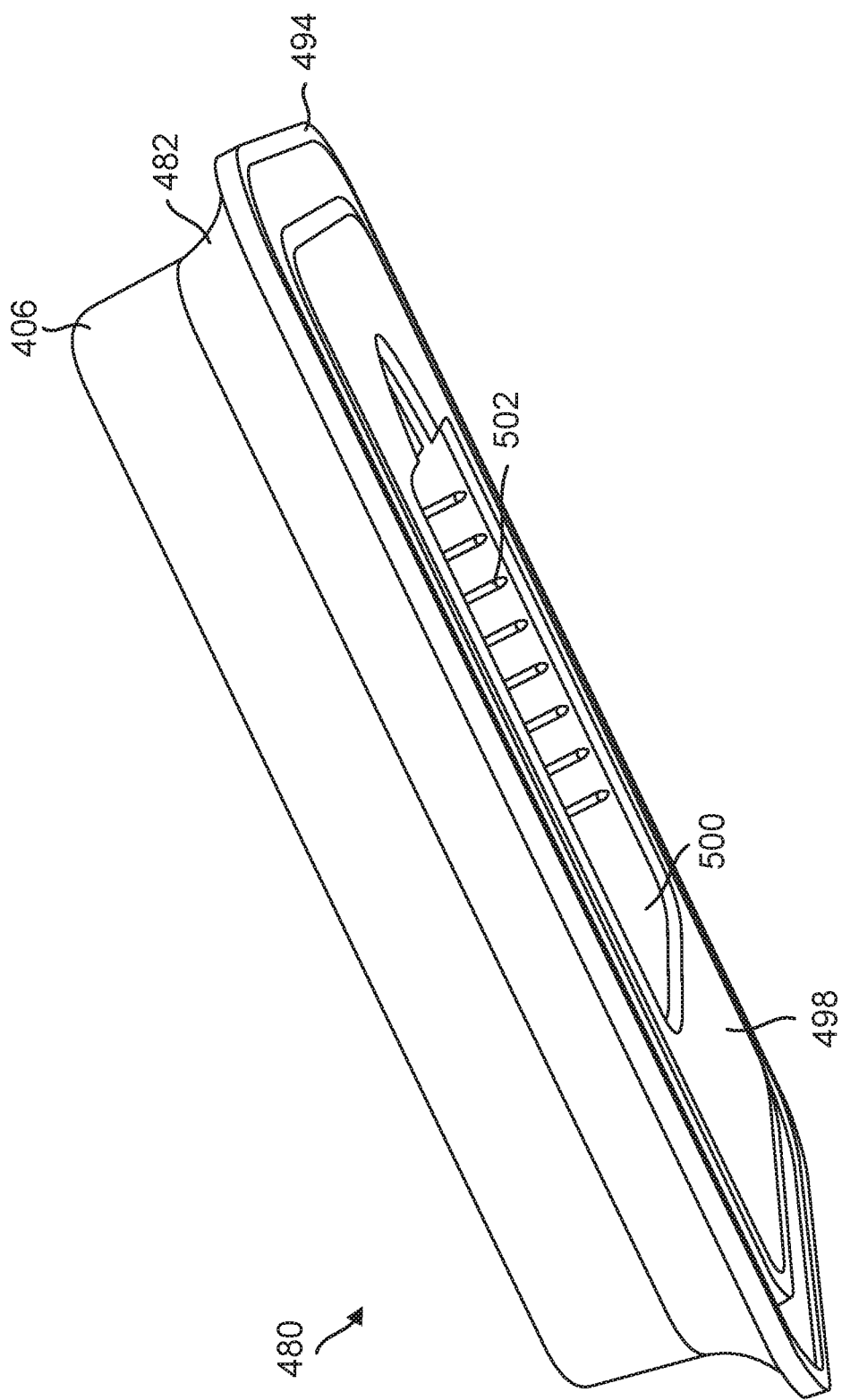
FIG. 31 is a side perspective view of the illustrative thermostat assembly of FIG. 29.

This can be seen in FIG. 31, which is a rear perspective view of the thermostat assembly 480. It can be seen that the thermostat 406 has a rear surface 498 that substantially aligns with the back side 494 of the trim ring 482. The trim ring 482 does not extend behind or rearward beyond the rear surface 498 of the thermostat 406. A recess 500 is formed in the rear surface 498 that is sized and configured to accommodate the wall mountable connector 404. Also visible are some of the terminal pins 502 that provide electrical connections between the thermostat 406 and the wall mountable connector 404, and thus electrical connections between the thermostat 406 and the field wires (not shown) that are electrically coupled to pin terminals formed within the wall mountable connector 404. The terminal pins 502 also provide a mechanical connection between the thermostat 406 and the wall mountable connector 404.

Figure 32:
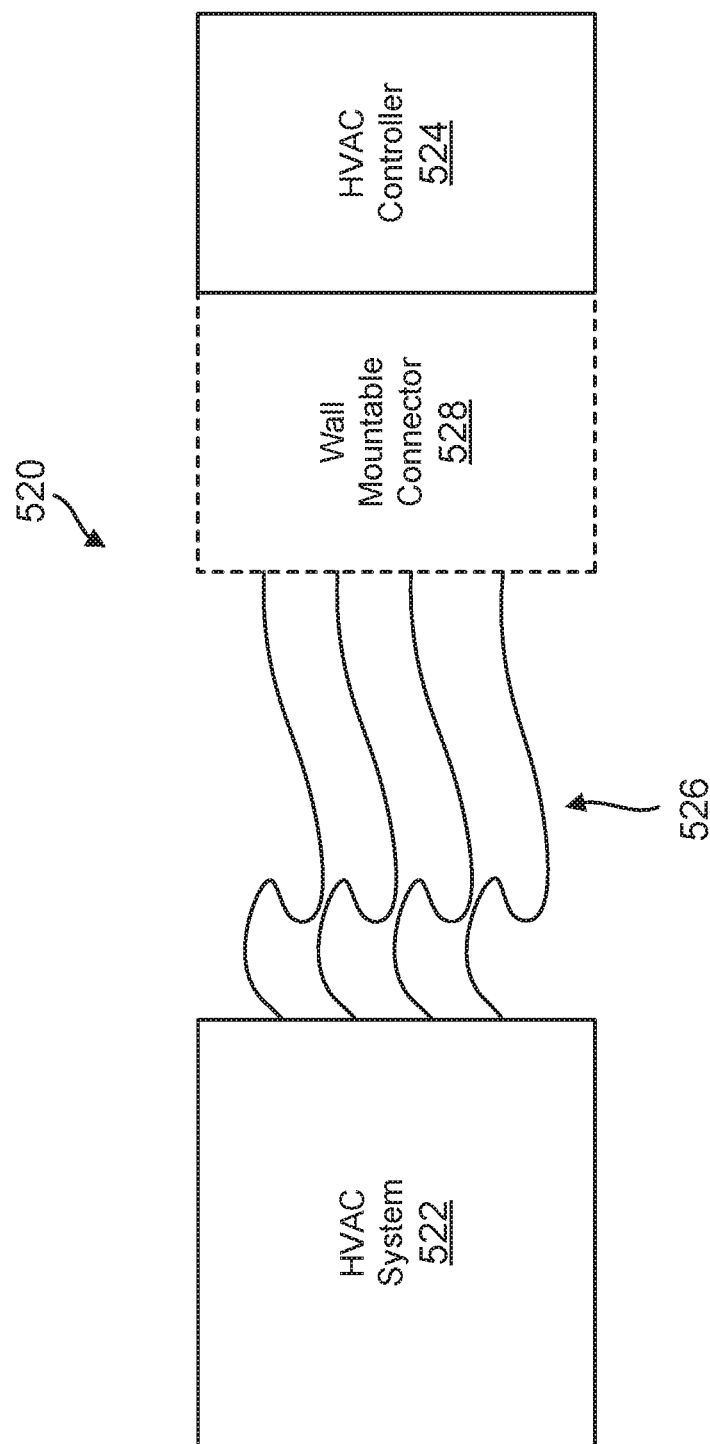
FIG. 32 is a schematic diagram of an illustrative HVAC system and an HVAC controller.

FIG. 32 provides a schematic block diagram of a system 520 that includes an HVAC system 522 that is controlled by an HVAC controller 524. It will be appreciated that the HVAC controller 524 may be considered as being an example of the HVAC controller 18 (FIG. 1), the HVAC controller 110 (FIG. 4) or the HVAC controller 280 (FIG. 15). It will also be appreciated that features and functions of any of these HVAC controllers 18, 110, 280, 524 may be combined with features and functions of others of these HVAC controllers 18, 110, 280, 524. The HVAC controller 524 is operably coupled to the HVAC system 522, in order to receive information from the HVAC system 522 as well as to provide control signals to the HVAC system 522, via a plurality of field wires 526. While a total of four field wires 526 are illustrated, it will be appreciated that this is merely illustrative, as the total number of field wires 526 can vary considerably, depending on the particular features of the HVAC system 522.

In some cases, the field wires 526 are directly coupled to the HVAC controller 524. In some instances, the HVAC controller 524 may be coupled to a wall mountable connector 528 (such as but not limited to the wall mountable connector 404), and the field wires 526 are coupled to the wall mountable connector 528. The wall mountable connector 528 provides electrical connections between each of the field wires 526 and electrical connectors forming part of the HVAC controller 524. In either case, there may be a desire to know if a field wire 526 is connected, either directly or indirectly, with a particular electrical input on the HVAC controller 524. As will be appreciated, the HVAC controller 524 may be configured to utilize knowledge of which field wires 526 are coupled to which particular electrical inputs on the HVAC controller 525 to gain knowledge of details of the HVAC system 522, thereby improving functionality and/or performance of the HVAC controller 524 in operating the HVAC system 522.

Figure 33:
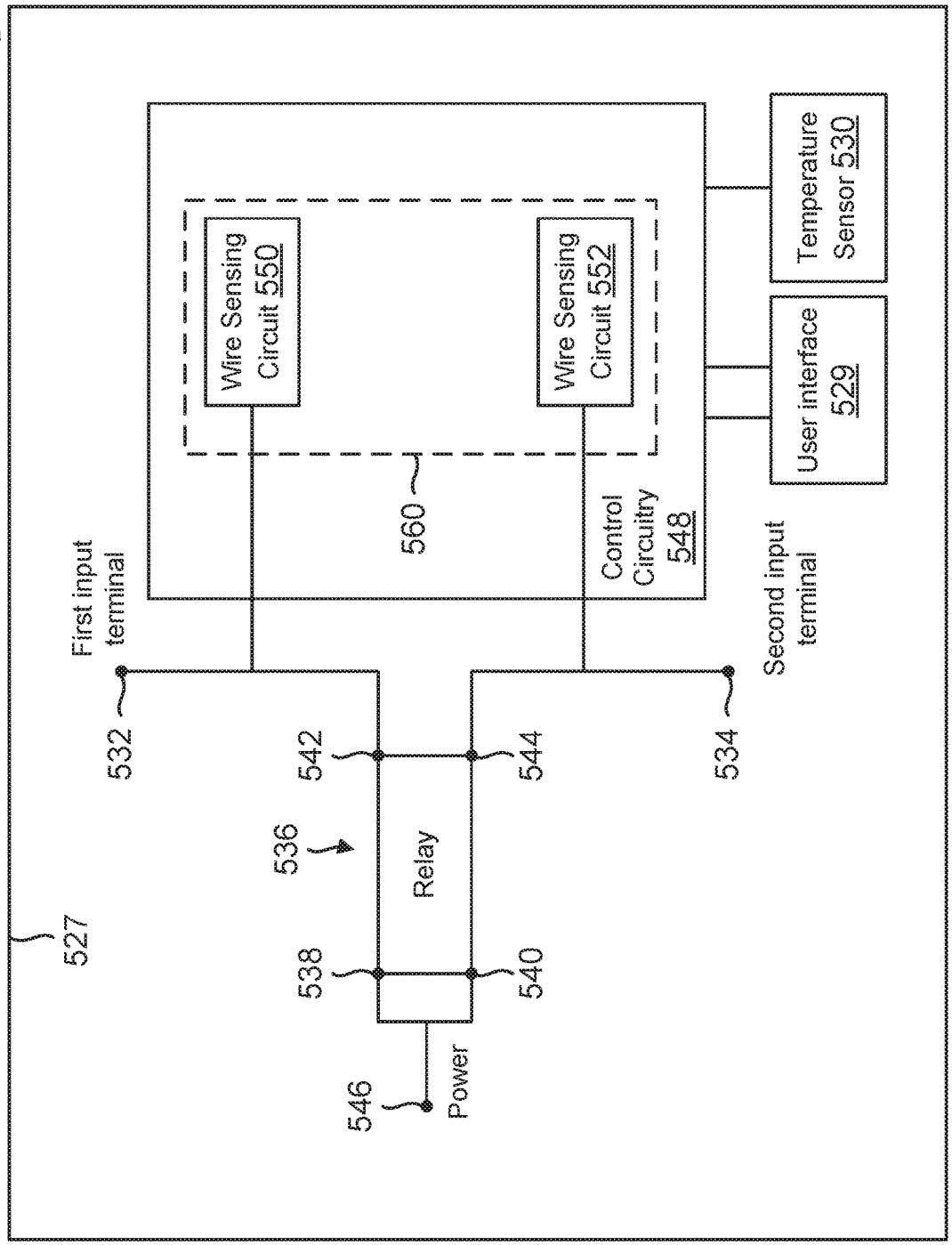
FIG. 33 is a schematic diagram of the illustrative HVAC controller of FIG. 32 with built in field wiring sensing circuitry.

FIG. 33 is a schematic block diagram of the HVAC controller 524. The illustrative HVAC controller 524 includes a housing 527 and a user interface 529 that is accessible from an exterior of the housing 527. In the example shown, a temperature sensor 530 is disposed relative to the housing 527. The HVAC controller 524 includes a first input terminal 532 that is configured to be electrically coupled with a first field wire 526 and a second input terminal 534 that is configured to be electrically coupled with a second field wire 526. In some cases, the first input terminal 532 may be a first stage heat "W" terminal and the second input terminal may be heat pump O/B terminal. Typically, a field wire should only be connected to one of these terminals, but not both.

In the example shown, a double pole relay 536 includes two input terminals 538 and 540 and two output terminals 542 and 544. In some cases, the double pole relay 536 is a double pole, single throw relay, but this is not required in all cases. In the example shown, the two input terminals 538 and 540 are operably coupled to a power source 546, such as an "R" field wire. As illustrated, the output terminal 542 is operably coupled to the first input terminal 532 and the output terminal 544 is operably coupled to the second input terminal 534. The double pole relay 536 includes an open state where the output terminals 542, 544 are disconnected from the two input terminals 538, 540 and thus the power source 546, and a closed state where the output terminals 542, 544 are connected to the power source 546 via the two input terminals 538, 540.

The HVAC controller 524 may include control circuitry 548 that is operably coupled to the temperature sensor 530 and the double pole relay 536. The control circuitry 548 is configured to change the double pole relay 536 between the open state and the closed state based at least in part on a temperature sensed by the temperature sensor 530 in order to control operation of at least part of the HVAC system 522. In some instances, as illustrated, the control circuitry 548 further includes a first wire sensing circuit 550 that is operably coupled with the first input terminal 532, wherein when the double pole relay 536 is the open state, the first wire sensing circuit 550 is configured to electrically detect when the first field wire 526 is electrically coupled with the first input terminal 532. The control circuitry 548 may further include a second wire sensing circuit 552 that is operably coupled with the second input terminal 534, wherein when the double pole relay 536 is the open state, the second wire sensing circuit 552 is configured to electrically detect when the second field wire 526 is electrically coupled with the second input terminal 534.

In some cases, the first wire sensing circuit 550 is configured to electrically detect when the first field wire 526 is electrically coupled with the first input terminal 532 independently of whether the second field wire 526 is electrically coupled with the second input terminal 534. The second wire sensing circuit 552 may be configured to electrically detect when the second field wire 526 is electrically coupled with the second input terminal 534 independently of whether the first field wire 526 is electrically coupled with the first input terminal 532. In some cases, when the double pole relay 536 is in the open state, the first and second wire sensing circuits 550, 552 are configured to determine when only the first field wire 526 is electrically coupled to the first input terminal 532, only the second field wire 526 is electrically coupled to the second input terminal 534, both the first field wire 526 and the second field wire 526 are electrically coupled to the first input terminal 532 and the second input terminal 534, respectively, and neither the first field wire 526 or the second field wire 526 are electrically coupled to the first input terminal 532 and the second input terminal 534, respectively.

As noted above, in some cases, the first input terminal 532 corresponds to an O/B input terminal. The second input terminal 534 may, in some instances, correspond to a W input terminal. In some cases, the power source 546 may be an R input terminal and may be operably coupled to the two input terminals 538, 540 of the double pole relay 536. In such cases, when the double pole relay 536 is closed, the R input terminal 546 is electrically coupled with the O/B input terminal 532 and the W input terminal 534 through the double pole relay 536. The HVAC controller 524 may include additional input terminals, such as but not limited to one or more of a Y input terminal, a G input terminal, a C input terminal, an $R_C$ input terminal, a $Y_1$ input terminal, a $Y_2$ input terminal, a $W_1$ input terminal, a $W_2$ input terminal, a $U_1$ input terminal and a $U_2$ input terminal.

In some cases, and with reference to FIG. 32, the HVAC controller 524 may be configured to be operably coupled to the wall mountable connector 528, and the wall mountable connector 528 may include a plurality of wire terminals for accepting a plurality of field wires 526, including a first wire terminal for accepting the first field wire 526 and a second wire terminal for accepting the second field wire 526, where the first wire terminal and the second wire terminal are electrically coupled with the first input terminal 532 and the second input terminal 534, respectively, when the HVAC controller 524 is operably coupled with the wall mountable connector 528.

In some cases, the control circuitry 548 may be considered as including a wire detection circuit 560 that includes the first wire sensing circuit 550 and the second wire sensing circuit 552. In some cases, the wire detection circuit 560 may be distinct from the control circuitry 548, which may be considered as being a controller. When the first input terminal 532 is an O/B input terminal and the second input terminal 534 is a W input terminal, the wire detection circuit 560 is configured to inform the controller (or control circuitry 548) that the HVAC system 522 includes a heat pump when it is electrically detected that an O/B wire is electrically coupled with the O/B input terminal and the W field wire is not electrically coupled with the W input terminal. The wire detection circuit 560 is configured to inform the control circuitry 548 that the HVAC system 522 has a conventional heat stage when it is electrically detected that a W field wire is electrically coupled with the W input terminal and an O/B wire is not electrically coupled with the O/B input terminal. The HVAC system 522 may be informed that there is a wiring error when it is electrically detected that the W field wire is electrically coupled with the W input terminal and the O/B wire is electrically coupled with the O/B input terminal, or that there is no W field wire electrically coupled with the W input terminal and there is no O/B wire electrically coupled with the O/B input terminal.

Figure 34:
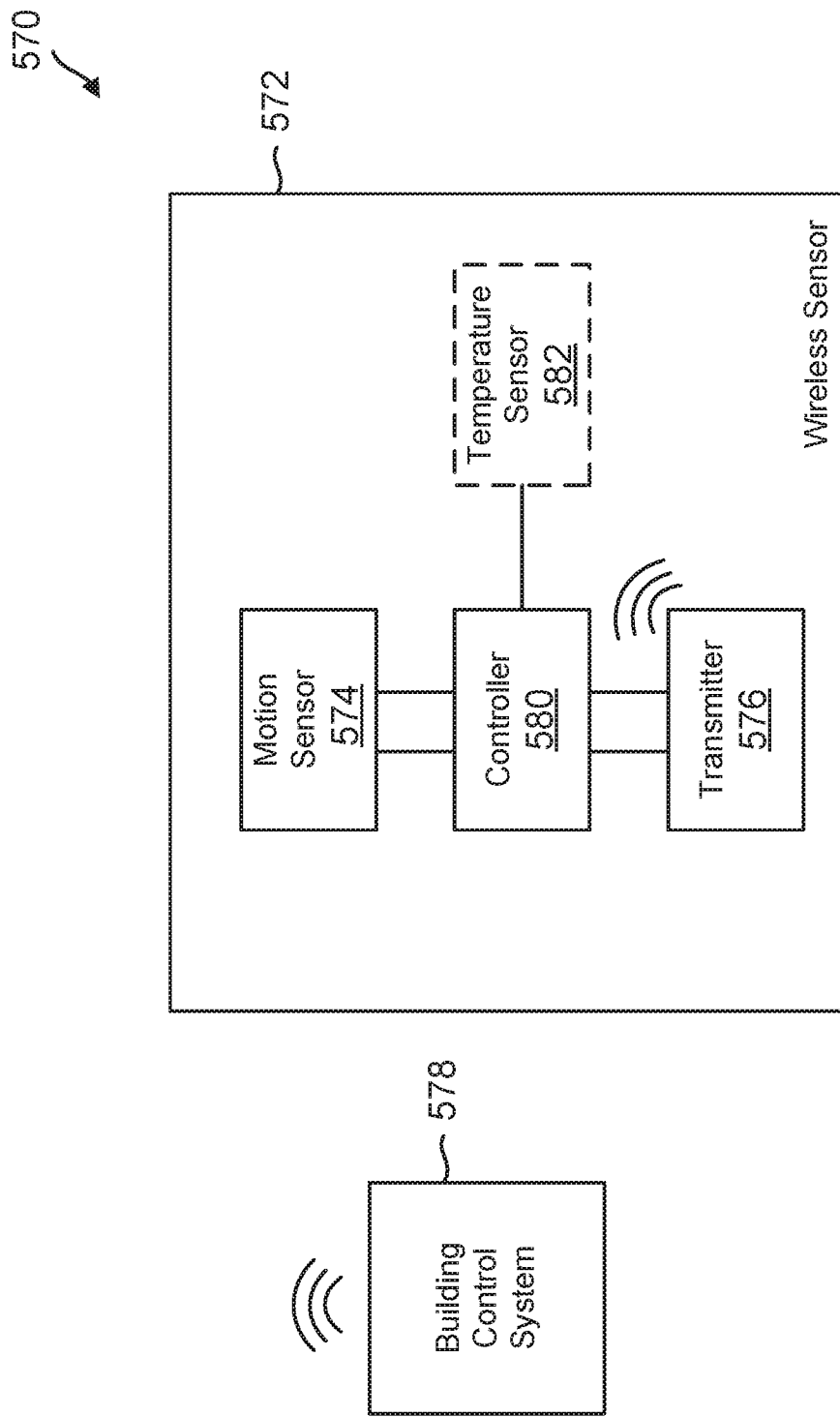
FIG. 34 is a schematic block diagram of an illustrative wireless sensor assembly.

FIG. 34 is a schematic block diagram of a wireless occupancy sensor assembly 570 that is configured to be deployed within a building space. The wireless occupancy sensor assembly 570 may be considered as an example of the wireless sensor 21 referenced in FIG. 1. The wireless occupancy sensor assembly 570 includes a housing 572 and a motion sensor 574 that is disposed relative to the housing 572. The motion sensor 574 may be a passive infrared (PIR) motion sensor, a microwave sensor, or any other suitable occupancy or motion sensor. A transmitter 576 is disposed relative to the housing 572 and is configured to be in wireless communication occupancy and/or other signals with a building control system 578. The building control system 578 may operate or help to operate one or more building systems within a building, such as but not limited to an HVAC system, a security system and/or any other suitable building control system. A controller 580 is disposed within the housing 572 and is operably coupled to the motion sensor 574 and to the transmitter 576. In some instances, the wireless occupancy sensor assembly 570 may include a temperature sensor 582 that is disposed relative to the housing 572, and the controller 580 may be configured to transmit an indication of temperature sensed by the temperature sensor via the transmitter.

In some cases, the controller 580 may be configured to provide a dynamic timeout response to an indication of motion and thus an indication of occupancy. When so provided, the controller 580 may be configured to set a motion count value to an initial value (e.g. zero) and to wait to receive an indication of motion from the motion sensor 574. An indication of motion may be received from the motion sensor 574. In response, the controller 580 may transmit an indication of occupancy via the transmitter 576, increment a motion count value and update a length of a dynamic time period based on the incremented motion count value. Once the indication of motion is no-longer indicated by the motion sensor 574, the controller 580 may start the dynamic time period. If another indication of motion is received from the motion sensor 574 before the dynamic time period expires, the controller 580 may increment the motion count value, update the length of the dynamic time period based on the incremented motion count value, and restart the dynamic time period. If another indication of motion is not received from the motion sensor 574 before the dynamic time period expires, the controller 580 may transmit an indication of un-occupancy after the dynamic time period expires, reset the motion count value to the initial value, update the length of the dynamic time period based on the reset motion count value, and return to wait to receive an indication of motion from the motion sensor 574.

In some cases, the controller 580 may increase the length of the dynamic time period when the incremented motion count value exceeds one or more thresholds. The controller 580 may be configured to set the length of the dynamic time period to a first length when the motion count value is below a low motion count threshold, to set the length of the dynamic time period to a second length longer than the first length when the motion count value is above the low motion count threshold but below a high motion count threshold, and to set the length of the dynamic time period to a third length longer than the second length when the motion count value is above the high motion count threshold. As an illustrative but non-limiting example, the first length may be less than about 20 minutes, the second length may be less than about 40 minutes and the third length may be less than about 90 minutes. Rather than using predefined thresholds, the controller 580 may simply store a relationship (e.g. formula or table) between a motion count value and a dynamic time period. The relationship may be linear, non-linear, stepped, and/or define any other relationship. These are just examples. In some cases, the indication of occupancy transmitted by the controller 580 is a logical value of TRUE and the indication of un-occupancy transmitted by the controller 580 is a logical value of FALSE, but this is not required.

Figure 35:
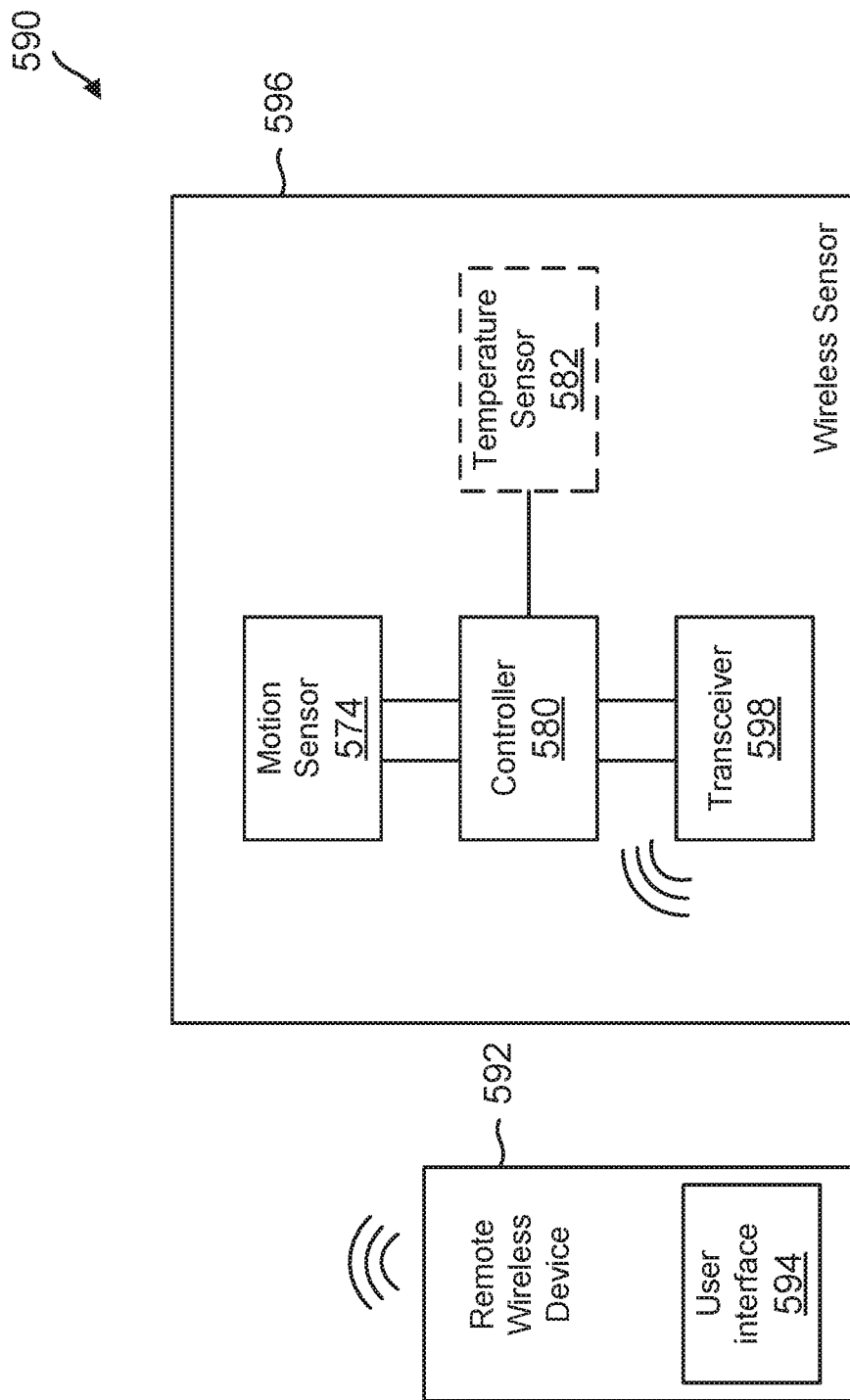
FIG. 35 is a schematic block diagram of an illustrative wireless sensor assembly.

FIG. 35 is a schematic block diagram of an illustrative wireless occupancy sensor assembly 590 that is configured to be deployed within a building space and to communicate with a remote wireless device 592 having a user interface 594. In some cases, the remote wireless device 592 allows a user to input a sensitivity parameter via the user interface 594. In some instances, the remote wireless device 592 may be a building controller, such as but not limited to an HVAC controller. In some cases, the remote wireless device may be a smart phone. The wireless occupancy sensor assembly 590 may be configured to communicate with a plurality of different remote wireless devices 592, although this is not required. The wireless occupancy sensor assembly 590 may be considered as an example of the wireless sensor 21 referenced in FIG. 1. The wireless occupancy sensor assembly 590 includes a housing 596. The motion sensor 574 is disposed relative to the housing 596. A transceiver 598 is disposed relative to the housing 596 for communicating with the remote wireless device 592 and for receiving a sensitivity parameter from the remote wireless device 592. In some cases, the wireless occupancy sensor assembly 590 may include the temperature sensor 582 disposed relative to the housing 596. In some cases, the controller 580 may be configured to wirelessly transmit an indication of occupancy and non-occupancy to a building controller.

Figure 36:
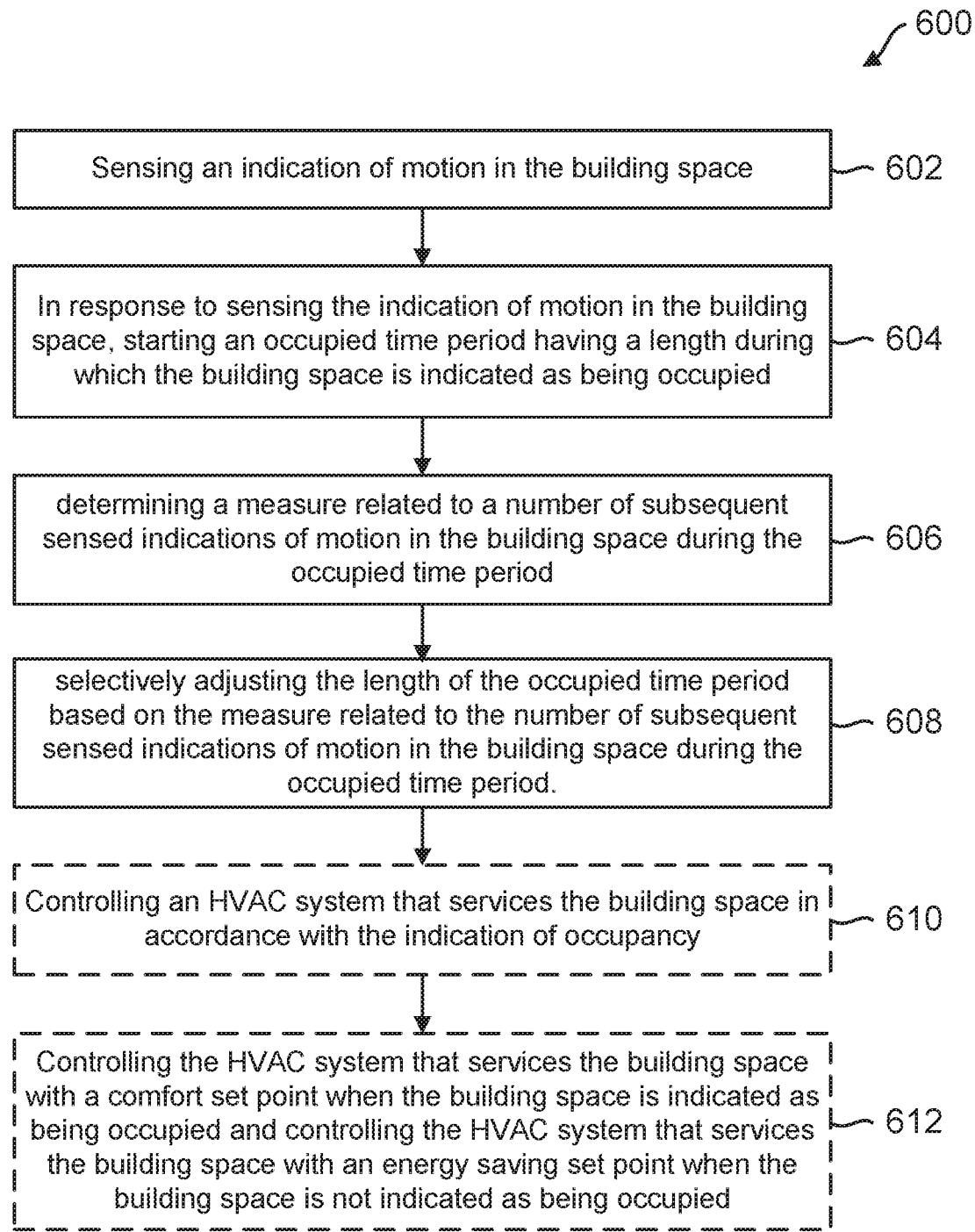
FIG. 36 is a flow diagram showing an illustrative method that may be carried out using the wireless sensor assemblies of FIGS. 34 and 35.

In some cases, the controller 580 is disposed within the housing 596 and is operably coupled with the motion sensor 574 and the transceiver 598. The controller 580 may be configured to receive via the transceiver 598 a sensitivity parameter and/or a manual timeout adjustment parameter. In some cases, for example, a sensitivity parameter may increase or decrease a sensitivity of the motion sensor 574. A user may desire to increase the sensitivity of the motion sensor 574 if the motion sensor 574 only sometimes detects when a particular individual walks into or through a room in which the wireless occupancy sensor assembly 590 is located. Conversely, a user may desire to decrease the sensitivity of the motion sensor 574 if the motion sensor 574 is providing false positives, such as if the motion sensor 574 is frequently indicating occupancy as a result of detecting movement of a window treatment in response to air passing through an open window, for example. In some instances, a user may wish to increase or decrease a timeout value that indicates how long the motion sensor 574 will report occupancy in response to detecting motion. If the wireless occupancy sensor assembly 590 is in a location where users frequently walk past, but do not stay in the room, they may wish to decrease the timeout value. If the wireless occupancy sensor assembly 590 is in a location where users congregate, but do not move frequently (such as when watching television), they may wish to increase the timeout value. These are just examples. FIG. 36 is a flow diagram showing an illustrative method 600 for determining occupancy status of a building space. A building space may be an entire building, a room or several rooms, a portion of an open area, and the like. The illustrative method 600 begins with sensing an indication of motion in the building space, as indicated by block 602. In response to sensing the indication of motion in the building space, an occupied time period may be started having a length during which the building space is indicated as being occupied, as indicated at block 604. The length of the occupied time period may be increased when the measure related to the number of subsequent sensed indications of motion in the building space occurring during the occupied time period exceeds a threshold. In some instances, the length of the occupied time period may not be adjusted when the measured related to the number of subsequent sensed indications of motion in the building space during the occupied time period does not exceed a threshold.

A measure may be determined that is related to a number of subsequent sensed indications of motion in the building space during the occupied time period, as indicated at block 606. The length of the occupied time period may be selectively adjusted based on the measure related to the number of subsequent sensed indications of motion in the building space during the occupied time period, as indicated at block 608.

In some instances, an HVAC system that services the building space may be controlled in accordance with the indication of occupancy, as optionally indicated at block 610. In some cases, the method 600 includes controlling the HVAC system that services the building space with a comfort set point when the building space is indicated as being occupied and controlling the HVAC system that services the building space with an energy saving set point when the building space is not indicated as being occupied, as noted at block 612. In some cases, the method 600 includes selectively adjusting a time from a last sensed indication of occupancy/motion in the building space until an end of the occupied time period based on the measure related to the number of subsequent sensed indications of motion in the building space during the occupied time period.

Figure 37:
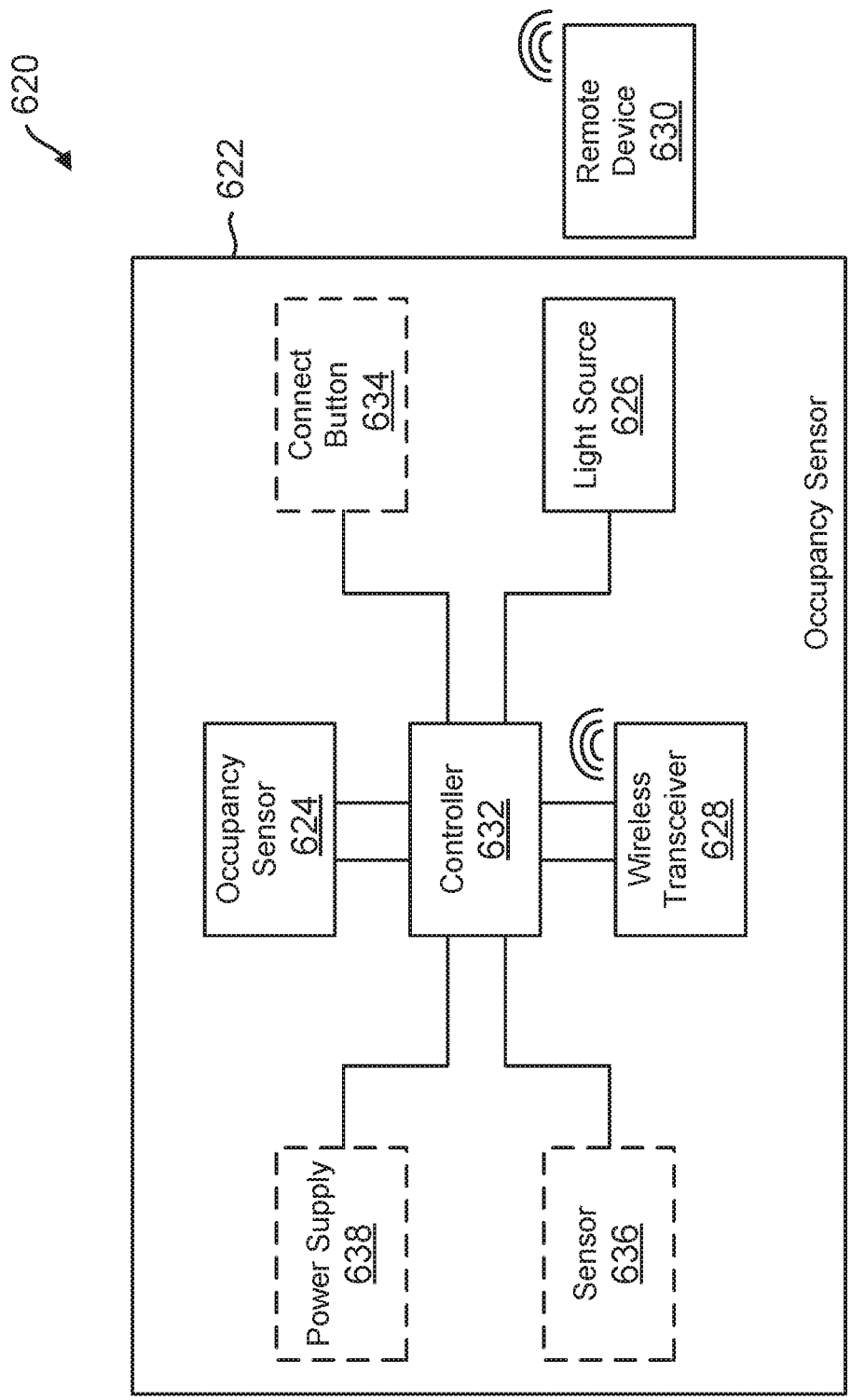
FIG. 37 is a schematic block diagram of an illustrative wireless occupancy sensor.

FIG. 37 is a schematic block diagram of an illustrative wireless occupancy sensor 620 that is configured to be deployed in a building space. The illustrative wireless occupancy sensor 620 includes a sensor body 622 and an occupancy sensor 624 that is housed by the sensor body 622.

A light source 626 is housed by the sensor body 622. In some cases, the light source 626 may be a light emitting diode (LED), and may be configured to emit visible light sometimes in various colors, depending on the purpose of why the LED is being illuminated. For example, if the light source 626 is being illuminated to help identify the wireless occupancy sensor 620, the light source 626 may be illuminated in a green color. Alternatively, if the light source 626 is being illuminated to alert a homeowner to a low battery situation, for example, the light source 626 may be periodically illuminated in yellow as an initial warning, and may be illuminated in red as a sterner warning as the low battery situation becomes more critical. These are just examples.

The illustrative wireless occupancy sensor 620 includes a wireless transceiver 628 that is housed by the sensor body 622 and that is configured to be in wireless communication with a remote device 630. The remote device 630 may be any of a portable handheld remote device, a smart phone, a building control device, a wall mountable thermostat, a zone damper controller and/or any other suitable device. In some cases, the wireless transceiver 628 may be configured to be in wireless communication with a plurality of remote devices 630. A controller 632 is housed by the sensor body 622 and is operably coupled to the occupancy sensor 624, the light source 626 and the wireless transceiver 628. The controller 632 may be configured to receive via the wireless transceiver 628 a request to illuminate the light source 626 from the remote device 630, and in response to receiving the request, the controller 632 may illuminate the light source 626 (such as an LED) in order to help visually identify the wireless occupancy sensor 620 in the building space. In some cases, the wireless occupancy sensor 620 includes a CONNECT button 634 that may be used in pairing the wireless occupancy sensor 620 with another device. When pressed, the CONNECT button 634 may place the wireless occupancy sensor 620 in an enroll mode to enroll the wireless occupancy sensor 620 in a wireless building control network.

In some cases, the illustrative wireless occupancy sensor 620 may include a temperature sensor 636 that is operably coupled to the controller 632, and may include a power supply 638. When so provided, the controller 632 may be configured to repeatedly report a current temperature that is reported by the temperature sensor 636 to the remote device 630 and/or some other remote device (e.g. a building controller) via the wireless transceiver 628. The controller 632 may also repeatedly make a determination of whether a particular building space is occupied or not, and may report the determined occupancy status of the building space to the remote device 630 and/or some other remote device via the wireless transceiver 628.

In some cases, the request to illuminate the light source 626 may be made after the wireless occupancy sensor 620 has been enrolled in a wireless building control network, and the request is made by a building controller connected to the wireless building control network. In some instances, the request to illuminate the light source 626 may include an address that specifically identifies the wireless occupancy sensor 620 from one or more other wireless devices on the wireless building control network. In some cases, the request to illuminate the light source 626 may be user initiated to help identify the wireless occupancy sensor 620 from other devices on the wireless building control network. These are just examples. In some cases, the controller 632 may monitor remaining energy within the power supply 638. In some instances, the request to illuminate the light source 626 may include a request for the light source 626 to be illuminated in one of several different colors.

Figure 38:
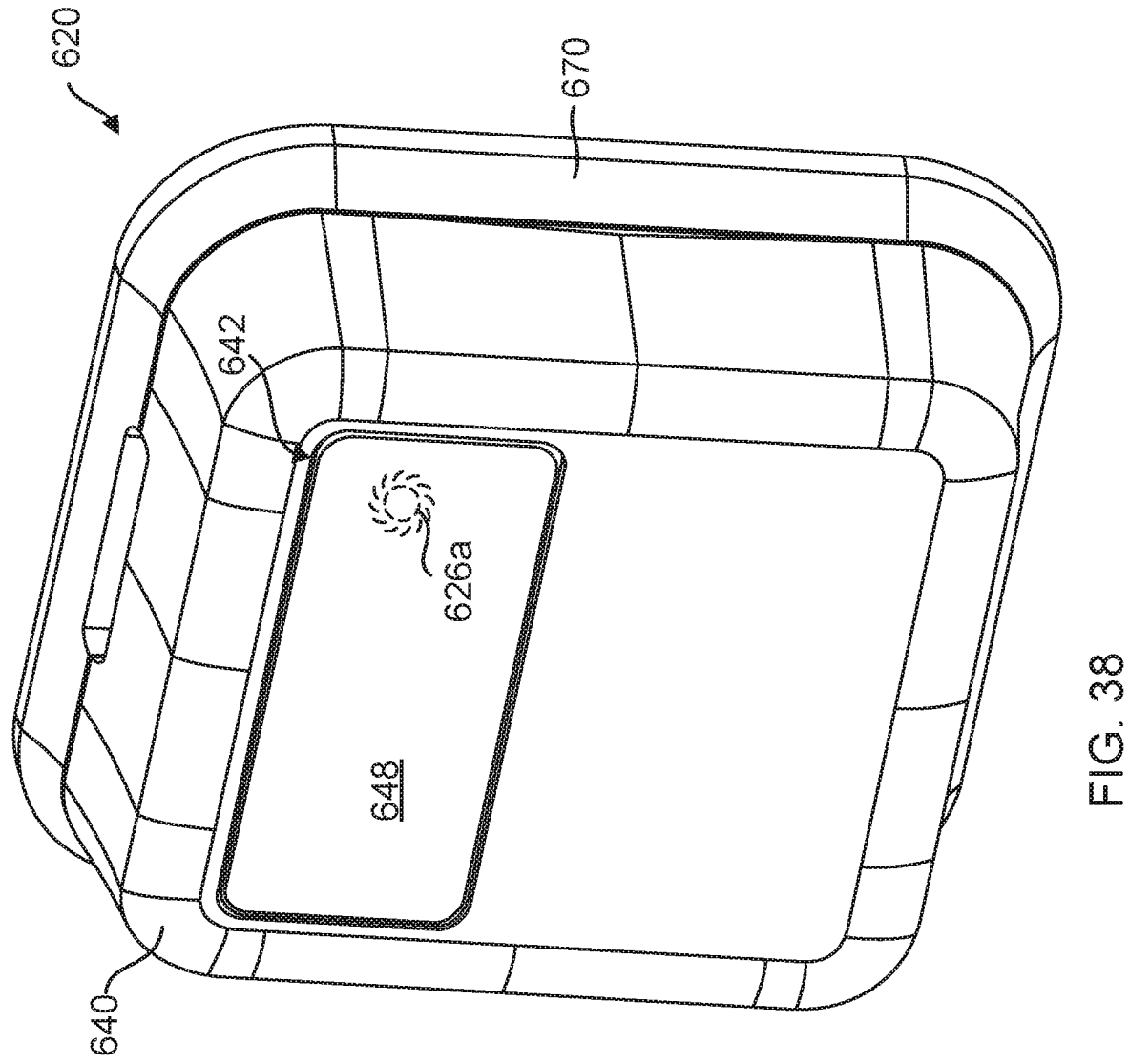
FIG. 38 is a perspective view of the illustrative wireless occupancy sensor of FIG. 37.
Figure 40:
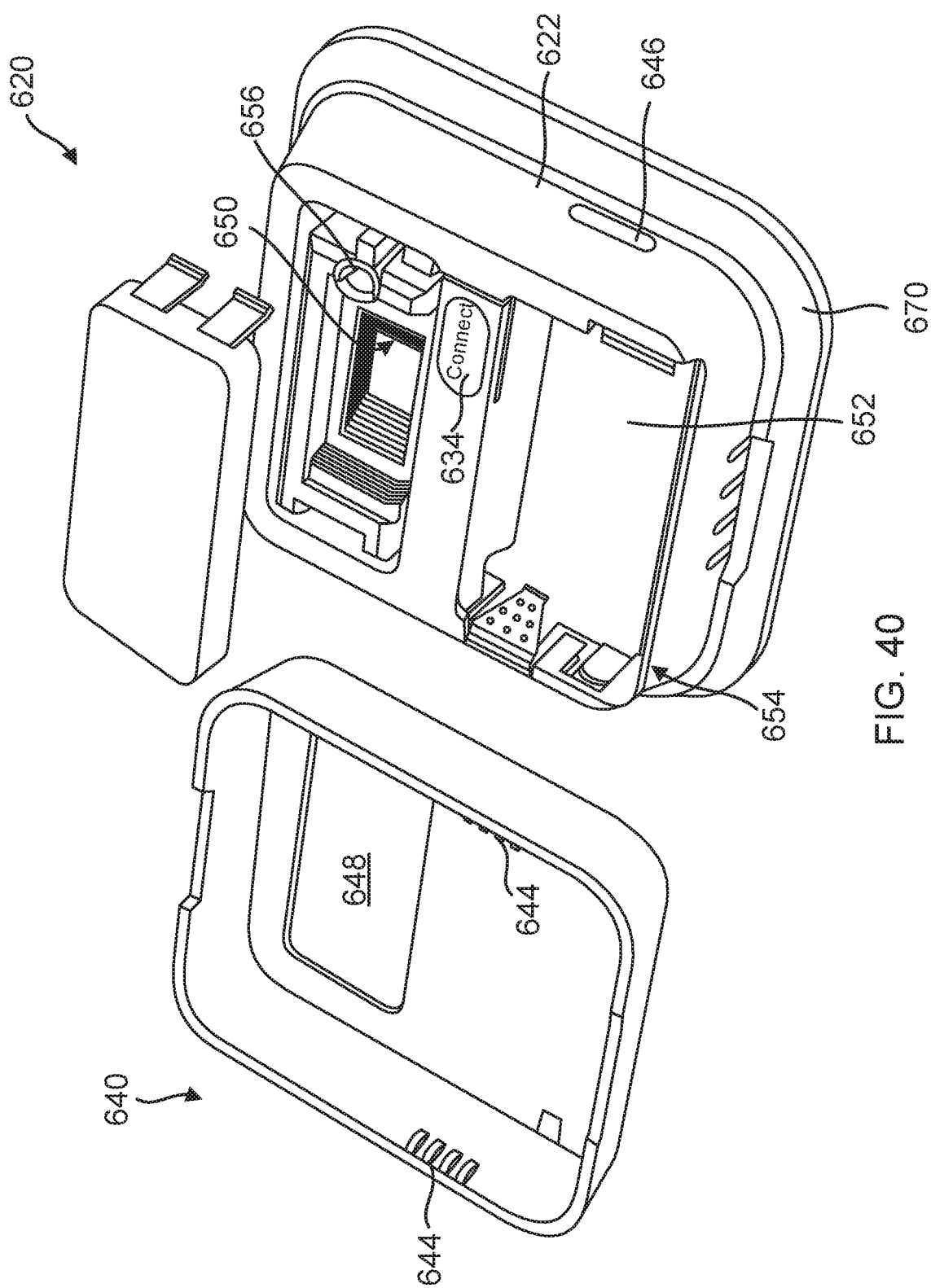
FIG. 40 is a partially exploded perspective view of the illustrative wireless occupancy sensor of FIG. 37.

FIGS. 38 through 40 provide various views of the wireless occupancy sensor 620.

FIG. 38 is a perspective view, FIG. 39 is a partially exploded perspective view and FIG. 40 is a further partially exploded view of the wireless occupancy sensor 620. As noted with respect to FIG. 37, the wireless occupancy sensor 620 has a sensor body 622. A front cover 640 fits across the front of the sensor body 622 and snaps into place. As shown for example in FIG. 40, the front cover 640 includes several mounting protrusions 644 that fit into corresponding mounting slots 646 (only one visible in illustrated orientation) formed into the sensor body 622. The front cover 640 includes an aperture 642 that is configured to accommodate a lens 648. A light 626a may be visible through the lens 648.

The sensor body 622 defines an aperture 650 on a front side of the sensor body 622. The aperture 650 exposes the occupancy sensor 624 and the light source 626. The lens 648, which in some cases may be a Fresnel lens, is situated in line with the aperture 650 to hide the occupancy sensor 624 and the light source 626. The lens 648 may be at least partially transparent to visible light. In some cases, the lens 648 may be formed of polyethylene such as high density polyethylene (HDPE). In some cases, the occupancy sensor 624 and the light source 626 are disposed on a printed circuit board 652, a portion of which is visible in FIG. 40 where the batteries (power supply 638) has been removed for clarity. In some cases, a light tube 656 extends from a position proximate the light source 626 to a position just behind the lens 648. A battery cavity 654, visible in FIG. 40, may be considered as being configured to accommodate one or more batteries. It will be appreciated that when the front cover 640 has been removed from the wireless occupancy sensor 620 that the battery cavity 654 is accessible without removing the wireless occupancy sensor 620 from the wall, and that the front cover 640, when in place, hides the battery cavity 654 and the batteries therein. It will be appreciated that the CONNECT button 634 is also hidden behind the removable front cover 640. The wireless occupancy sensor 620 includes a rear housing 670 that enables the wireless occupancy sensor 620 to be mounted to a wall or other vertical mounting surface.

Figure 41:
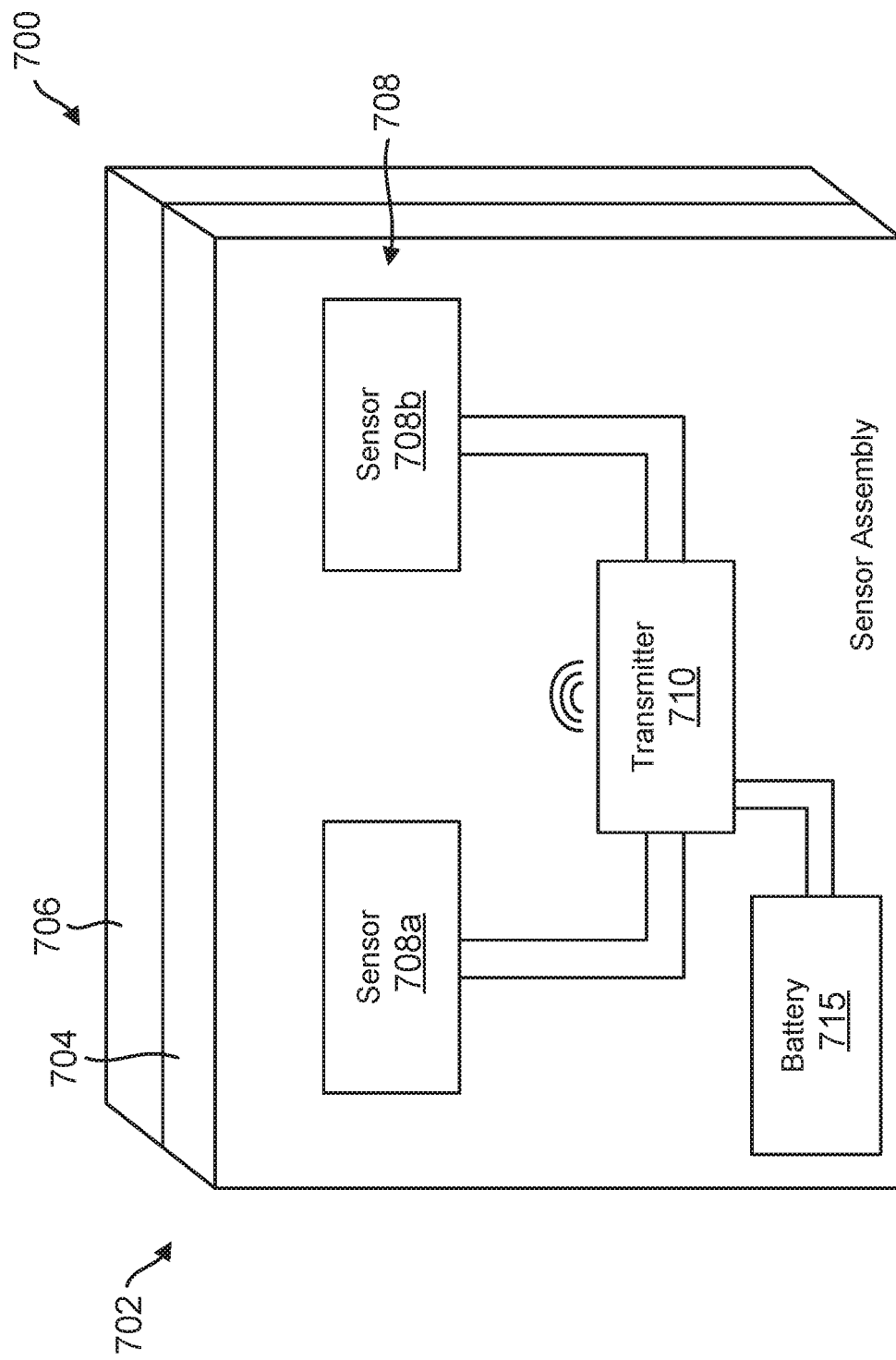
FIG. 41 is a schematic block diagram of an illustrative wireless sensor assembly.

FIG. 41 is a schematic block diagram of a wireless sensor assembly 700. It will be appreciated that features and elements of the wireless occupancy sensor 620 may be incorporated into the wireless sensor assembly 700, and that features and elements of the wireless sensor assembly 700 may be incorporated into the wireless occupancy sensor 620. The wireless sensor assembly 700 includes a sensor housing 702 with a front housing region 704 and a back housing region 706. The wireless sensor assembly 700 includes one or more sensors 708. As illustrated, there is a sensor 708a and a sensor 708b. In some cases there may be only one sensor 708. In other cases, there may be three or more distinct sensors 708, for example. The sensors 708 may include one or more of a temperature sensor, a motion sensor, both a temperature sensor and a motion sensor, a humidity sensor, a security sensor, a smoke sensor, a carbon monoxide sensor and/or any other suitable sensor. The wireless sensor assembly 700 includes a transmitter 710 for transmitting sensor values provided by the one or more sensors 708, the transmitter 710 being configured to be in wireless communication with a building control system that utilizes the transmitted sensor values in controlling a building control system of the building. The wireless sensor assembly 700 includes a battery 715.

Figure 42:
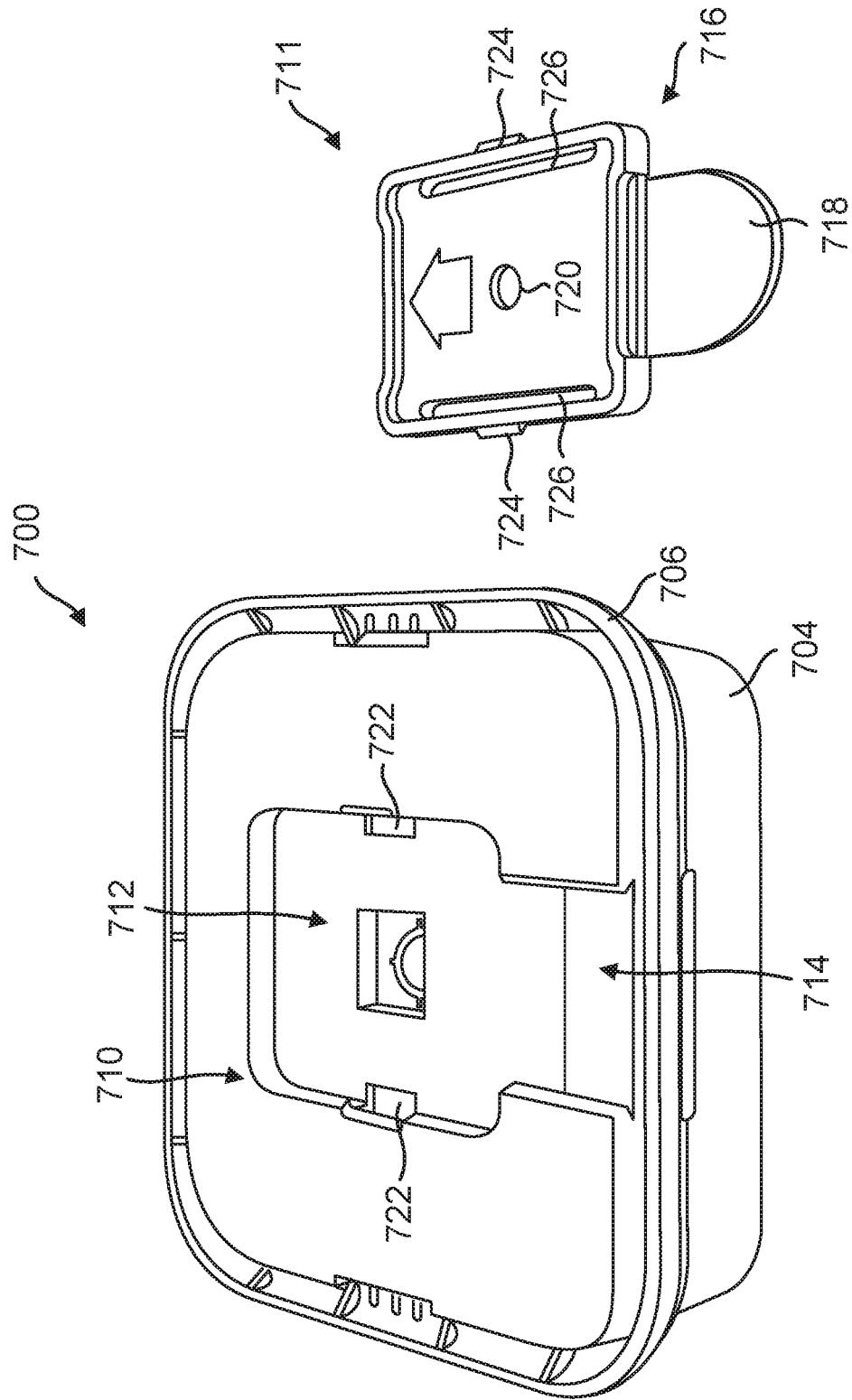
FIG. 42 is a rear perspective view of the illustrative wireless sensor assembly of FIG. 41.
Figure 43:
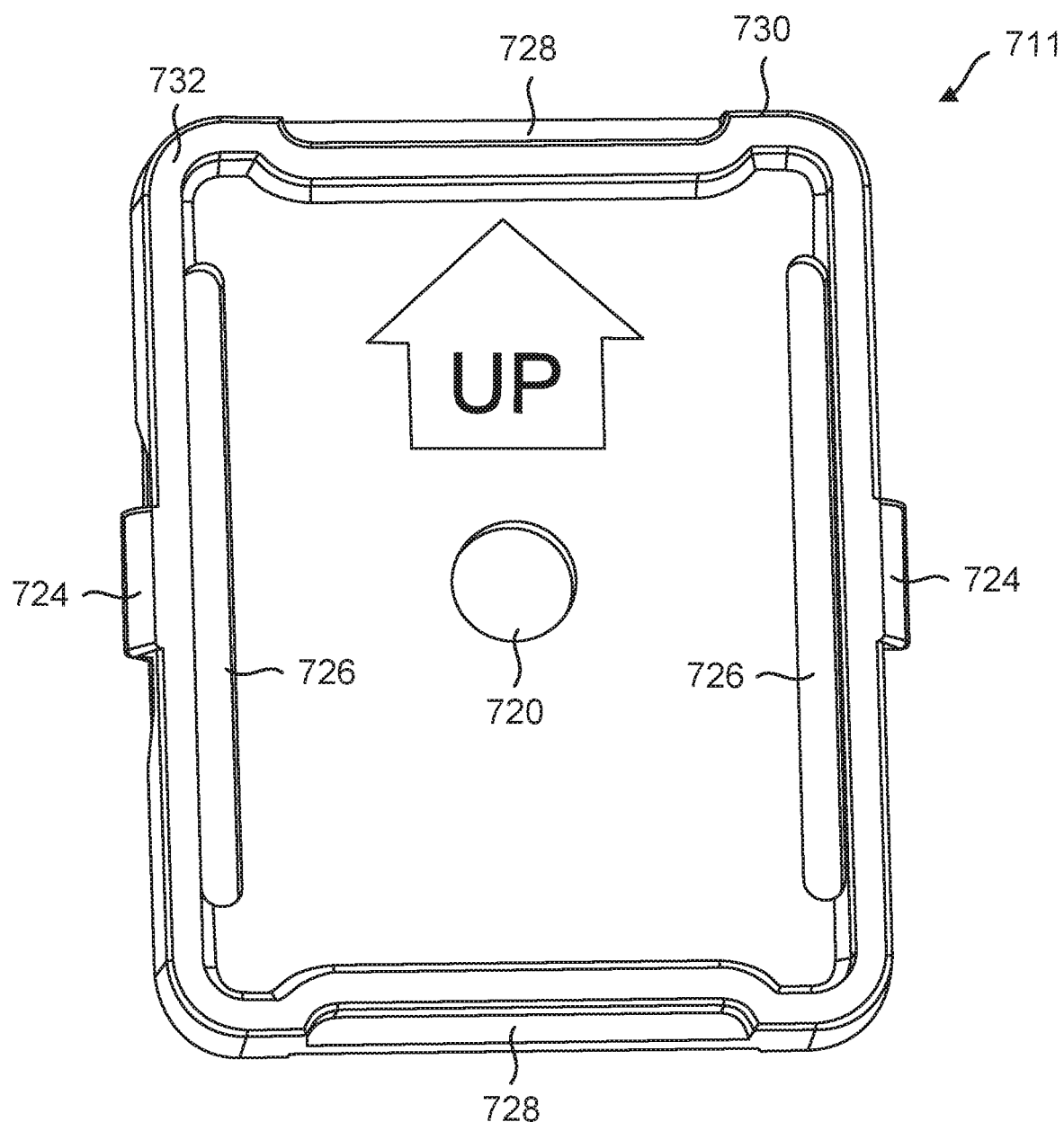
FIG. 43 is a front view of an illustrative wall plate useful in mounting the illustrative wireless sensor assembly of FIG. 41 to a wall or other vertical mounting surface.
Figure 44:
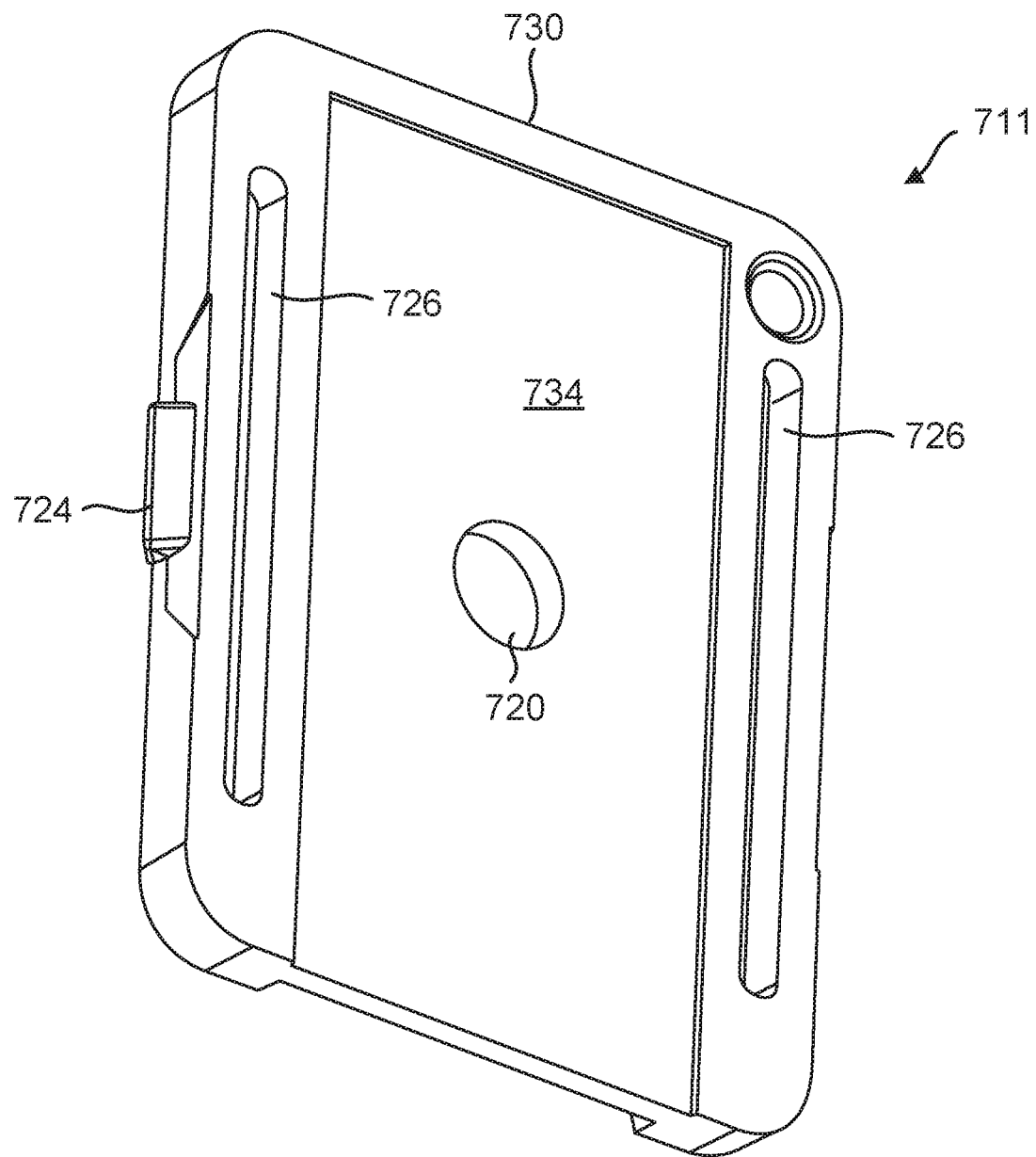
FIG. 44 is a back view of the illustrative wall plate of FIG. 43.

FIGS. 42 through 44 illustrate features that facilitate mounting the wireless sensor assembly 700 to a wall or other vertical mounting surface. While illustrated with respect to the wireless sensor assembly 700, it will be appreciated that the wireless occupancy sensor 620 may be mounted in a similar fashion. A wireless temperature, smoke, humidity or other sensor may also be mounted in a similar fashion.

FIG. 42 is a rear perspective view of the wireless sensor assembly 700, FIG. 43 is a front view of the wall plate 711 forming a portion of the wireless sensor assembly 700, and FIG. 44 is a rear view of the wall plate 711. FIG. 42 shows a rear portion of the back housing region 706 as well as the wall plate 711. In some instances, the wall plate 711 may be mounted to a wall or other vertical mounting surface, and the back housing region 706 may be secured to the wall plate 711 and thus secured relative to the wall or other vertical mounting surface.

As will be discussed, the illustrative wall plate 711 is configured to permit several different mounting techniques for securing the wall plate 711 relative to the wall or other vertical mounting surface. The illustrative wall plate 711 is configured to permit an installer to mount the wall plate 711 to the wall or other vertical mounting surface using multiple techniques. If desired, the installer may use a screw or other threaded fastener to secure the wall plate 711 by extending the screw or other threaded fastener through an aperture 720 that extends through the wall plate 711. In some cases, the aperture 720 may be centrally located within the wall plate 711, but this is not required. Alternatively, the installer may use an releasable adhesive strip, as will be discussed.

As can be seen, the back housing region 706 of the wireless sensor assembly 700 defines a recess 710 that is configured to receive at least a portion of the wall plate 711. In some instances, the recess 710 may be considered as including a primary recess 712 for receiving at least part of the wall plate 711 when the back housing region 706 is releasably secured to the wall plate 711, and a secondary recess 714 that is contiguous with the primary recess 712. The secondary recess 714 is configured to accommodate a release tab 718 of a releasable adhesive strip 716 (e.g. 3M COMMAND Strip) extending past a periphery of the wall plate 711, such that the back housing region 706 hides the release tab of the releasable adhesive strip from view when the back housing region 706 is secured to the wall plate 711. As will be appreciated, the release tab 718 will fit into the secondary recess 714 when the wireless sensor assembly 700 is secured to the wall plate 711.

In the example shown, the recess 710 includes mounting slots 722 that accommodate corresponding tabs 724 that extend outwardly from either side of the wall plate 711. In some cases, as illustrated, the wall plate 711 includes an elongate slot 726 on either side of the wall plate 711, spaced inward of each of the tabs 724, to allow the tabs 724 to flex inward when securing the back housing region 706 to the wall plate 711 and/or when removing the back housing region 706 from the wall plate 711. In some cases, the wall plate 711 includes finger nail recesses 728 formed on upper and lower edges of the wall plate 711 to facilitate removal of the wall plate 711 from the back housing region 706 when the wall plate 711 is inadvertently secured to the back housing region 706 before the wall plate 711 is secured to the wall or other vertical mounting surface. In some cases, the wall plate 711 may include a flat upper edge 730 that is configured to accommodate placement of a level thereon when mounting the wall plate 711 to the wall or other vertical mounting surface.

In some cases, the wall plate 711 has an overall width of less than about 1 inch, an overall height of less than about 2 inches and an overall thickness of less than about one third of an inch. The wall plate 711 has a raised outer perimeter 732 that extends around the wall plate 711. As visible in FIG. 44, the back side of the wall plate 711 includes a recess 734 that accommodates at least part of the thickness of the releasable adhesive strip 716. The installer may peel the release layers off of the releasable adhesive strip 716, and adhere one adhesive side to the recess 734 and adhere the other adhesive side to the wall or other vertical mounting surface. The recess 734 may extend to an edge of the wall plate 711 so that the release tab 718 of the releasable adhesive strip 716 can extend out past the edge of the wall plate 711 and be accessible to the user to release the releasable adhesive strip 716 after the wall plate 711 has been mounted to the wall or other vertical mounting surface.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A wireless sensor assembly comprising:
   a wall plate that is configured to be secured to a wall of a building using either a threaded fastener or a releasable adhesive strip, the wall plate including an aperture therethrough for accommodating the threaded fastener and a first recess on a back surface of the wall plate to accommodate at least part of the releasable adhesive strip;
   a sensor housing including a front housing region and a back housing region, the back housing region configured to be releasably secured to the wall plate, the back housing region including:
      a primary recess that is configured to receive at least part of the wall plate when the back housing region is releasably secured to the wall plate; and
      a secondary recess contiguous with the primary recess, the secondary recess configured to accommodate a release tab of a releasable adhesive strip extending past a periphery of the wall plate, such that the sensor housing hides the release tab of the releasable adhesive strip from view when the back housing region of the sensor housing is secured to the wall plate;
   one or more sensors disposed within the sensor housing; and
   a transmitter for transmitting sensor values provided by the one or more sensors, the transmitter is configured to be in wireless communication with a building control system that utilizes the transmitted sensor values in controlling a building control system of the building.

2. The wireless sensor assembly of claim 1, wherein the one or more sensors comprise a temperature sensor.

3. The wireless sensor assembly of claim 1, wherein the one or more sensors comprise a temperature sensor and a motion sensor.

4. The wireless sensor assembly of claim 1, wherein the one or more sensors comprise a humidity sensor.

5. The wireless sensor assembly of claim 1, wherein the one or more sensors comprise a security sensor.

6. The wireless sensor assembly of claim 1, wherein the one or more sensors comprises a smoke sensor or a carbon monoxide sensor.

7. The wireless sensor assembly of claim 1, wherein the wall plate comprises two or more tabs that fit into corresponding slots disposed within the back housing region in order to releasably secure the back housing region of the sensor housing to the wall plate.

8. The wireless sensor assembly of claim 7, wherein the wall plate comprises an elongate slot on either side of the wall plate, spaced inward of each of the two or more tabs, to allow the two or more tabs of the wall plate to flex inward when securing the back housing region of the sensor housing to the wall plate and/or when removing the back housing region of the sensor housing from the wall plate.

9. The wireless sensor assembly of claim 1, wherein the wall plate has a flat upper edge configured to accommodate placement of a level thereon when mounting the wall plate to a wall.

10. The wireless sensor assembly of claim 1, wherein the wall plate comprises recesses formed on upper and lower edges of the wall plate to facilitate removal of the wall plate when the wall plate is inadvertently secured to the back housing region of the sensor housing before the wall plate is secured to the wall.

11. The wireless sensor assembly of claim 1, wherein the wall plate has an overall width of less than about 1 inch.

12. The wireless sensor assembly of claim 1, wherein the wall plate has an overall height of less than about 2 inches.

13. The wireless sensor assembly of claim 1, wherein the wall plate has an overall thickness of less than about one-third of one inch.

14. A wall plate for releasably securing a wireless device to a wall, the wall plate configured to be mounted to the wall with the wireless device subsequently releasably secured to the wall plate, the wall plate comprising:
a body defining a front surface, intended to face away from a wall, and a back surface, intended to face the wall, when the wall plate has been releasably secured to the wall;
a raised perimeter extending around the body;
a centrally located aperture extending through the body, the centrally located aperture configured to accommodate a fastener extending therethrough when an installer decides to use the fastener to secure the wall plate to the wall;
a recess formed in the back surface, the recess configured to accommodate a releasable adhesive strip when the installer decides to use the releasable adhesive strip to releasably secure the wall plate to the wall, wherein the recess formed in the back surface extends to a side of the body to allow a release tab of the releasable adhesive strip to extend out past the side of the body; and
one or more mounting features extending from one or more sides of the wall plate to releasably engage one or more corresponding mounting features of the wireless device.

15. The wall plate of claim 14, further comprising an elongate slot on at least one side of the wall plate, adjacent one or more of the mounting features, to allow the at least one side of the wall plate to flex when securing the wireless device to the wall plate and/or when removing the wireless device from the wall plate.

16. The wall plate of claim 14, wherein the body has an overall width of about 1 inch or less and an overall height of about 2 inches or less.

17. A wireless sensor assembly comprising:
a releasable adhesive strip that includes a release tab that when pulled releases the releasable adhesive strip;
a wall plate, wherein the releasable adhesive strip is used to secure the wall plate to a wall with the release tab of the releasable adhesive strip extending out laterally past a side of the wall plate so that at least part of the release tab is accessible to a user after the wall plate has been secured to the wall; and
a sensor housing that is removably secured to the wall plate, wherein the sensor housing extends laterally out past the side of the wall plate and covers the release tab of the releasable adhesive strip so as to hide the release tab of the releasable adhesive strip from view when the sensor housing is secured to the wall plate.

18. The wireless sensor assembly of claim 17, wherein the sensor housing houses a wireless transmitter, a sensor and a battery.

19. The wireless sensor assembly of claim 17, wherein a back surface of the wall plate comprises a first recess to accommodate at least part of the releasable adhesive strip.

20. The wireless sensor assembly of claim 19, wherein a back surface of the sensor housing includes a second recess extending to a side of the sensor housing to allow the release tab to extend out past the side of the sensor housing.

* * * * *